United States Patent [19]
Kain, III et al.

[11] Patent Number: 6,119,118
[45] Date of Patent: Sep. 12, 2000

[54] METHOD AND SYSTEM FOR EXTENDING FILE SYSTEM METADATA

[75] Inventors: William P. Kain, III, San Jose; Bill Monroe Bruffey, Cupertino, both of Calif.

[73] Assignee: Apple Computer, Inc., Cupertino, Calif.

[21] Appl. No.: 09/324,472

[22] Filed: Jun. 1, 1999

Related U.S. Application Data

[63] Continuation-in-part of application No. 08/644,872, May 10, 1996, abandoned.

[51] Int. Cl.[7] ................................................. G06F 17/30
[52] U.S. Cl. ............................... 707/10; 707/1; 709/217; 709/302; 709/303
[58] Field of Search .......................... 707/10, 1, 4, 103, 707/217, 302, 303

[56] References Cited

U.S. PATENT DOCUMENTS

| | | | |
|---|---|---|---|
| 5,363,487 | 11/1994 | Willman et al. | 395/275 |
| 5,371,885 | 12/1994 | Letwin | 707/205 |
| 5,560,005 | 9/1996 | Hoover et al. | 707/10 |
| 5,574,903 | 11/1996 | Szymanski et al. | 707/1 |
| 5,628,007 | 5/1997 | Nevarez | 707/101 |
| 5,680,586 | 10/1997 | Elkins et al. | 395/500 |
| 5,832,501 | 11/1998 | Kain, III et al. | 707/103 |

*Primary Examiner*—John E. Breene
*Assistant Examiner*—Greta L. Robinson
*Attorney, Agent, or Firm*—Burns, Doane, Swecker & Mathis, L.L.P.

[57] ABSTRACT

In a computer, a system and a method handle requests from a client for accessing metadata attributes from at least one file system having an associated format containing specific metadata attributes. A format agent manages the file system. A client's request is received at an interface and forwarded to a dispatcher. The dispatcher routes the request to the format agent. The format agent fulfills the portions of the client's request regarding metadata attributes included in the associated format of the file system. If the client's request contains a metadata attribute that is not part of the file system's associated format, the format agent accesses a metadata attribute store to retrieve the metadata attribute data needed to fulfill the request. The requested metadata attribute data is then returned to the client. Multiple instances of the metadata attribute data are accessible by the client, the instances selected and/or assigned by the client and/or the system.

63 Claims, 53 Drawing Sheets

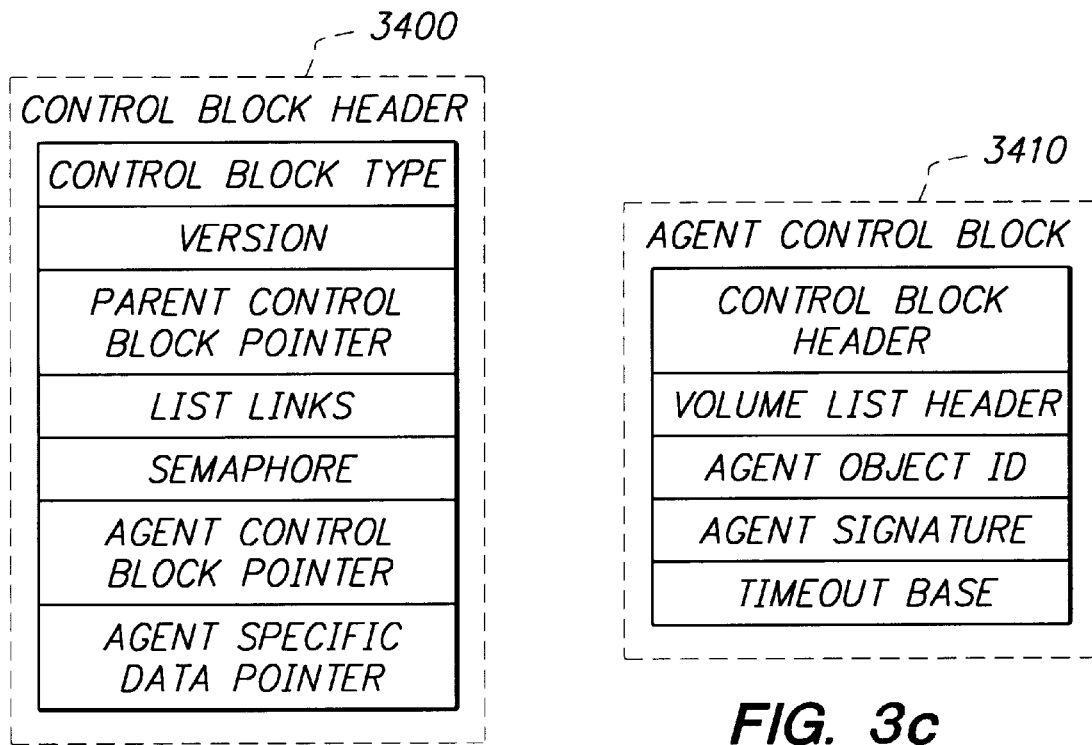
FIG. 3b
FIG. 3c
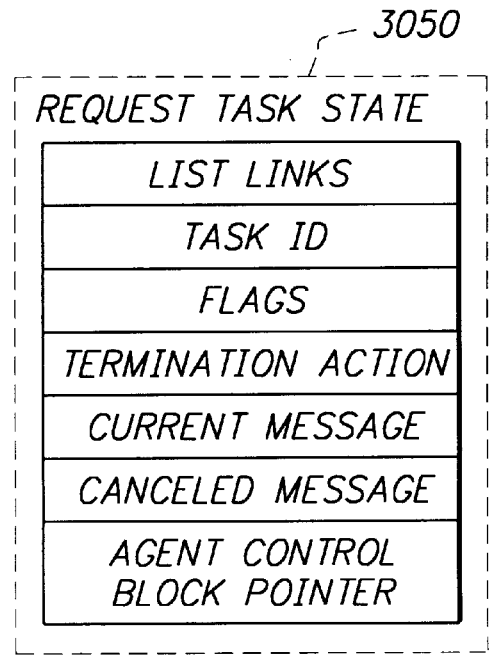
FIG. 5b

FSObject Control Block 3430

| Control Block Header |
| --- |
| Directory Num |
| FSName |
| FSObject Object ID |
| FSObject Object ID Reference Count |
| Volume Control Block Pointer |
| Fork List Header |

FIG. 3d

Volume Control Block 3420

| Control Block Header |
| --- |
| Volume Object ID |
| Attribute Store Attribute Key Path Object ID |
| Attribute Store AttributeValue Path Object ID |
| Attribute Store Object ID |
| FSIterator List Header |
| FSObject List Header |

FIG. 3e

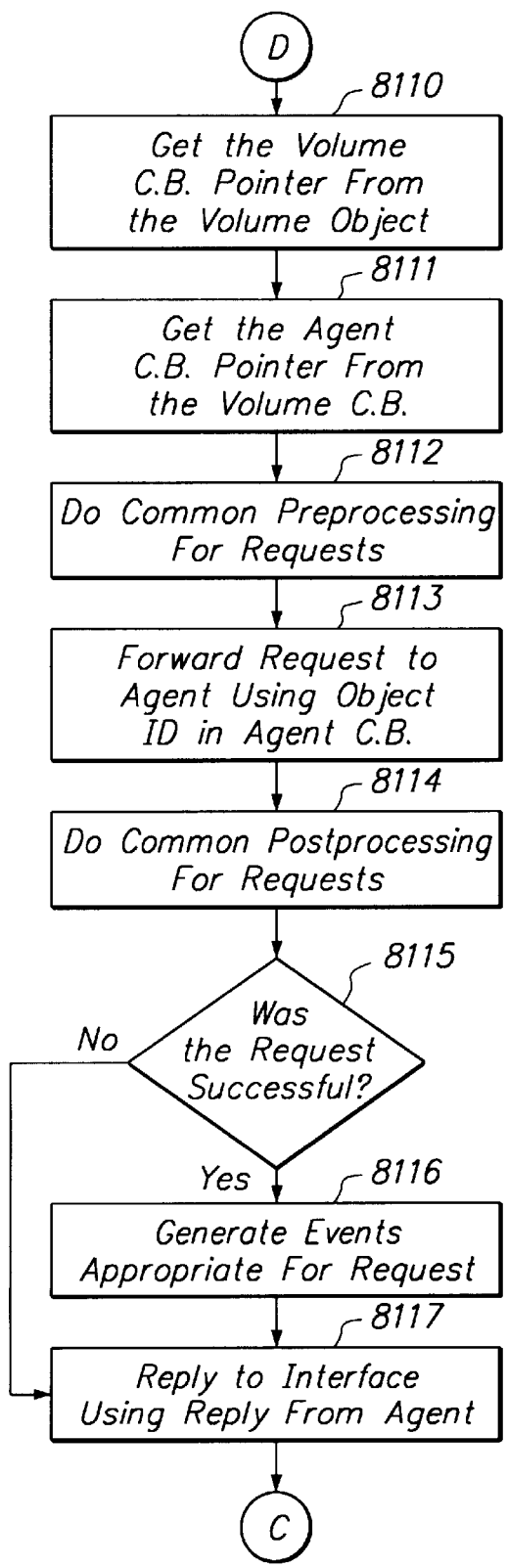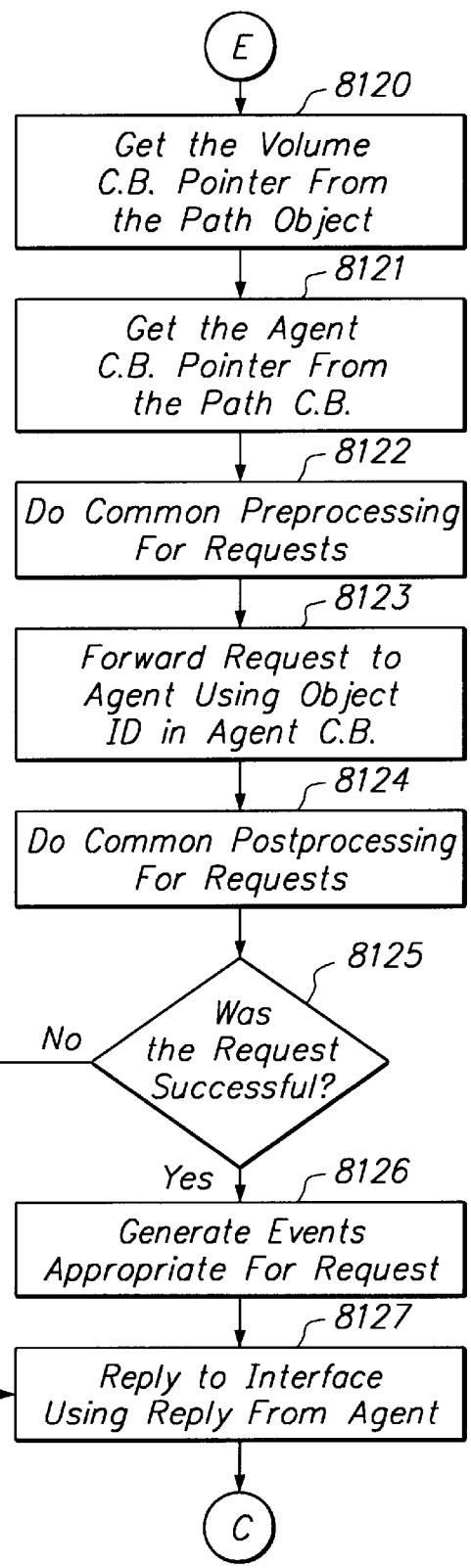
FIG. 8d
FIG. 8e

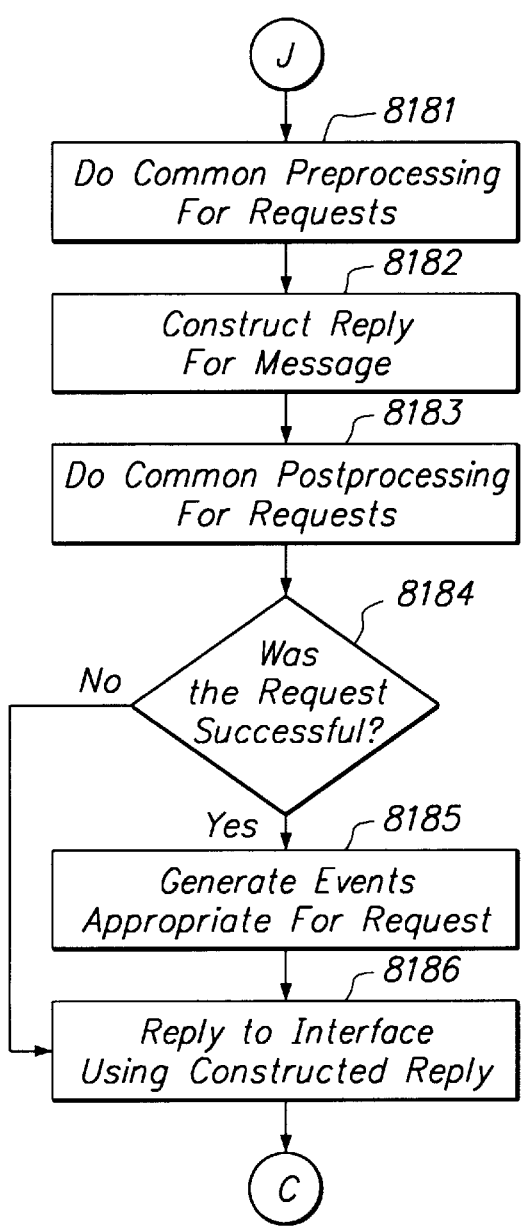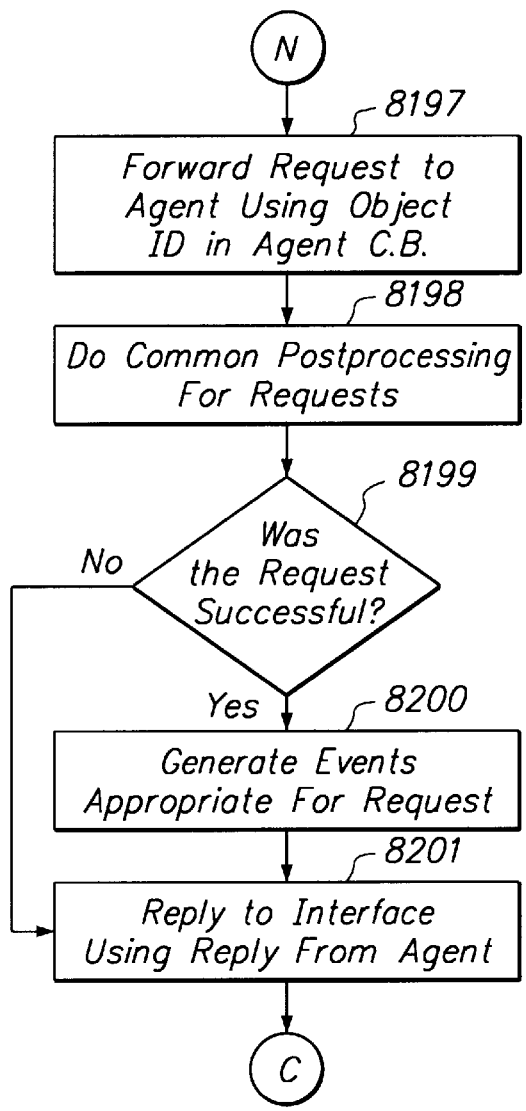

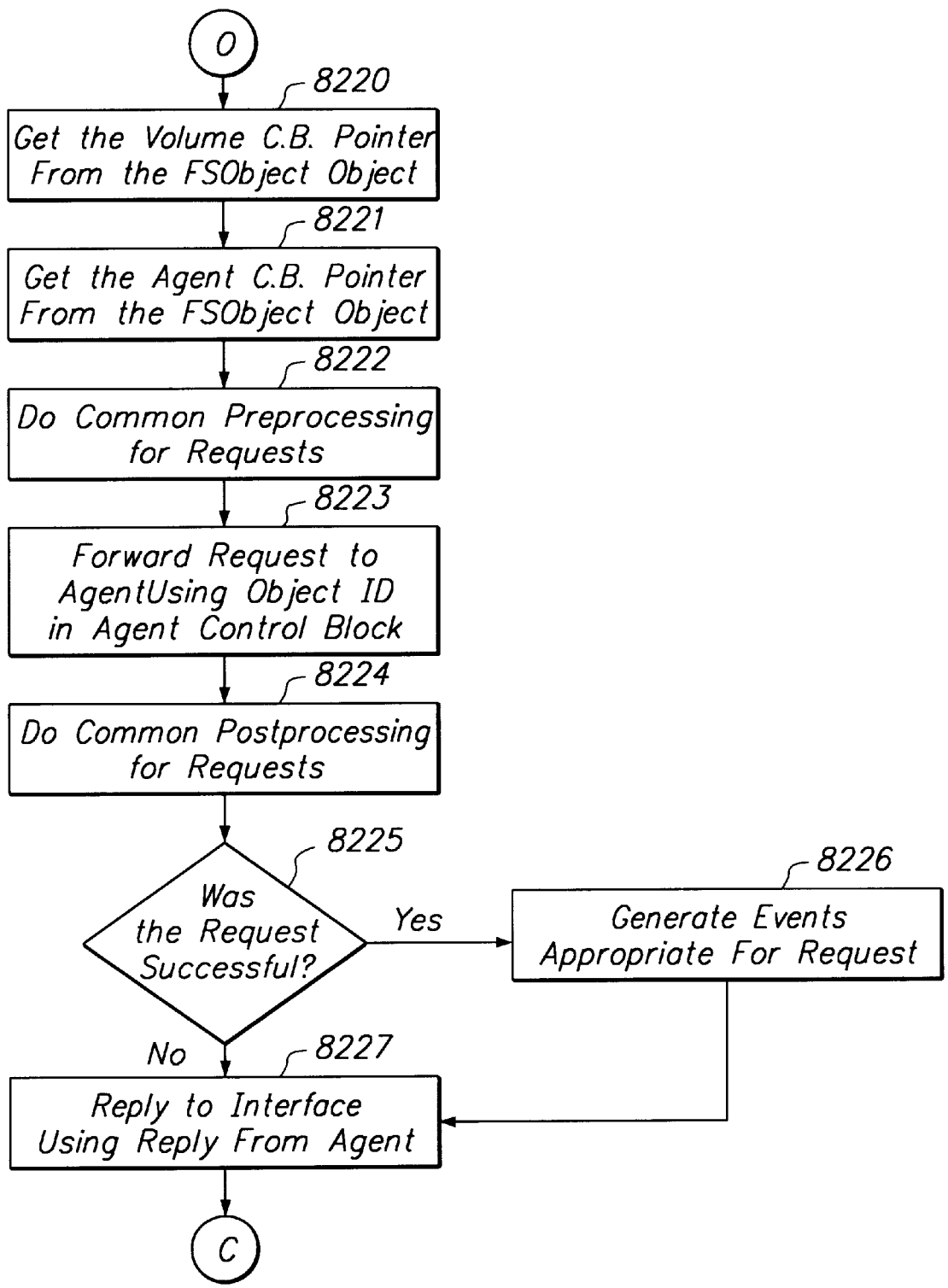

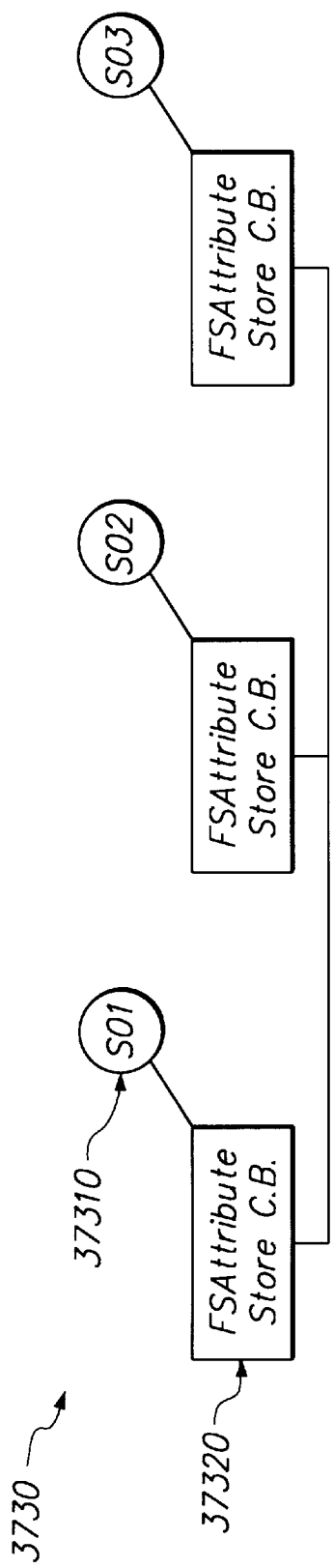

FIG. 11a

FIG. 11b
Attribute Store Control Block
- Control Block Header
- Attribute Store Key Path Object ID
- Attribute Store Value Path Object ID
- Free List Tail
- Free List Head
- Last Free List Element Origin
- Last Free List Element
- Current Free List Element FIG. 11c
Attribute Value Fork Initial Layout

| Free List Tail Element Descriptor | | Free List Head Element Descriptor | |
|---|---|---|---|
| Offset | Length | Offset | Length |
| Attribute Value Fork Free Space | | | |

METHOD AND SYSTEM FOR EXTENDING FILE SYSTEM METADATA

CROSS REFERENCE TO RELATED APPLICATION

This application is a Continuation-in-part of U.S. patent application Ser. No. 08/644,872, filed May 10, 1996 now abandoned.

BACKGROUND

The present invention relates to a method and a system for extending file system metadata. More particularly, the present invention relates to a method and a system for providing name and content extensible, multi-instance metadata for multiple format-specific file systems.

A typical computer system comprises a central processing unit, memory, peripheral devices such as data input/output devices and storage media such as floppy disks or hard disks. The devices communicate with each other via a computer operating system.

Computer operating systems include several different operational modules. One such module is the file manager. Client data stored on a storage medium is organized as a file system having an associated format, and the file manager controls the access to the file systems. The file manager provides file system access to clients using various software via Application Programmer Interfaces (APIs) adapted to the software. For example, the file manager may include an Apple Computer, Inc. API to interface with Apple software or an MS-DOS INT 21 API to interface with DOS software.

The file system stores, organizes and describes client data. The client data is stored in files. The files are arranged in each file system in a particular format. Each file system maintains its organization and description information, referred to as metadata, in format specific structures. Examples of such formats are HFS, MS-DOS FAT, ProDos, High Sierra, ISO 9660, Unix, and so on. The term format encompasses both physical disk format and network server access protocols. To read and write data from and to the file system, the file manager must be able to recognize the format of the file system.

Computer systems have been developed to access storage media organized under different formats by altering the format of the storage media into a format that is recognizable by the file manager. While this enables the computers to access storage media of different formats, the media may be altered to such an extent that they are unrecognizable by a file manager adapted to the original format of the storage media. Thus, it is difficult to use storage media interchangeably between computers with file managers adapted to different formats.

Systems have been developed to allow computers to access storage media having different formats without altering the formats of the storage media. For example, U.S. Pat. No. 5,363,487 to Willman et al. discloses a system adapted for use in a Microsoft™ OS/2 operating system for automatically and dynamically mounting a file system which recognizes the media. In this system, one or more data storage devices and a plurality of file system drivers are provided, including a default file system. The file systems are organized in a linked sequence. Each file system driver is able to access file systems of a particular format. The computer system continuously monitors all peripheral devices to detect any change in media in the peripheral storage devices. Whenever a medium in a data storage device is changed, or the first time the computer system accesses a data storage device, the first file system driver identified in the list of file system drivers is loaded, and a volume identifier is specified by the loaded file system driver. The volume identifier read from the medium is then compared with the identifier associated with the file system driver, and the file system driver is mounted if the identifiers match. Otherwise, the next file system driver identified in the linked list of file system drivers is loaded. The process is then repeated until each file system driver in the linked list of file system drivers has been tested or until a match is found. The default file system is mounted if no match is found.

A problem with this system is that it lacks flexibility. In particular, the identifier must be in a common known location for all volume formats which can be used by the system. Instead, it is desirable to allow each file system driver to use its own method of identifying the volume to provide increased flexibility in the volume format.

Other file managers are known, such as the Microsoft™ WINDOWS™ NT operating system. In this system, messages are sent to a plurality of objects that are maintained by each file system driver, the objects corresponding to the subject of the requests. Thus, if modifications to the processing of particular kinds of requests are necessary, they must be made at each file system driver.

Another system that has been developed is described in commonly assigned U.S. Pat. No. 5,574,903, herein incorporated by reference. In this system, a set of common message structures is employed that can represent a request regarding information stored in a file system in a way that is both independent of the format of that file system and independent of the API module issuing the request. The message structures are used as a common language for communication between the components of the mechanism. A central dispatcher receives requests for access to various storage media via multiple APIs. The dispatcher forwards the requests to format agents adapted to access storage media using a particular file system format. The API module requests are associated with the format agents via a central dispatch store. The store contains at least one first identifier for identifying the format agents, second identifiers for identifying a plurality of objects to which the requests can be sent, and mapping information for mapping between the second and first identifiers. When the request processing is complete, the format agents reply to the dispatcher with any information that needs to be returned to the original client. The dispatcher responds to the interface module which translates the information into a form that is appropriate to the interface. The information is then returned to the client.

This system provides a file manager that is capable of managing multiple, format-specific file systems, independent of the request content. The system provides a format specific, name-space extensible, single-instance metadata model. That is, the names of the units of data characterized in the metadata are extensible with this system. The extensibility of the metadata in the name space is achieved by the format agents and not by altering the native metadata of the file systems. Thus, the system provides interchangeability of file systems, enabling the file systems to be returned to the original machines for which they were intended to be used.

While this system provides metadata extensibility in the name space, the metadata content is format specific or invented by the format agent. Therefore, a request must be specific to a file system with a particular associated format or must be limited to that which can be commonly satisfied by all the format agents. Furthermore, this system provides only single instances of metadata. That is, only one instance of each unit of metadata is provided. This limits the flexibility of the system.

Multi-instance metadata is common in real world applications. Documents may have many authors, a number of events may happen on the same date, and so on. While there are systems that provide for multiple instances of metadata, these systems do not provide for associating the instances with particular clients. The conventional way to deal with multi-instance metadata is to choose a name for the characteristic, for example "author" or "date". Each value of the characteristic is then tagged with the name and an additional field, the instance, that discriminates one value from another. In this manner, instancing allows there to be many authors for a document and many events on the same date. However, a problem arises vis-a-vis name-space management in concurrent systems concerning how a client can choose an instance value and use it without another client first using the instance value. Further, if clients were allowed to create their own instances of attributes, a means to specify all instances of an attribute without knowing a priori each instance value would be required.

Thus, there is a need for a system that extends file system metadata content as well as metadata in the name-space to enable clients to fulfill requests from a number of different file systems without being limited as to which file systems the requests are directed. It is also desirable to enable clients' requests to be fulfilled without requiring that the requests be limited to that which may be commonly satisfied by all the file systems. Finally, there is a need for a system that allows clients to characterize multiple instances of file system metadata using client and/or file manager selected instance discriminants along with a method for associating format independent file system metadata with format dependent file system metadata.

SUMMARY

It is an object of the present invention to provide multi-instance, name-space and content extensible file system metadata for multiple format-specific file systems such that both clients and the file manager can assign instance discriminants. It is a further object of the present invention to provide interchangeability of file systems, so that a file system can be returned to the original machine for which it was intended to be used. According to the present invention, these objectives are met by a system and a method for handling requests from a client for accessing one or more values for attributes from at least one file system having an associated format containing specific attributes.

According to one embodiment of the present invention, the system comprises format agents for managing the file systems, interfaces for receiving requests for accessing attributes from the client, a dispatcher for receiving the request from the interfaces and routing the request to the appropriate format agent, and a metadata attribute store for storing metadata attribute data. The format agent fulfills the portions of the client's request regarding metadata attributes included in the associated format of the file system. If the client's request contains a metadata attribute that is not part of the file system's associated format, the format agent accesses the metadata attribute store to retrieve the metadata attribute data needed to fulfill the request. The requested metadata attribute data is then returned to the client.

According to another embodiment of the present invention, a method is provided for handling requests from a client for accessing metadata attributes from at least one file system having an associated format containing specific metadata attributes. The request is received from the client for accessing metadata attributes from the file system. The request is routed to an appropriate format agent managing the file system. The format agent fulfills portions of the request regarding metadata attributes contained in the associated format of the file system. The format agent accesses the metadata attribute store to retrieve attribute data to fulfill portions of the request regarding metadata attributes that are not contained in the associated format of the file system.

According to exemplary embodiments, multiple instances of the metadata attribute data are accessible by the client, the instances selected and/or assigned by the client and/or the system.

BRIEF DESCRIPTION OF THE DRAWINGS

FIGS. 3b and 3c illustrate a control block header and an agent control block, respectively, according to one embodiment of the present invention;

FIGS. 3d and 3e illustrate structures of an object control block and a volume control block, respectively, according to one embodiment of the present invention;

FIG. 5b illustrates a request task state structure according to one embodiment of the present invention;

FIG. 11a illustrates a block diagram of a file system attribute control store according to one embodiment of the present invention;

FIG. 11b illustrates a file system attribute store control block structure according to one embodiment of the present invention;

FIG. 11c illustrates the initial layout of an attribute value fork according to one embodiment of the present invention;

DETAILED DESCRIPTION

Figure 1:
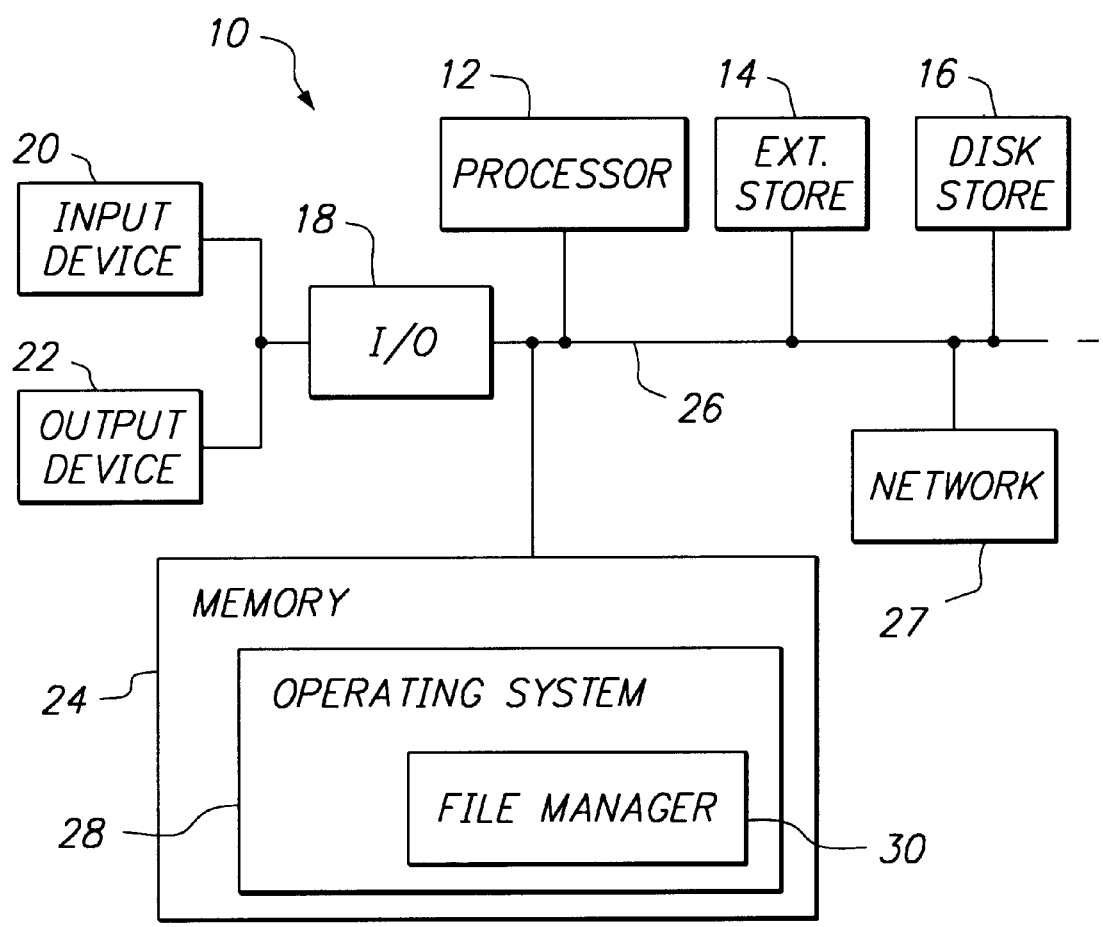
FIG. 1 is a block diagram showing an exemplary computer in which the present invention can be implemented.

The present invention is directed to a file manager for handling requests from clients regarding information stored in multiple format-specific file systems. For purposes of this description, a client is a particular piece of software used to access the file manager. The file manager includes a dispatcher, multiple application programmer interfaces (APIs) that receive requests from clients, multiple format agents for accessing storage media with associated file system formats, a common shared library, and a file system attribute store (FSAttribute store) for satisfying access requests from the format agents to fulfill a client request that cannot be fulfilled by a format agent. The file manager provides a means to extend the metadata in the name-space as well as the content of the metadata of multiple format-specific file systems without altering the native metadata of the file systems. The file manager also provides a means to synchronize access of the metadata with the client data in the file systems.

According to one embodiment, all of the data in a file system is stored in one of two kinds of structures: attributes (or metadata) or forks. Forks are referred to as "coarse grain" data structures in that they contain undifferentiated items of client data. All file systems provide some means of managing data forks. Attributes are referred to as "fine grain" data structures in that they contain characterizations of the client data stored, for example, in the forks. The metadata attributes are the structures with which the system and method according to one embodiment of the present invention, are concerned.

Unlike forks, attributes, and especially metadata attributes directly represented in a file system's native metadata, vary widely from one file system to another. Therefore, format agents can only share metadata that can be represented in their respective file systems or be invented by the format agents, themselves.

According to one embodiment, attributes are descriptive data which are associated with a particular system unit, e.g., a volume, directory, file, or fork. All such descriptive information is accessed as attributes, regardless of how it is actually stored. Thus, names, privileges, a file's type and creator, a fork's length in bytes, etc. can all be accessed as attributes. The interpretation of certain attributes may be defined, and individual file systems may place restrictions on what attributes may be associated with what kinds of units.

Attributes provide information about the unit which may be useful to other software accessing the unit, such as, the author, type of document, size of the unit, key words associated with the unit, etc. According to one embodiment, attributes can be defined by programmers as necessary. In particular, attributes are used to store small data items which need to be accessed by software other than the program which created the attribute (or owns the entity to which the attribute is attached). Attributes can be associated with any of the persistent structures in a file system, e.g., volumes, directories, files, and forks; and it is assumed that there can be a large number of attributes associated with each structure.

Specific attributes are identified by an identifier. In one embodiment, this identifier is referred to as an FSAttribute. The FSAttribute contains information identifying the creator of the attribute, defining what the attribute is, and identifying an instance of the attribute, if there are multiple instances.

In one embodiment, attributes are used to provide access to all of the system-maintained information in the file manager. Everything the operating system knows about the persistent structures in a file system can be accessed by way of attributes. This includes information, such as the name of the file or the length of a fork, which can be accessed through other means as well.

Forks are an ordered sequence of bytes and the fundamental unit on which input/output is performed. Forks are used to store large data items which are primarily accessed by the software which created the fork. Forks are associated only with files, and it is assumed that there are relatively few forks for each file. According to one embodiment, a fork's data can be from 0 to $2^{63}$ bytes long, and may be allocated sparsely.

In one embodiment, data within a fork is accessed through an open path. Paths are runtime constructs which are created for a specific fork, and are defined to use a specific access method. More than one path can be created for a given fork, and the different paths may use different access methods; but the earlier paths created may place limits on what can be done using the later paths.

In one embodiment, files are collections of forks and attributes which can be copied, moved, deleted, and renamed atomically in a file system. According to one embodiment, files represent the smallest collection of information which can be easily dealt with as a unit. The purpose of files is to provide the basis on which the user experience can build a concept of an atomic bundle of information. While finer grain information can be accessed and manipulated through the file manager API within a program, the intent is for the user and caller to view a file as a unit which is manipulated as a whole.

According to one embodiment, directories are collections of files and directories. Every directory has a name (a sequence of characters), a single directory which serves as its parent directory, and a specific volume on which its data is stored. Since directories can contain other directories, there can be a hierarchy of directories containing files on a volume. Directories may also be identified by a value which is unique within a volume.

According to one embodiment, the purpose of directories is to provide a context for finding and using files. Files are put into a context of a directory which can be used to group related files and to provide some context for interpreting the name of a file.

According to one embodiment, there is an attribute store containing metadata that can be used to extend the metadata of the file systems, without altering the native metadata of the file systems. The metadata contained in the attribute store does not exist on a volume, but it is created and maintained by the file manager itself. According to one embodiment, every time the file manager mounts a volume (see below), it mounts it such that the metadata of that volume can be extended with the metadata contained in the attribute store.

Volumes are also collections of files and directories. Every volume has a name (a sequence of characters), and is associated with some form of storage media (either local or remote). Volumes serve as the unit of availability for the file manager. According to one embodiment, volumes represent the smallest collections of files and directories which are made available or not available as a unit. Units such as a single removable disk, partitions within a disk drive, or a set of disks, etc. can be defined as volumes. Note that the contents of a volume may be available to the computer, but the current user may not have permission to actually access the data.

According to one embodiment, an access method is a means by which data in a fork is accessed through a path. According to one embodiment, two access methods are defined: path, which allows random access to variable amounts of data on the fork; and BTree which allows insertion, deletion, and search for structured records in the fork. Therefore, according to one embodiment, a volume's attribute store comprises one BTree file and one path file, along with their respective access methods.

FIG. 1 is a block diagram showing an exemplary computer in which the present invention can be implemented. The computer 10 includes a processor (CPU) 12, an external storage device 14, a disk storage device 16, an input/output (I/O) controller 18, an input device 20, an output device 22, a memory 24, and a common system bus 26 connecting each of the above elements. Only one input device and one output device are shown in FIG. 1 for ease of illustration. However, it will be appreciated that the computer can include more than one such device. The processor 12, the external storage device 14, the disk storage device 16 and the memory 24 are also connected through the bus 26, and the I/O controller 18 is connected to the input and the output devices 20 and 22. In addition, the computer can also be adapted for communicating with a network 27.

Stored within the memory 24 of the computer are a number of pieces of software which can be executed by the processor 12. One of those pieces of software is an operating system 28. In one embodiment, the operating system 28 is a microkernel operating system capable of maintaining multiple address spaces. A file manager 30 resides within the operating system 28. In an exemplary embodiment, the computer system of the present invention is an Apple Macintosh™ computer system made by Apple Computer, Inc., in Cupertino, Calif., having a microprocessor and a memory, wherein a microkernel operating system that includes the file manger 30 resides. The components of the computer system can be changed within the skill of the ordinary artisan once in possession of the instant disclosure. Although the present invention is described in a Macintosh™ environment, it is within the scope of the invention, and within the skill of the ordinary skilled artisan, to implement the invention in a DOS, Unix, or other computer environment.

According to one embodiment, the present invention is part of an operating system with a microkernel architecture and assumes that the kernel will provide the following services. The kernel handles space management such that all the file system's shared data structures are mapped into all the address spaces in which the file system's code exists. This can be provided by mapping all the code and data into a single address space. The kernel preferably should also provide task creation and notification of task termination, a semaphore synchronization mechanism, and a messaging system that provides multiple objects to which messages may be sent. The messaging system allows a creator defined value to be associated with each object, multiple objects to be mapped to the same port, messages to be either received from a port or have a function be called when a message of an appropriate type is sent to that port, and allows the receiver of the message to determine to which object the message was originally sent and to derive the creator defined value for that object. One example of such a microkernel architecture is provided by NuKERNEL™, as referenced in U.S. Pat. No. 5,574,903.

According to one embodiment of the present invention, messages are sent between a client and a server. A service is provided by a server, and software wishing to make use of the service is the client of the server. Messages are sent to a target by clients and received by servers. The message directs the server to perform a function on behalf of the client. Message objects are abstract entities that represent various resources to messaging system clients. These objects may represent, for example, volumes or forks managed by a server.

Every file system object has a unique identifier referred to as an FSSpecification. The FSSpecification contains a volume Object ID identifying the volume containing the object, a directory number indicating the directory in which the object is located, and the name of the object. Clients send messages to objects, which objects are identified by the FSSpecification.

Message ports are abstract entities that represent a service. These ports may represent, for example, a device driver, a file manager, or a window manager. Servers receive messages from ports, which ports are identified by PortIDs. Objects are assigned to a port. A message sent to an object is received from that object's port. Ports and objects are created by the messaging system on behalf of a server. The creation of an object requires designating a port from which messages sent to the object will be retrieved. The objects and ports are used in one embodiment of the present invention to establish communication between the various components of the file manager.

Figure 2:
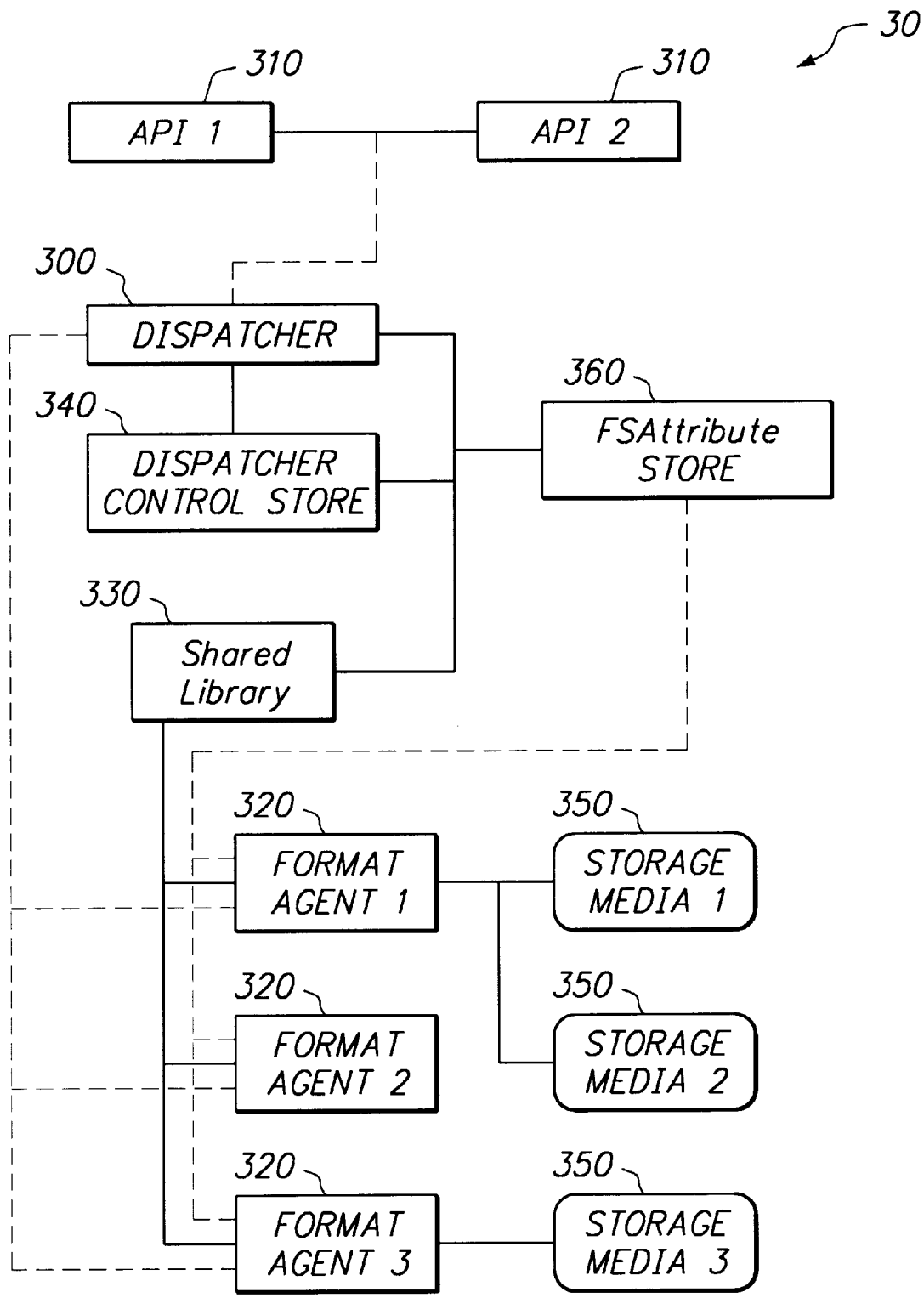
FIG. 2 illustrates a general block diagram of a file manager according to one embodiment of the present invention.

FIG. 2 illustrates a general block diagram of the file manager 30 according to one embodiment of the present invention. The file manager can be viewed as a collection of independently loadable modules including a dispatcher 300, application programmer interfaces (APIs) 310, format agents 320, a shared library 330, a dispatcher control store 340, and a file system attribute (FSAttribute) store 360. The dashed lines in FIG. 2 indicate request messages. The solid lines indicate direct invocations.

The APIs 310 present different public interfaces to other modules of the system. Software that is written for specific environments can use the interfaces that are standard in that environment. For example, a UNIX API can be used with UNIX software, and a DOS API can be used with DOS software. The APIs 310 interface between the client software and the file manager by translating requests from the clients into normalized request messages understandable by the file manager. Although two APIs, API 1 and API 2, are shown in FIG. 2, any number of APIs may be provided.

The dispatcher control store 340 includes storage structures that store an identifier to identify each format agent, an identifier to identify the objects assigned to the dispatcher port, and mapping information for mapping between the format agent identifiers and the object identifiers. According to one embodiment, the dispatcher control store 340 is conceptually part of the dispatcher 300. The dispatcher 300 receives normalized request messages from the APIs 310 and uses the mapping information contained in the dispatcher control store 340 to determine which format agent is able to satisfy the request. It then forwards the request messages to the appropriate format agent 320. Although three format agents 1, 2 and 3 are shown, it is appreciated that any number of format agents may be included.

According to one embodiment, each format agent can access storage media 350 according to a particular file system format. For example, as shown in FIG. 2, format agent 1 can access storage media 1 and 2 having the same associated file system format, and format agent 3 can access storage media 3 having a different associated file system format.

The appropriate format agent 320 receives the messages from the dispatcher 300 and processes the requests, thereby interfacing between the operating system, in particular the file manager, and the storage media being accessed. When the request is completed, the format agents 320 reply to the dispatcher 300 with information to be returned to the original caller. Once all the format agents 320 involved with fulfilling the request have replied to the dispatcher 300, the dispatcher 300 returns the fulfilled request to the API 310 that was used to initiate the request, sending any information that needs to be returned to the client. The API 310 translates that information into a form that is appropriate to the interface, and returns it to the client.

Since parts of the internal mechanisms of the format agents 320 are similar between different modules, the file manager according to the present invention can include a shared library 330 that can be used by all the format agents 320. This library includes implementations of common mechanisms that can be shared between format agents 320, therefore making it easier to develop these modules. The shared library 330 also includes the software routines required by the format agents 320 to allow the agents to build the storage structures which form the dispatcher control store 340.

The file manager 30 also contains an FSAttribute store 360. The FSAttribute store 360 contains a collection of logic code associating arbitrary attributes with objects. The FSAttribute store 360 is capable of storing attributes that are not part of the native metadata of the file systems. This makes it possible to extend the content and the name-space of the native metadata of the file systems by retrieving attributes from the FSAttribute store in response to requests from a client, without affecting the metadata of the file systems. Thus, the file systems are still usable in the machines for which they were originally intended to be used.

To provide metadata content and name-space extensibility without affecting the native metadata of a file system, the FSAttribute store 360 uses files located in the file systems for storing the attributes when the format agents request that they be associated with objects. These files are treated as any other file in the file systems, and the attributes stored in these files do not interfere with the native metadata of the file systems. These files are made available on a volume at the time the volume is mounted, as described in further detail below with reference to FIG. 7a.

When a format agent 320 receives a request from a client for an attribute, the format agent fulfills the request as long as the request is concerned with attributes that are part of the native metadata included in the file system associated with the format agent. If the attribute is not part of the native metadata, the format agent asks the FSAttribute store 360 for the attribute. The attribute is retrieved from the FSAttribute store 360 using identifying information, as described in further detail below. The attribute is associated with an object and returned to the format agent. The format agent, in turn, returns the requested attribute to the client.

Figure 3A:
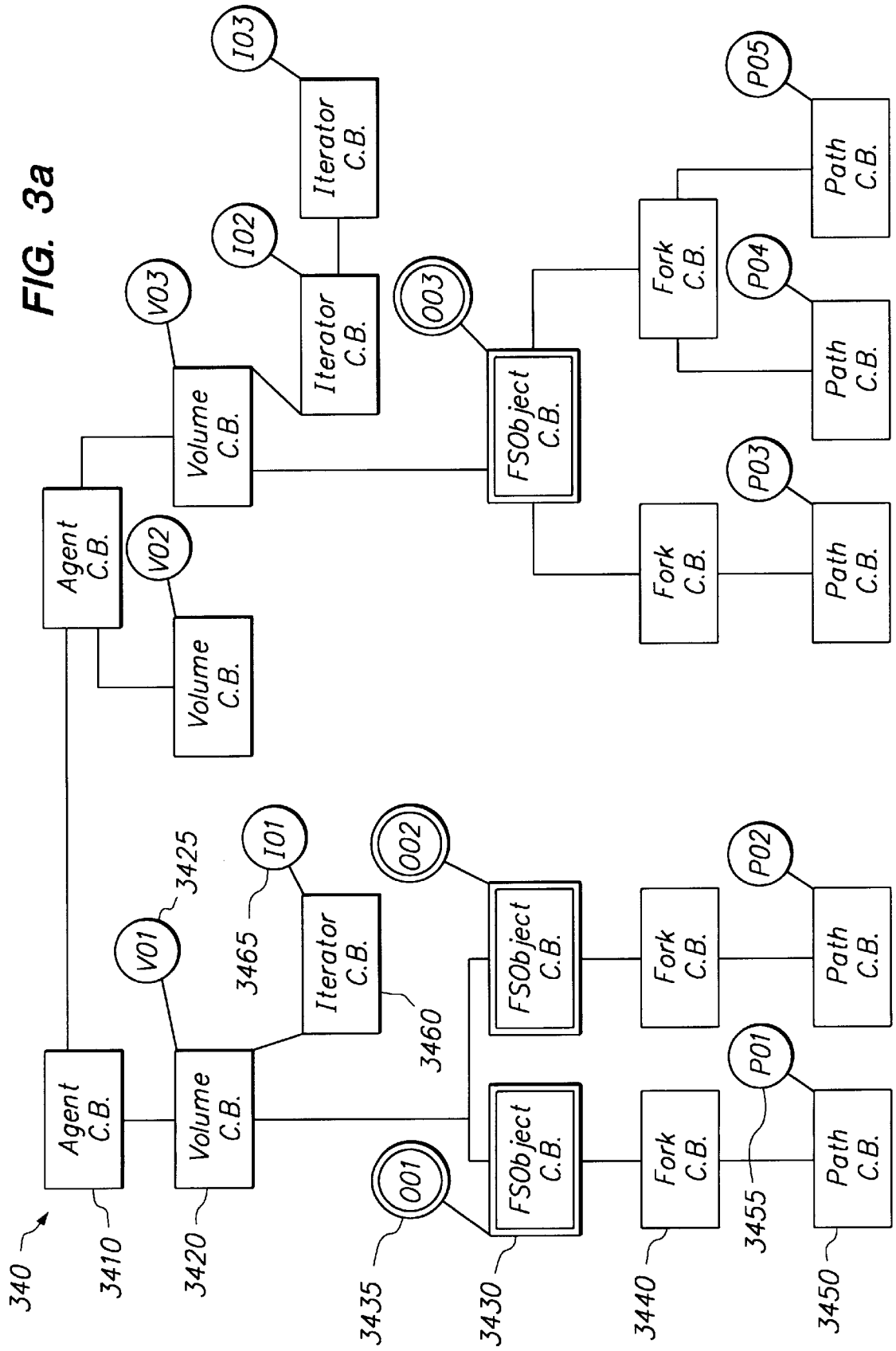
FIG. 3a illustrates a block diagram of a dispatcher control store according to one embodiment of the present invention.

According to one embodiment, the dispatcher control store 340 comprises a plurality of control blocks as illustrated in FIG. 3a. The control blocks include agent control blocks (agent C.B.) 3410, volume control blocks (volume C.B.) 3420, file system object control blocks (FSObject C.B.) 3430, fork control blocks (fork C.B.) 3440, path control blocks (path C.B.) 3450, and iterator control blocks (iterator C.B.) 3460.

The file manager according to one embodiment of the present invention uses control block structures stored in memory to maintain the runtime state for the file system entities it manages (e.g., volumes, objects, forks, paths, and iterators) and to maintain in memory copies of frequently accessed information relating to these file system entities. In addition, each of these control blocks includes a semaphore which is used to coordinate the activities of the request processing tasks (RPTs).

According to one embodiment, these control blocks are stored as follows. There is a list of agent control blocks 3410, each agent control block in the list corresponding to a format agent 320. Each agent control block 3410 can have a list of volume control blocks 3420 for volumes which have that file system format. Each volume control block 3420 can have a list of object control blocks 3430 for objects which have opened forks and attributes, and a list of iterator control blocks 3460 for the iterators which currently point to something on that volume. Each object control block 3430 can have a list of fork control blocks 3440 for forks which are opened for that object. Each fork control block 3440 can have a list of path control blocks 3450 for each access path which is opened for that object.

The volume control block 3420 is associated with a volume object (VO) 3425, the file system object control block 3430 is associated with an FSObject object (00) 3435, the path control block is associated with a path object (PO) 3455, and the iterator control block 3460 is associated with an iterator control block (IO) 3465. These objects are assigned to the dispatcher message port and are used for communicating between the dispatcher and the APIs.

Each control block, regardless of type, has a header 3400 which contains some common fields, preferably: Control Block Type; Version; Parent Control Block Pointer; List Links; Semaphore; Agent Control Block Pointer; and Agent Specific Data Pointer. This structure is illustrated in FIG. 3b. The Control Block Type field indicates the type of the control block (volume, object, etc.). The Version field indicates the version of the control block structure used. The Parent Control Block Pointer field is the pointer to the control block which is the parent of the current control block. For example, for the object control block 3430, this field is a pointer to the volume control block which has the object control block in its list. The List Links field are pointers to the next and previous control blocks which have the same parent. The Semaphore field is the semaphore used to coordinate access to the control block. The Agent Control Block Pointer field is a pointer to the agent control block pointer which owns the structure (that is, if you follow the parent pointers up, you eventually get to this pointer). The Agent Specific Data Pointer field is a pointer to the agent specific extension to the control block. This field is included because while the different implementations of the file manager may define certain public fields which are to be included in the control blocks, every volume format is likely to want additional private fields to keep track of format specific data and states. The control block services module 3350 (FIG. 4) allows the format agents 320 to allocate control blocks with extra room to hold these additional fields. The agent specific data pointer then is a pointer to this extra space. It is appreciated that the definition of the fields to be included within the control blocks are within the skill of the ordinary artisan once in possession of the present disclosure.

One embodiment of the agent control block 3410 has the structure illustrated in FIG. 3c, including the following fields: Control Block Header; Volume List Header; Agent Object ID; Agent Signature; and Timeout Base. The Control Block Header contains the fields described above with reference to FIG. 3b. The Volume List Header is a pointer to the list of volumes for this volume format. The Agent Object ID is the ObjectID to which messages are sent for the format agent for this volume format. The Agent Signature is a unique identifier for the volume format. The Timeout Base is a time duration which is used as the basis for estimating the time a request will take for this volume format, and therefore the length of timeout which should be used.

FIG. 3d illustrates a file system object control block structure according to one embodiment of the present invention. As shown in FIG. 3d, the file system (FSObject) object control block 3430 includes the following fields: Control Block Header; Directory Num; FSName; FSObject Object ID; FSObject Object ID Reference Count; Volume Control Block Pointer; and Fork List Header. The Control Block Header contains the fields described above with reference to FIG. 3b. The Directory Num and the FSName identify the object within the FSAttribute store and the file system. The FSObject Object ID is used for routing an object metadata request from an API to the dispatcher. The agent FSObject Object ID Reference Count indicates how many client requests are being fulfilled by format agents using a particular FSObject Object ID. The Volume Control Block Pointer points to the volume control block for which the file system object control block has been created. The Fork List Header contains a list of the forks which currently point to the object.

Figure 10:
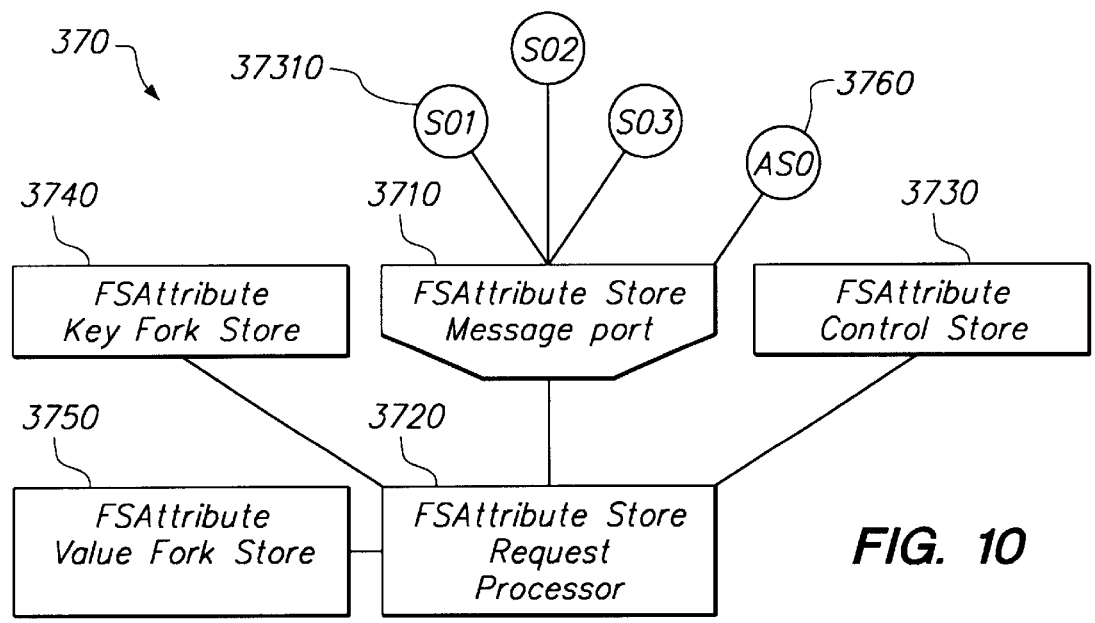
FIG. 10 is a block diagram of an attribute store according to one embodiment of the present invention.

FIG. 3e illustrates a volume control block structure according to one embodiment of the present invention. As shown in FIG. 3e, the volume control block 3420 includes the following fields: Control Block Header; Volume Object ID; Attribute Store Attribute Key Path Object ID; Attribute Store Attribute Value Path Object ID; Attribute Store Object ID; FSIterator List Header; and FSObject List Header. The Control Block Header contains the fields described above with reference to FIG. 3b. The Volume Object ID identifies the volume containing the object. Stored values for the attributes of a file system's objects, i.e., folders and files, are kept in two normal files on the volume. One file contains the attribute values, and the other file is used as an index of attributes and their locations in the file of attribute values. Since these are normal files accessed using the file manager API's 310 (FIG. 2), file manager Object ID's are needed to access them. The volume control block's Attribute Store Attribute Key Path Object ID and the Attribute Store Attribute Value Path Object ID provide access to the attribute store's attribute index and attribute value information, respectively. Format agents use the volume control block's attribute store object ID 3760 to direct requests to the FSAttribute Store's message port 3710 (FIG. 10). The FSIterator List Header contains a list of the iterators which currently reference the volume. The FSObject List Header contains a list of the objects which currently reference the volume.

Figure 4:
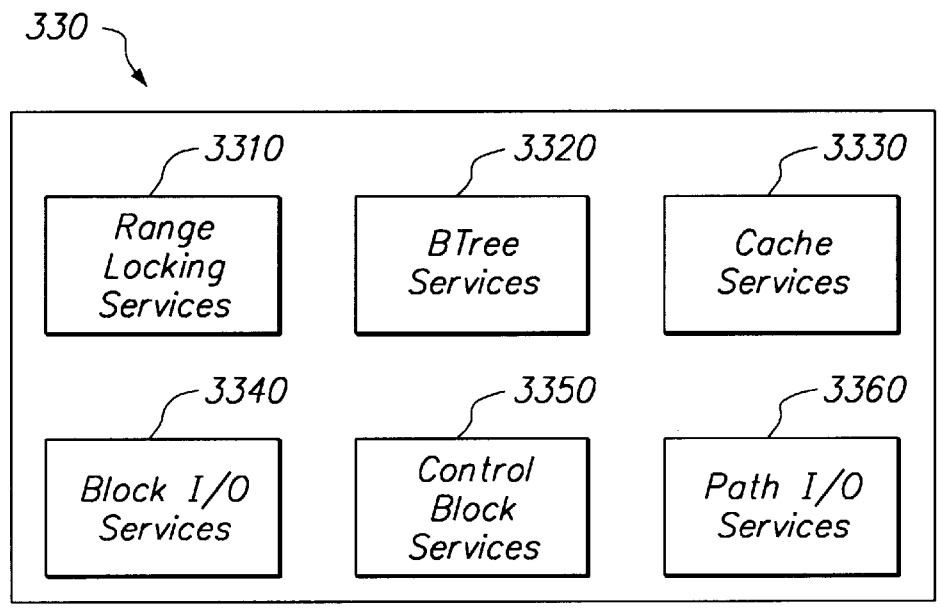
FIG. 4 illustrates a detailed diagram of a shared library according to one embodiment of the present invention.

FIG. 4 is a block diagram of the shared library 330 according to one embodiment of the present invention. The shared library 330 contains six logical code modules: a range locking services module 3310, a BTree services module 3320, a cache services module 3330, a block input/output (I/O) services module 3340, a control block services module 3350, and a path I/O services module 3360.

The range locking services module 3310 is responsible for providing a standard mechanism for all format agents to use to provide range locking functionality within forks. It is still up to individual format agents as to whether they use this mechanism or provide their own. This decision is described in more detail below.

The BTree services module 3320 contains the common BTree code which enables insertion, deletion, and searching for structured records in a fork. The architecture according to one embodiment also permits the same code to be used to support both the internal and public BTree interfaces. The path I/O services module 3360 contains the common path code which allows random access to variable amounts of data on a fork. The cache services module 3330 is responsible for managing the file manager cache. It allocates and maintains the cache storage and maintains a database of how the various cache blocks are used. According to one embodiment, the design permits fast detection of cache hits, even with larger caches and handles multiple sizes of buffers, and supports read-extend operations. The block I/O services module 3340 provides a common interface for the disk based format agents to perform driver I/O.

The control block services module 3350 contains the code which actually allocates, accesses, manipulates, and releases the various kinds of control blocks used internally by the file manager in the store 340 according to the present invention. The control block services module 3350 is responsible for providing services which enable concurrent processing of requests in multiple threads of execution such that all critical sections are protected. In particular, if there are multiple threads of execution using the same data, a method is required to prevent them from interfering with each other.

According to one embodiment, this is accomplished by acquiring and then releasing control blocks. For instance, to read information from a volume (but not change it), the volume's control block is acquired for shared access so that other clients can read at the same time, and it is released when the access is complete. Or, to modify the information about an access path, the path's control block is acquired for exclusive access so that only one thread is allowed to have exclusive access at a time. If a second thread of execution tries to get access while the first thread has acquired the control block for exclusive access and has not yet released it, the second thread of execution will be forced to wait until the first thread releases it. In this way, the various threads of execution cooperate with each other. According to one embodiment, the actual data for these structures is allocated in the kernel band, and is referenced through globals, but the code for manipulating them is included in the shared library to make them accessible to all of the format agents 320.

The purpose of the format agent 320 is to receive requests from the dispatcher 300, process the requests, and reply with the results of the requests. In one embodiment, as discussed above, the format agent 320 may make use of a shared library 330 to perform operations which are common between several formats. Some requests may be able to be fulfilled using information which is either stored in the public or private fields of control blocks, while others will require reading and/or writing media or otherwise accessing devices through which the volume's data is obtained.

In one embodiment, if the volume is stored on a block oriented device, the format agent 320 may use the block I/O services module 3340 of the shared library 330 to read and write data on the media. If the format agent 320 expects that certain data may be used repeatedly or if the format agent wants to have the file manager allocate the buffer for the data, the format agent may use the cache services module 3330 of the shared library 330. If the agent 320 needs to access a fork as a BTree record or as a path, this can be done using the BTree services module 3320 or the path services module 3360, respectively.

In one embodiment, these four modules of the shared library 330 are dependant on each other. The BTree services module 3320 and the path services module 3360 call the cache services module 3330 to get buffers for the data they need, and the cache services module 3330 calls the block I/O services module 3340 to actually read and write data in the cache.

It is however desirable to decouple the use of these modules. Therefore, according to an alternative embodiment, these modules make calls back to the format agent 320 to fulfill these needs. The format agent 320 has a procedural interface which the shared library modules can use in response to calls the format agent 320 makes on the shared library 330. The interface for these calls provides identical functionality to the calls which the BTree services module 3320 and the path services I/O module 3360 need to make to the cache services module 3330 and the cache services module 3330 needs to make to the block I/O services module 3340.

According to this alternative embodiment, when the format agent 320 calls the BTree services module 3320 or the path services module 3360 of the shared library 330, the BTree services module 3320 or the path services module 3360 will call the format agent 320 for cache operations. The format agent 320 then can either choose to call the cache services module 3330 to fulfill these calls, or the format agent can use some other mechanism (for example, a private cache, or direct reads and writes without a cache). Likewise, when the format agent 320 calls the cache services module 3330 of the shared library 340, the cache will call the format agent 320 for block I/O operations. Again, the format agent 320 then can either choose to call the block I/O to fulfill these calls or use some other mechanism (for example, calls to network drivers, or reading ram-disk buffers).

Figure 5A:
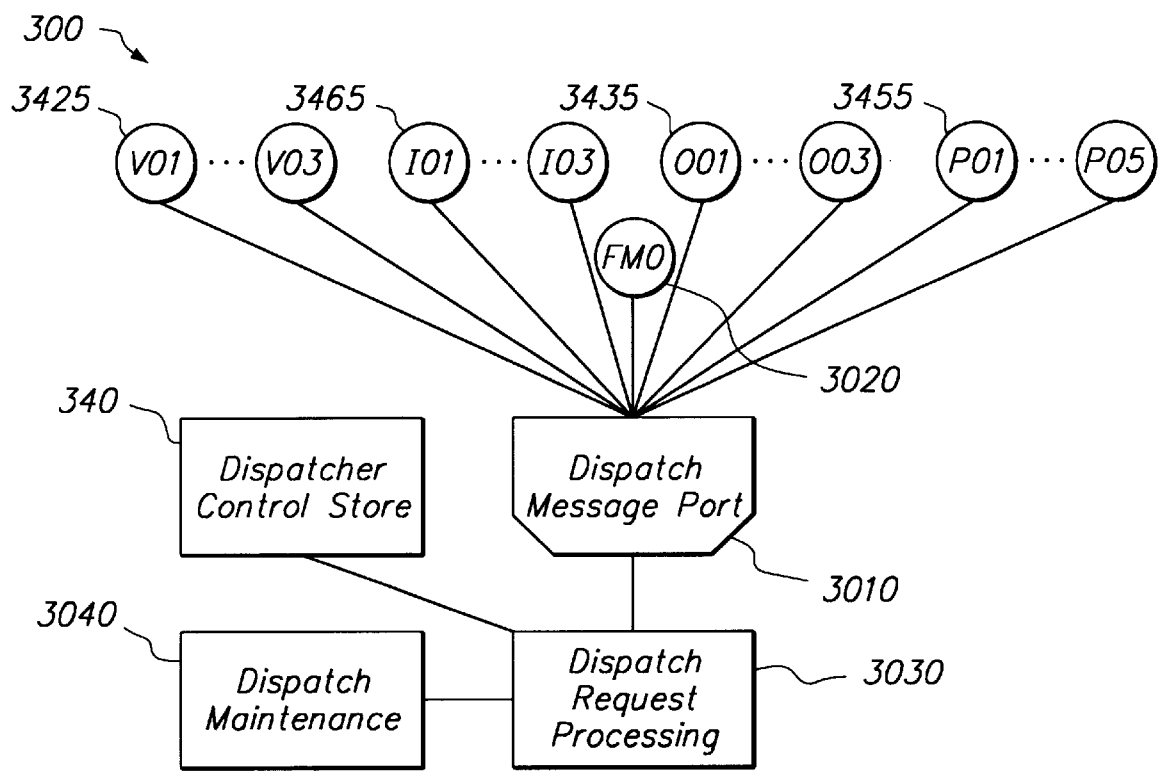
FIG. 5a illustrates a block diagram of a dispatcher according to one embodiment of the present invention.

FIG. 5a illustrates a block diagram of the dispatcher 300 according to one embodiment of the present invention. The dispatcher 300 comprises two task modules: the dispatch maintenance module 3040 and the request processing module 3030. The dispatcher 300 also includes a dispatch control store 340 and the dispatch message port 3010. The volume objects 3425, FSObject objects 3435, path objects 3455, and iterator objects 3465 are assigned to the dispatch message port 3010 as described above. The dispatch message port 3010 also includes a file manager object (FMO) 3020 to receive requests not directed at a volume, object, path, or iterator.

According to one embodiment, the dispatch maintenance module 3040 has a thread of execution which performs maintenance activities including initializing the file manager, shutting it down, and performing periodic maintenance chores such as handling kernel messages, canceling requests, maintaining the number of request processing tasks, and flushing the cache. Other maintenance procedures may be implemented in alternative embodiments by an ordinarily skilled artisan once in possession of the instant disclosure.

According to one embodiment, the request processing module 3030 has a plurality of threads of execution which are known as request processing tasks (RPT) which are used to actually process file manager requests which are sent to the dispatcher. At any point in time, each of these tasks is either processing a request, or waiting for a new message to come into the file manager port. As each new request message comes in, the messaging system gives it to the next RPT which is waiting.

According to one embodiment, to keep track of the RPTs, the dispatcher 300 includes a set of RequestTaskState structures, one for each running RPT in the dispatcher control store 340. In one embodiment, these structures are maintained in a doubly linked list. This structure keeps track of a task identifier, a message identifier of the request currently being processed (if there is one), and the format agent to which the request has been forwarded (if the request has been forwarded).

In one embodiment, this structure has a format illustrated in FIG. 5b, including List Links; a Task ID; Flags; a Termination Action; a Current Message; a Canceled Message; and an Agent Control Block Pointer. The List Links field contains pointers to the next and previous RequestTaskState structures. The Flags field is used to indicate if the RPT is currently processing a request, and if the request has been forwarded to a format agent. The Termination Action field, in one embodiment, is a software interrupt for the maintenance task which is invoked if the RPT terminates unexpectedly. The Current Message field is the message ID of the message which the RPT is currently processing. If the RPT is not currently processing a request, the Current Message field is reset to some known value. The Canceled Message field is the message ID of the message if the message was canceled. The Agent Control Block pointer is a pointer to the control block for the format agent to which the request was forwarded.

According to one embodiment, the dispatcher 300 defines the following additional globals: RequestTaskQueue is a header for list of RequestTaskState structures; AgentControlBlockList is a header for the list of agent control blocks; FileManagerPort is the file manager port 3010 on which object requests are received; FileManagerObjID is the general ObjectID for file manager requests; RequestTaskCount is the number of running RPTs; RequestTaskDesire is the desired number of RPTs to have running at a given time; and MasterSemaphore is a semaphore which is used to coordinate access to the list of agent control blocks.

Figure 6:
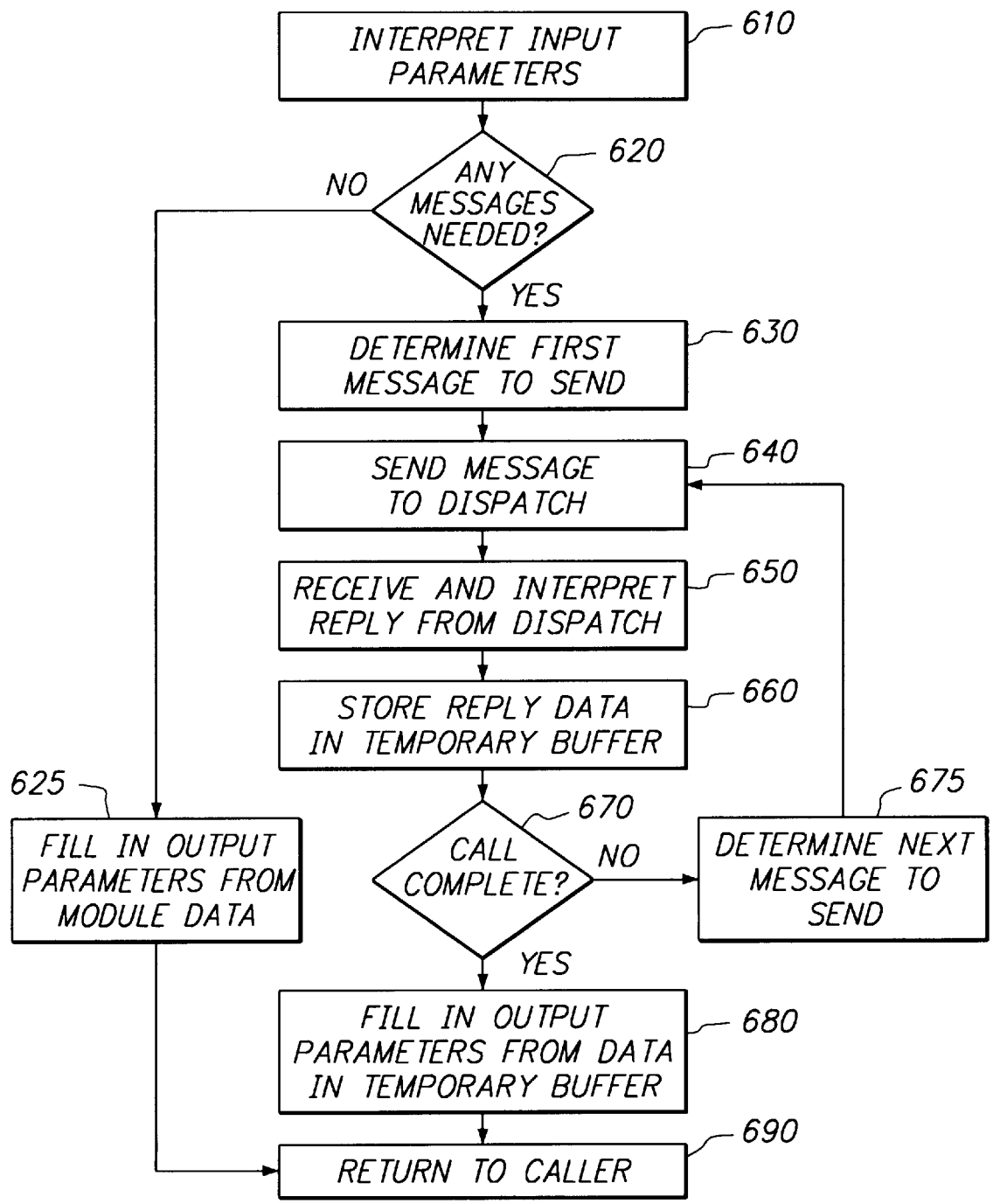
FIG. 6 is a flowchart illustrating the process by which an interface module processes a request from a client to the file manager according to one embodiment of the present invention.

FIG. 6 is a flowchart illustrating the process by which an interface module processes a request from a caller or client according to one embodiment of the present invention. The request is received from the client in the form of a call with designated input and output parameters. At step 610, the API interface module 310 interprets any input parameters of the call. A determination is made as to whether any messages are needed to fill in the output parameters (step 620). If the interface module has sufficient data to fill in the output parameters for that call, the answer at step 620 is no, and the output parameters are filled in at step 625.

If messages are required to fill in the output parameters, the API module determines the first message it needs to send to obtain the output parameters (step 630). The message is sent to the dispatcher 300 (step 640). When a reply is received from the dispatcher 300, it is interpreted by the API module (step 650). The reply data is stored in a temporary buffer at step 660. This enables the interface module to handle the situation where the call requires a number of messages to obtain the values to be returned as output parameters, and the situation where the call includes one output parameter, whose value is dependent on the reply data from a number of messages. At step 670, a determination is made whether the call is complete, that is, whether all the necessary messages have been sent to determine the output parameter values and perform all the actions required to satisfy the call. If not, the interface module determines the next message to send (step 675) and loops to step 640. If so, the output parameters are filled in from the temporary buffer (step 680), and the interface module returns to the caller (step 690).

In one embodiment, this process is implemented as a state machine. For such a state machine, the view is taken that the purpose of any call to an interface module is to collect information, perform operations on a file system, or both. Therefore, states represent particular sets of information which have been collected and particular sets of operations which need not be performed (either because they have already been performed or they do not need to be performed based on the input parameters provided to the call). Likewise, transitions represent messages to be sent to the dispatcher to collect more information, to perform more operations, or both. The interface module continues to execute the state machine until all information indicated by the input parameters has been collected, and all actions indicated by the input parameters have been completed.

According to one embodiment, requests are processed concurrently. However, each volume is still only a single entity, and there is only a single hierarchy of control blocks. Therefore, the volumes and control blocks are shared resources to which access needs to be coordinated between the RPTs. In one embodiment, this is done by including semaphores in each control block and using those semaphores to coordinate access to the control blocks and the data in the file system which the control blocks represent.

In one embodiment, the policy for providing the coordination is:

1) to add or remove an agent control block, the master semaphore for the dispatcher and the semaphore for the control block being added or removed must be acquired for exclusive access;
2) to traverse the set of agent control blocks, the master semaphore for the dispatcher and the agent control block semaphore for the current agent must be acquired for shared access;
3) to change whether a volume is currently mounted, the semaphore for the volume's control block and the semaphore for that volume's agent control block must be acquired for exclusive access;
4) to traverse the set of volume control blocks, the master semaphore for the dispatcher and the agent control block semaphore related to the current volume must be acquired for shared access;
5) to change the structure of the control block hierarchy for a particular volume adding or removing object, fork or path control blocks, the semaphore of the volume control block and the semaphore for the control block being added or removed must be acquired for exclusive access;
6) to traverse the structure of the control block hierarchy for a particular volume (all of the object, fork, and path control blocks under that volume) or to change any of the metadata for a volume (any shared structures on disk, for instance, the disk allocation map), the semaphore of the volume control block must be acquired for exclusive access;
7) to read information about an object, fork or path, the appropriate control block's semaphore must be acquired for shared access;
8) to modify information about an object, fork or path, the appropriate control block's semaphore must be acquired for exclusive access; and
9) multiple semaphores must be acquired in the order: master, path, fork, object, volume, volume format; and must be released in reverse order.

FORMAT AGENTS PROCESSING

Figure 7A:
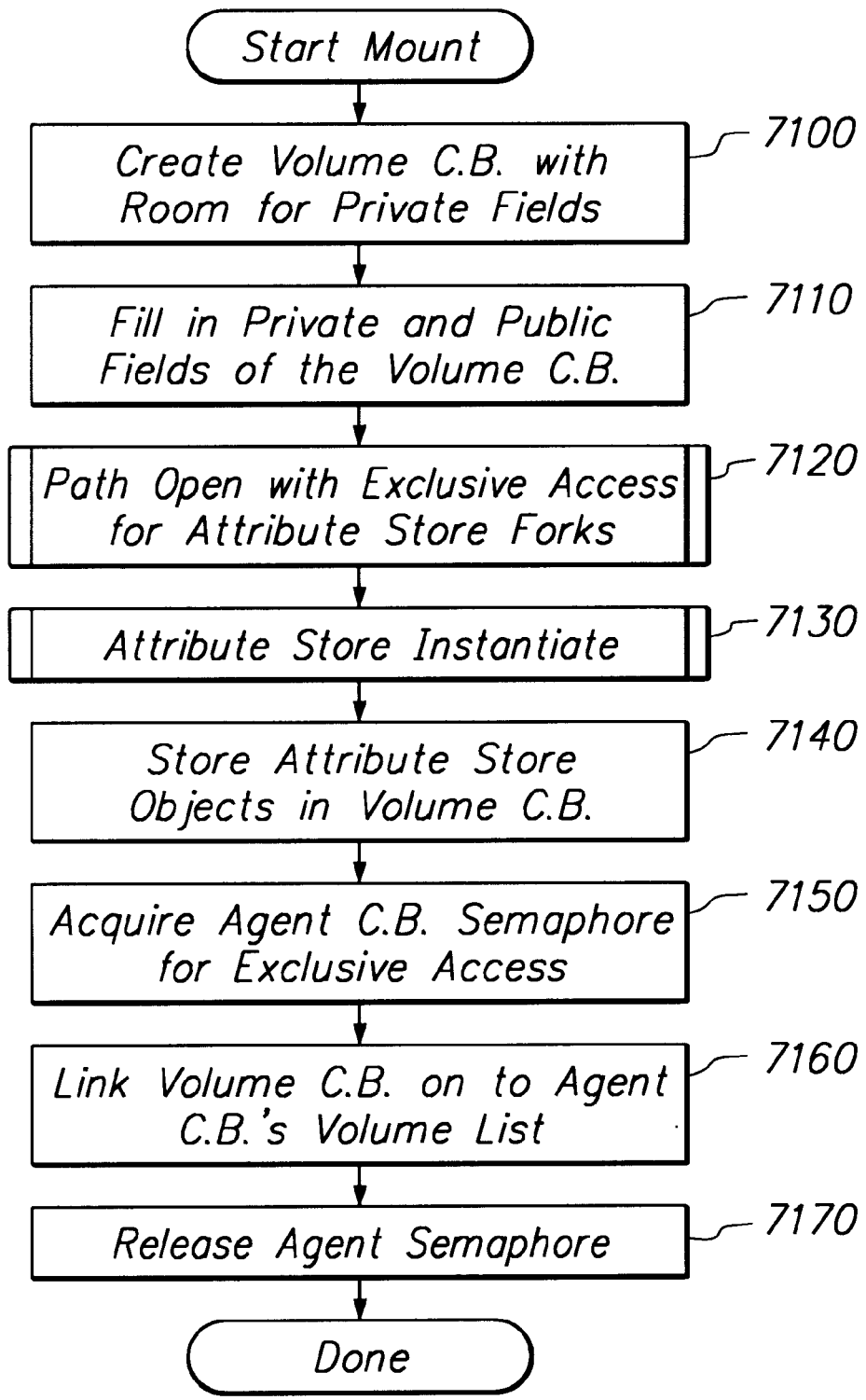
FIGS. 7a through 7r are flowcharts illustrating the process by which a format agent maintains its metadata according to one embodiment of the present invention.
Figure 7B:
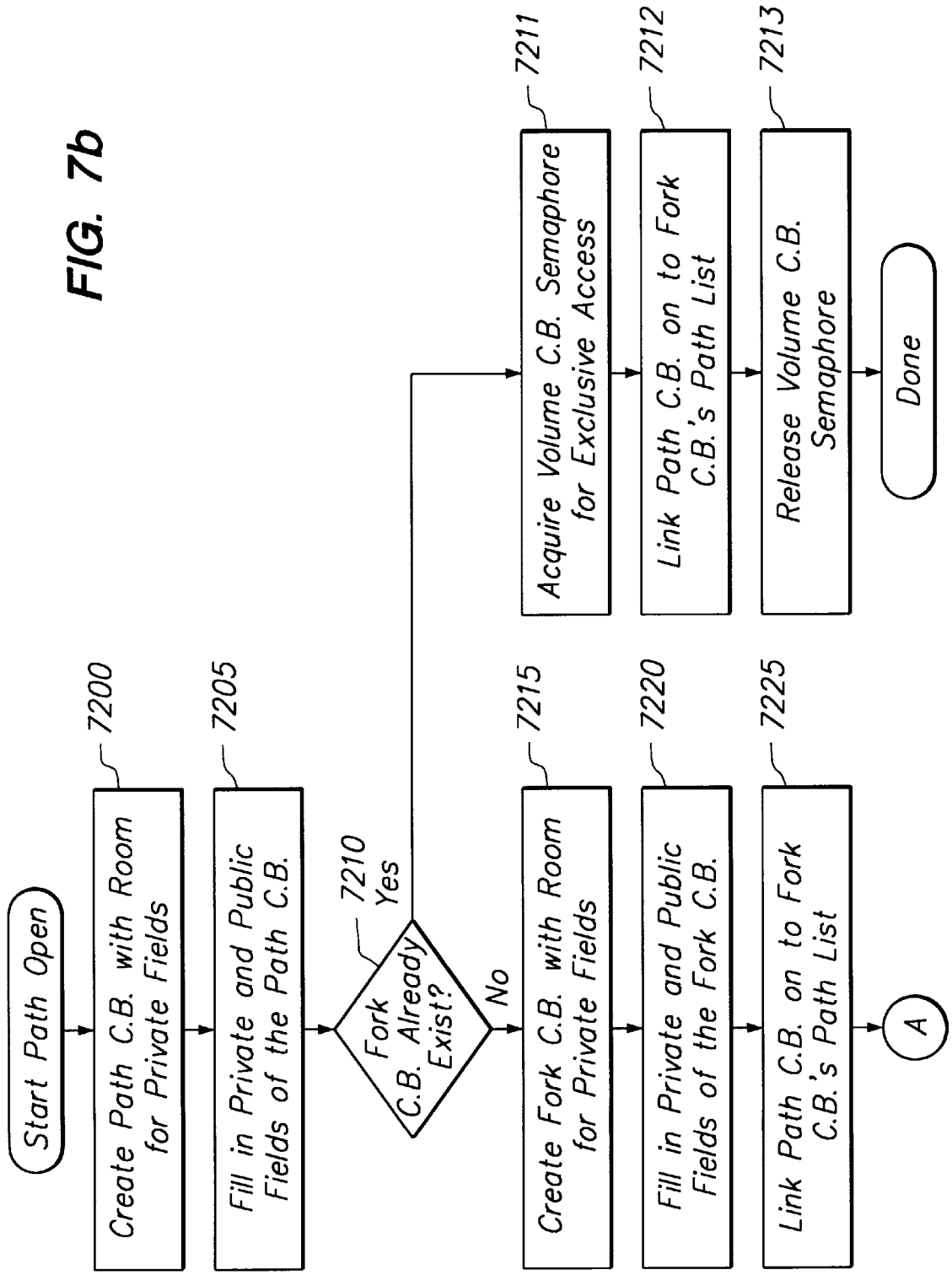
Figure 7C:
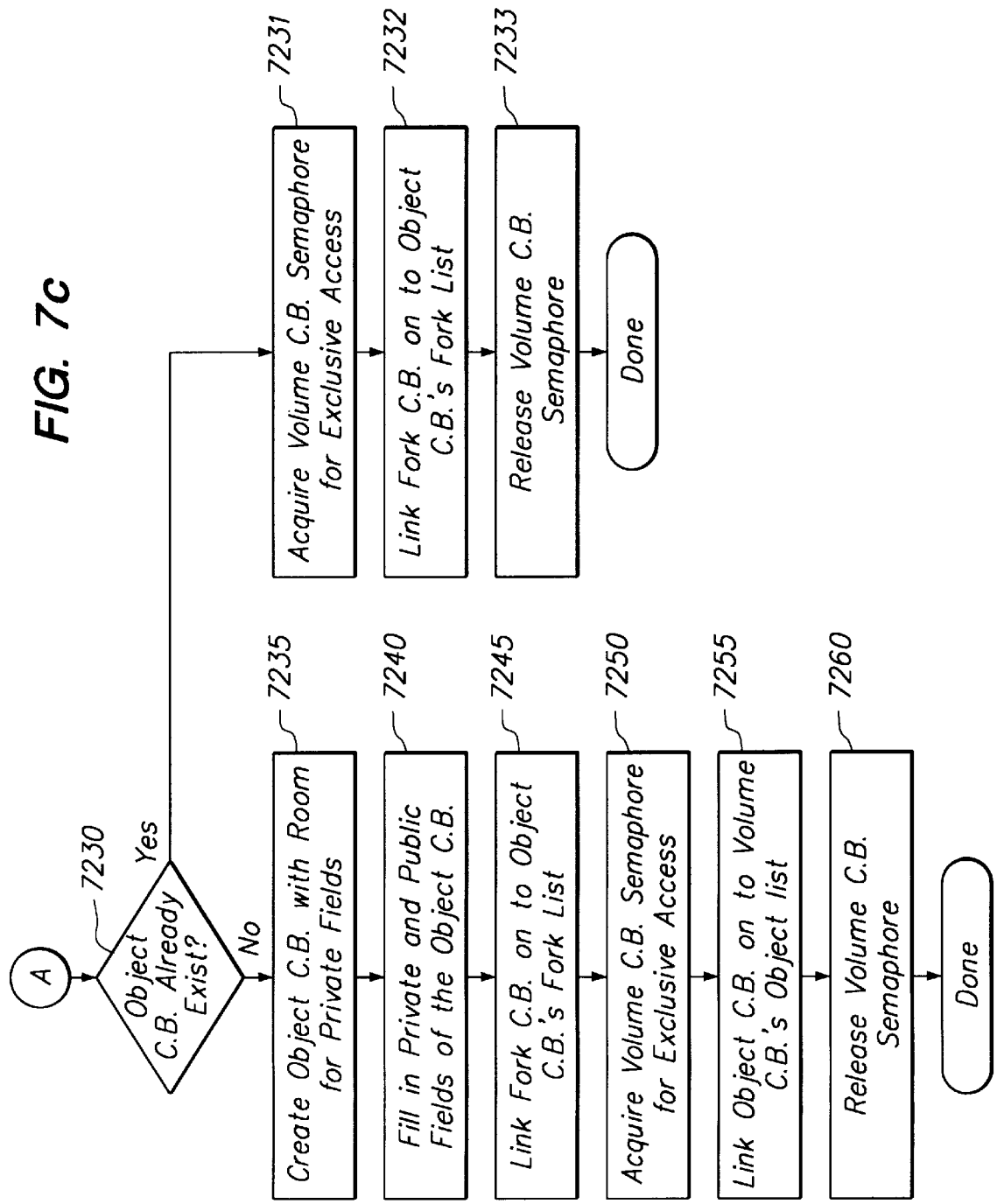
Figure 7D:
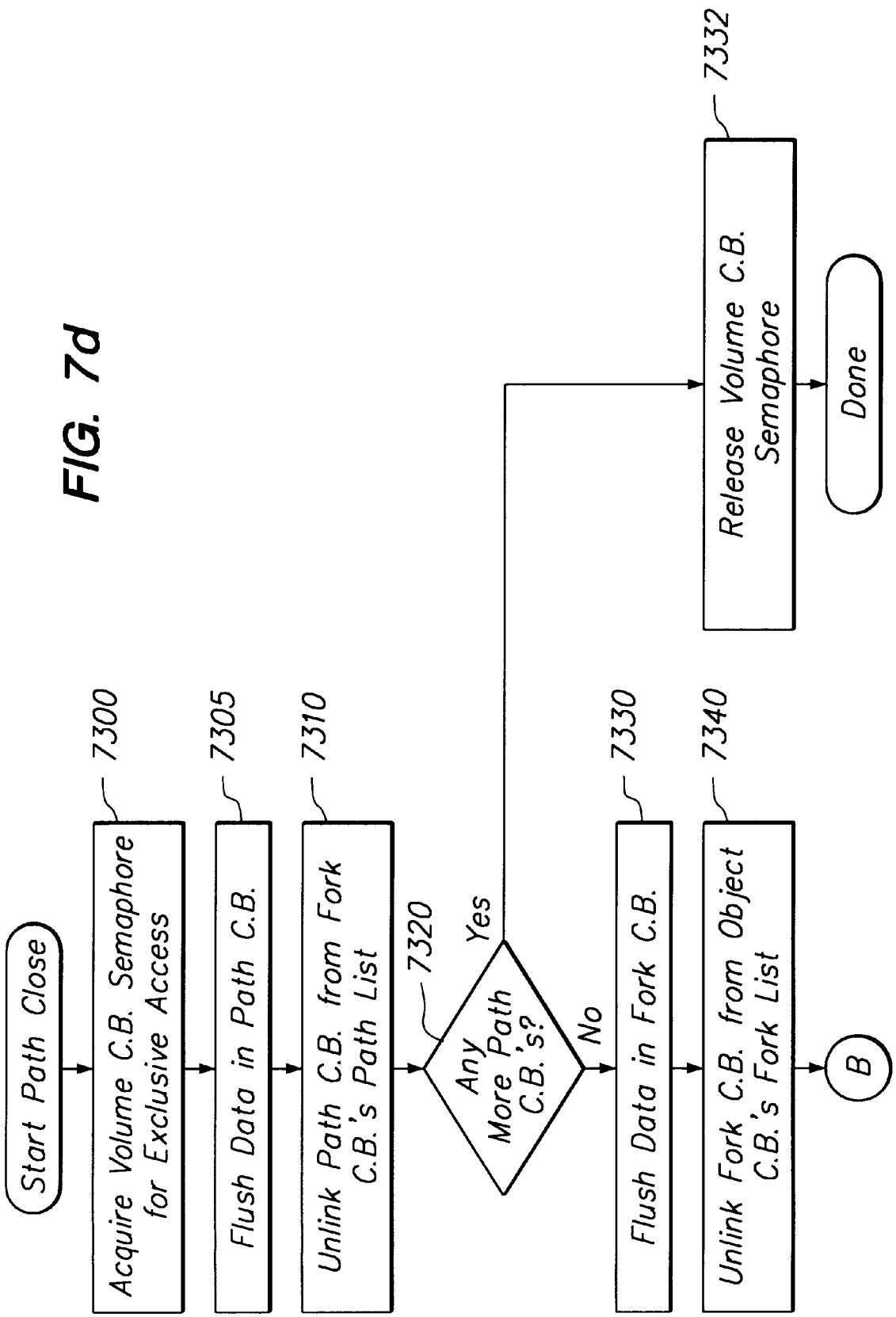
Figure 7E:
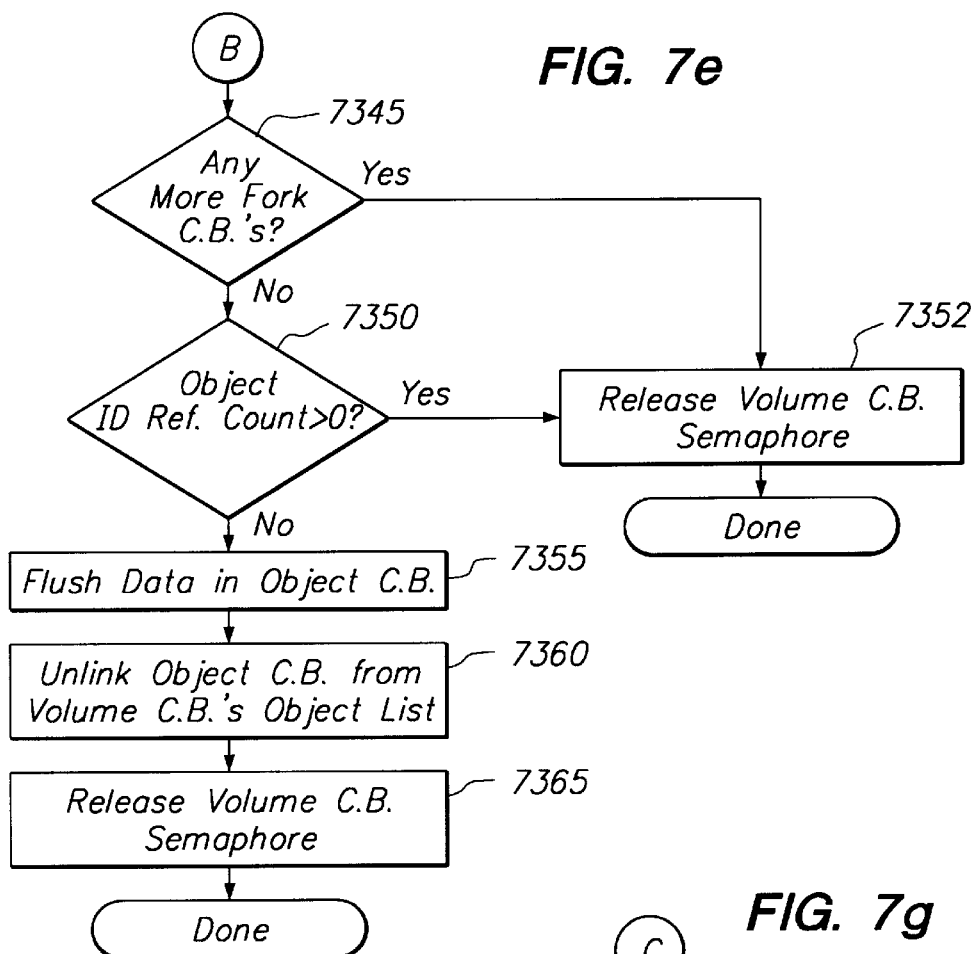
Figure 7G:
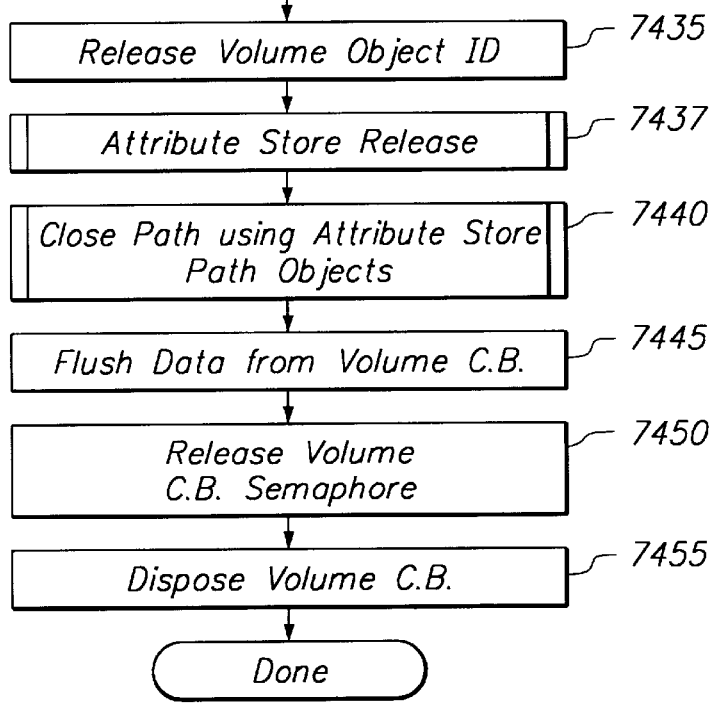
Figure 7F:
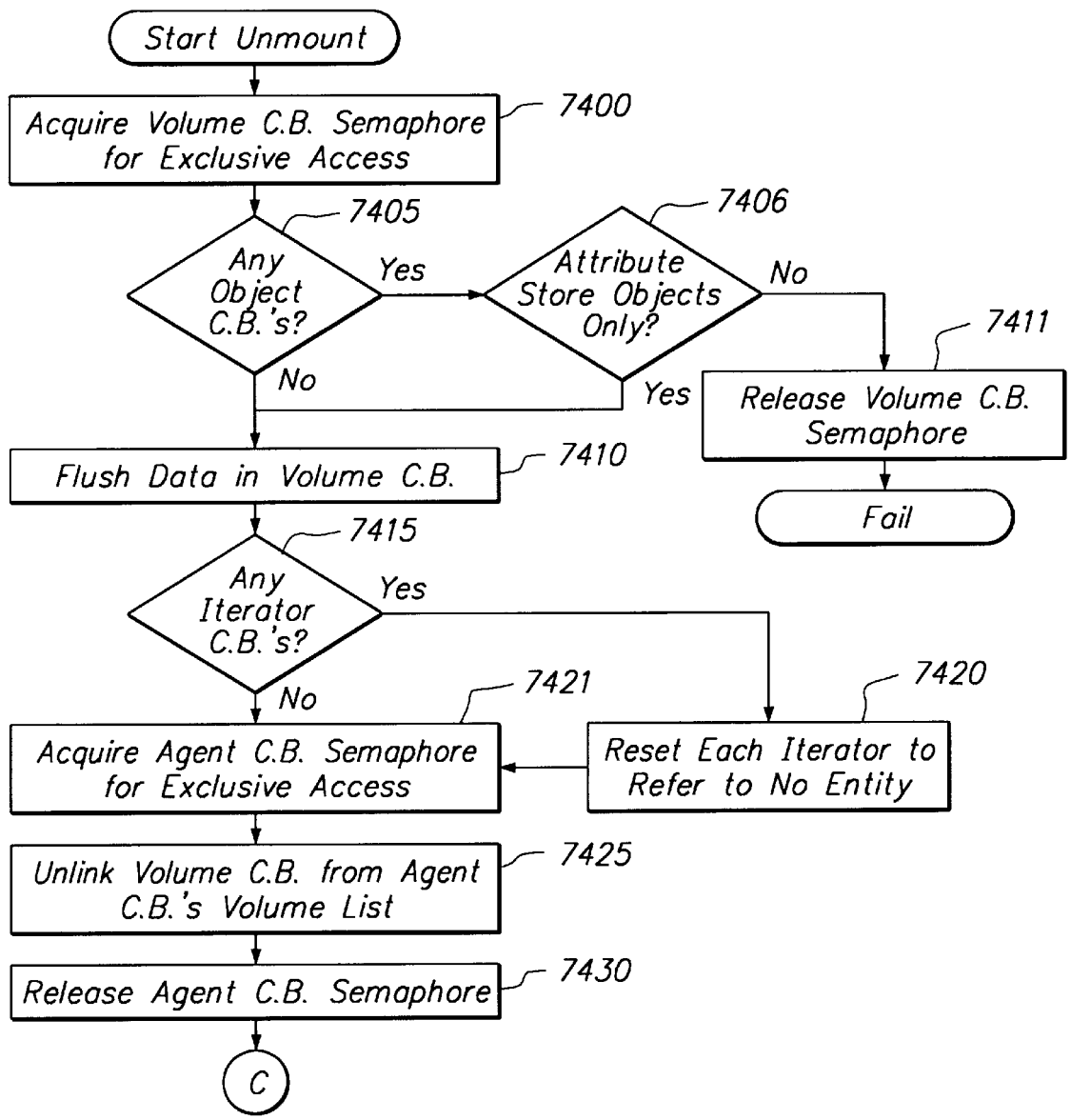
Figure 7H:
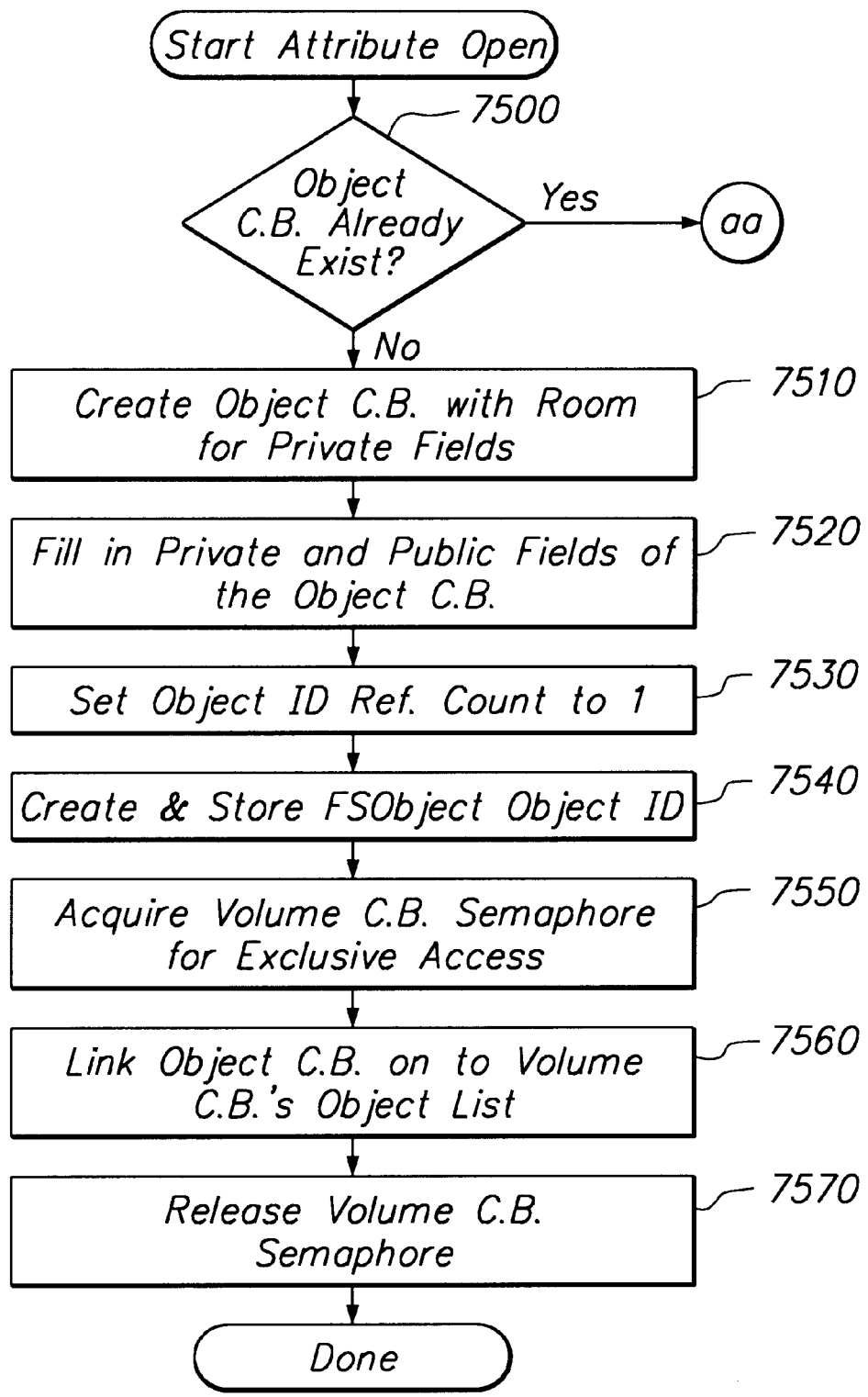
Figure 7I:
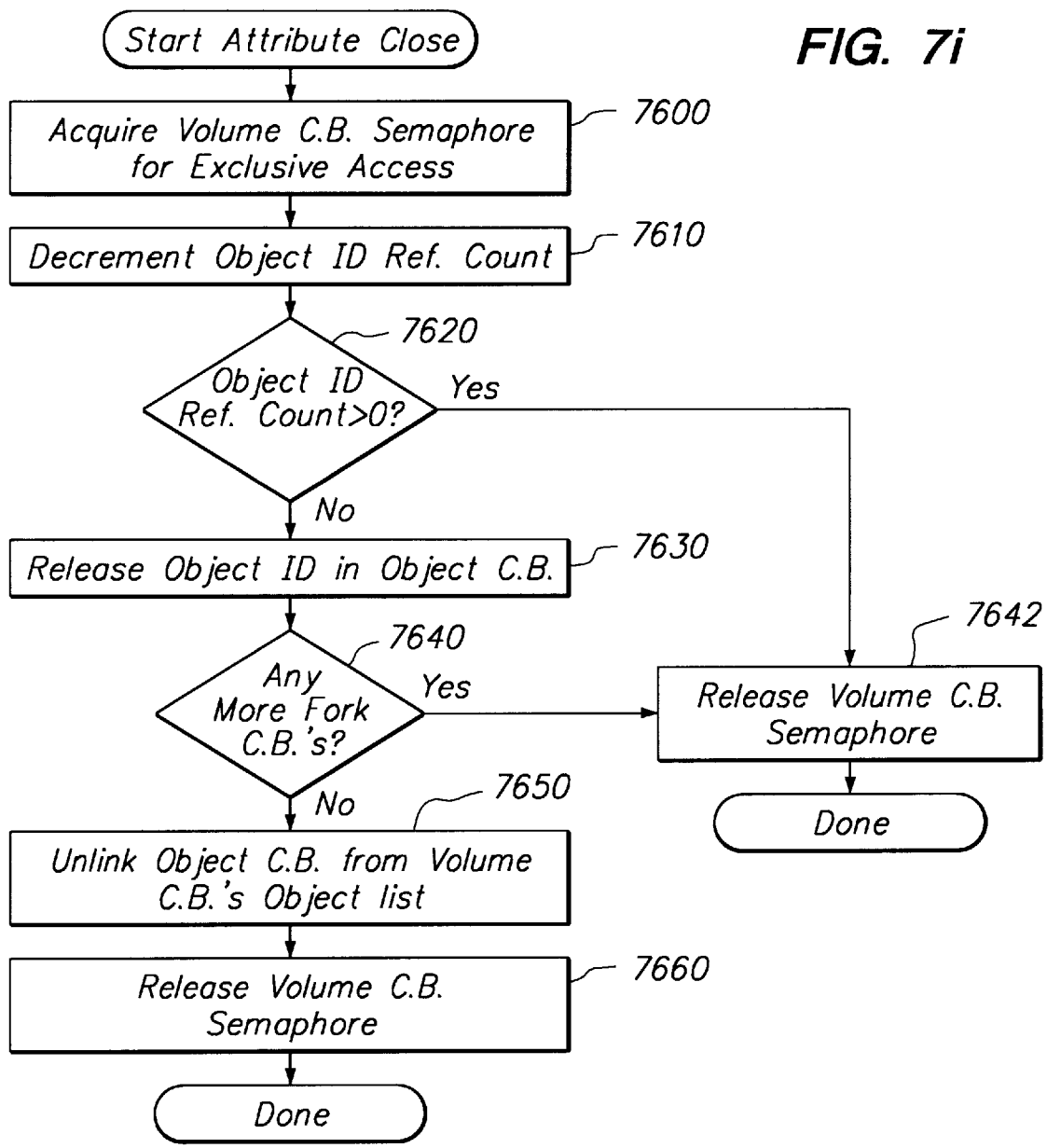
Figure 7J:
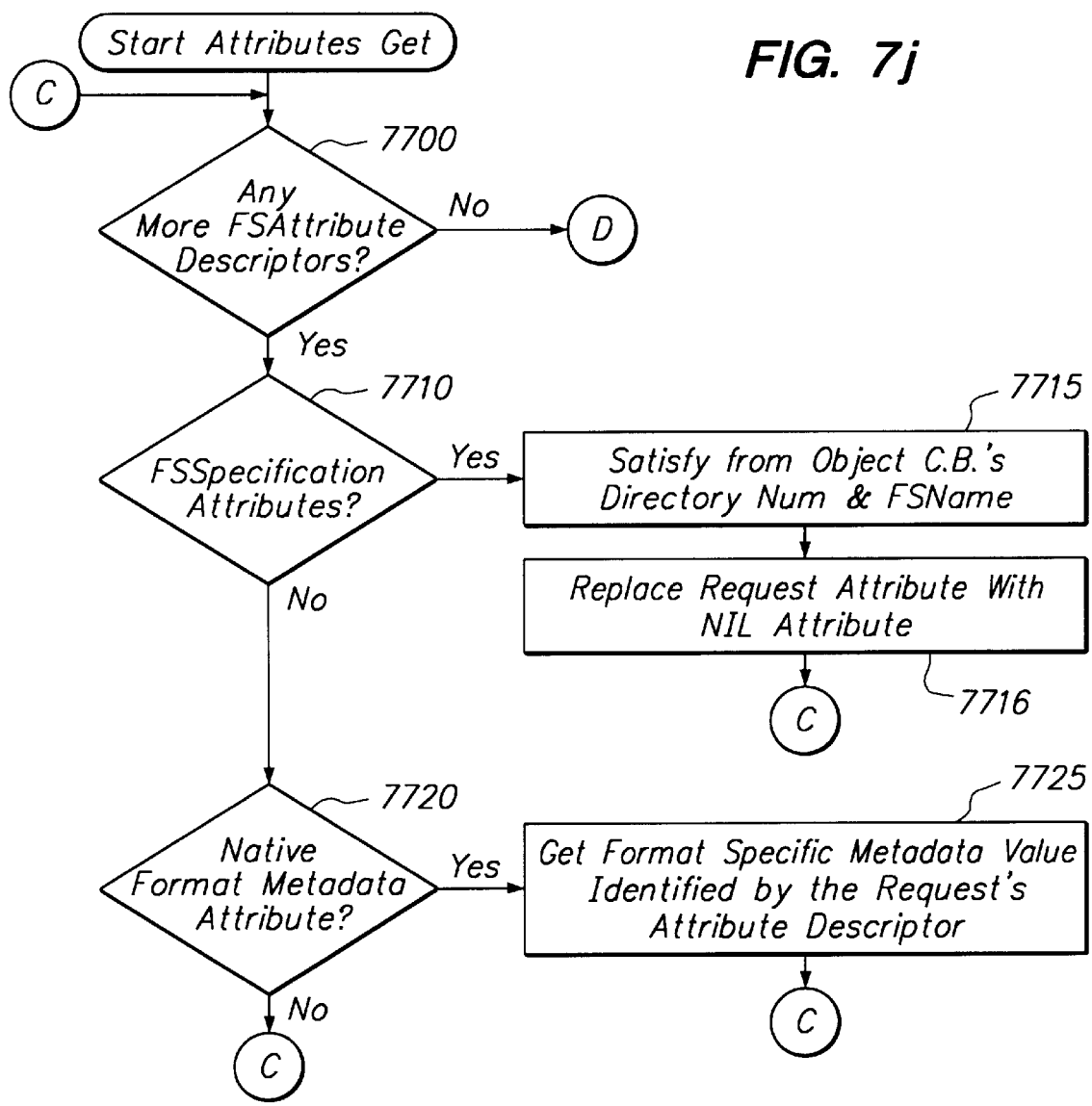
Figure 7K:
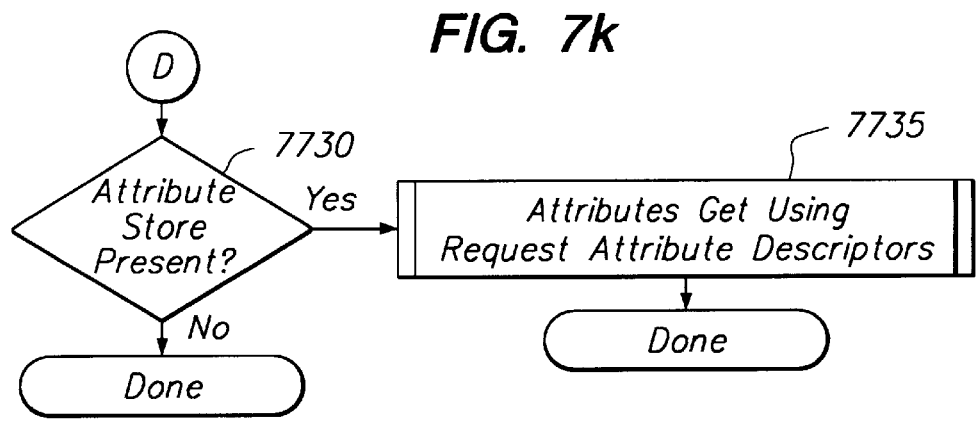
Figure 7L:
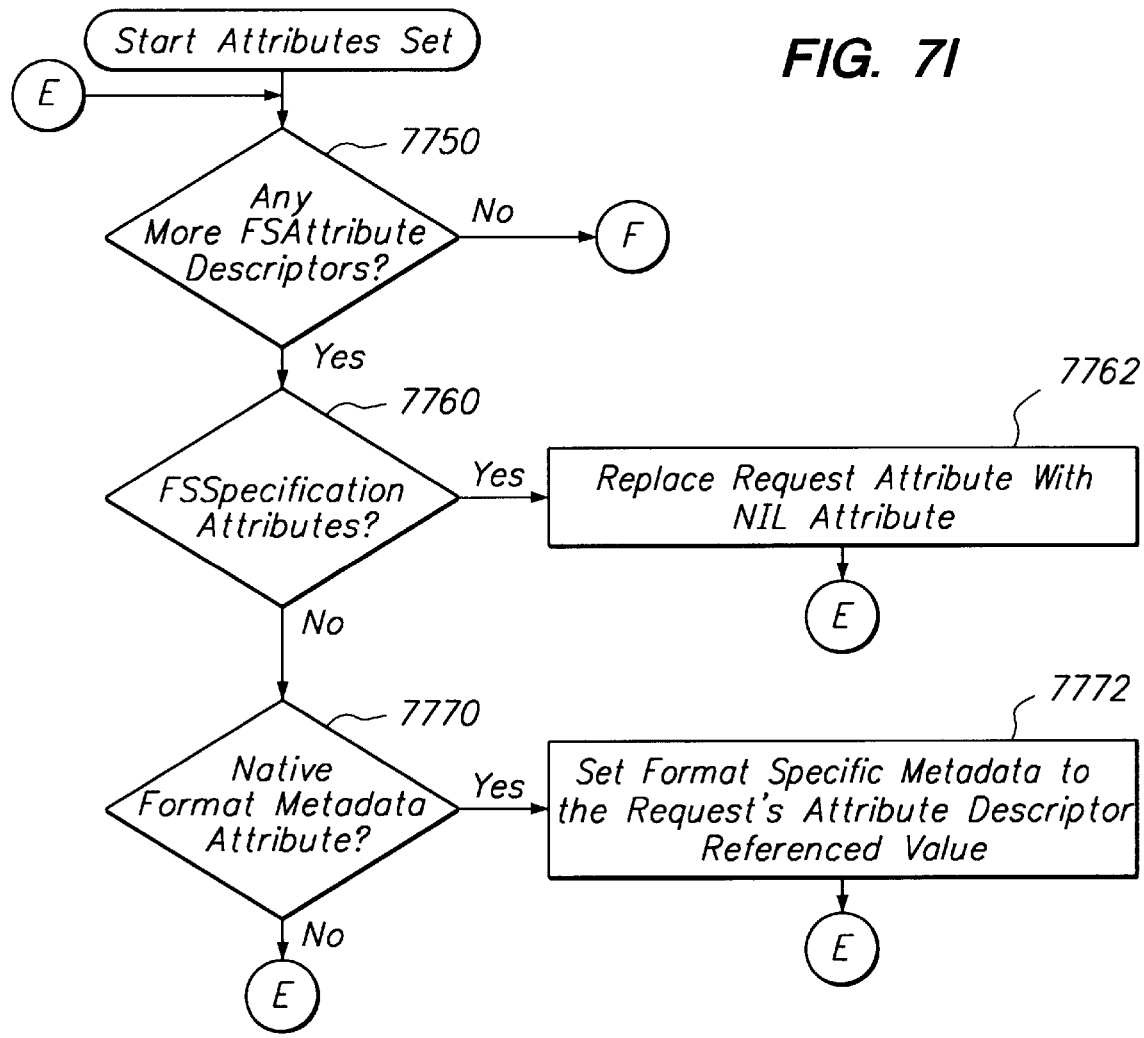
Figure 7M:
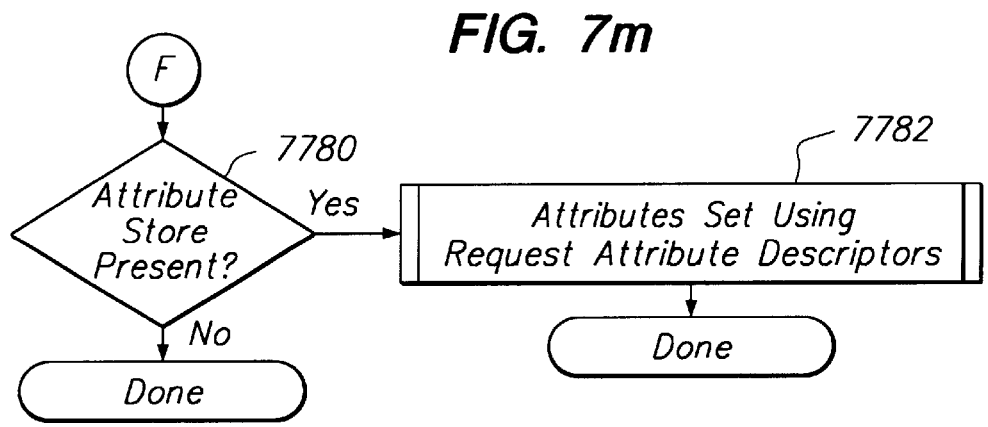
Figure 7N:
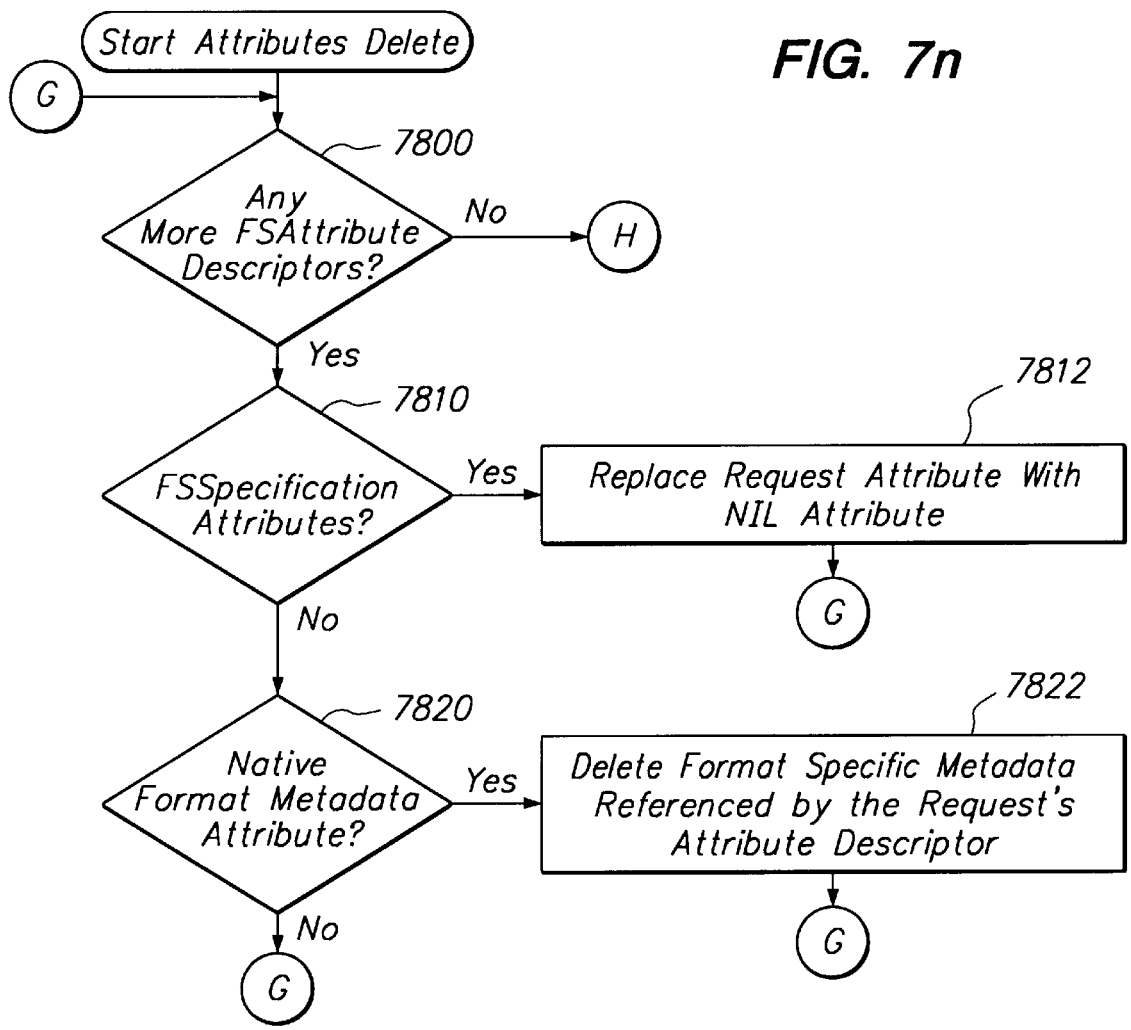
Figure 7O:
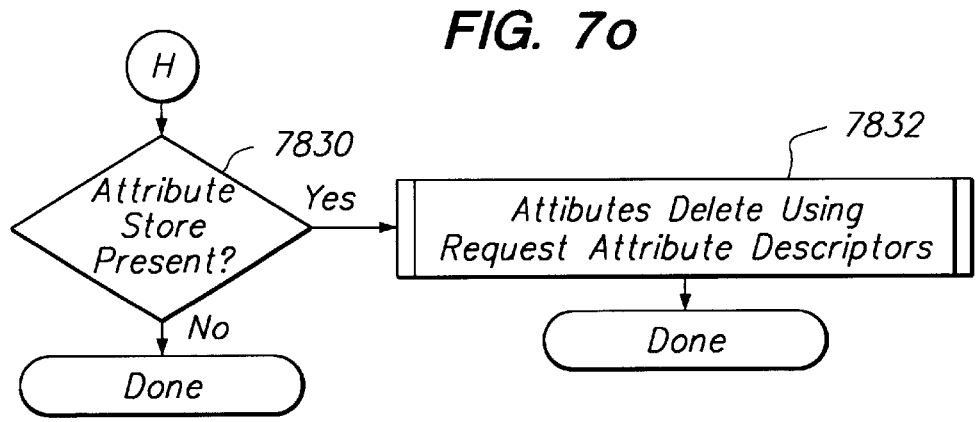
Figure 7P:
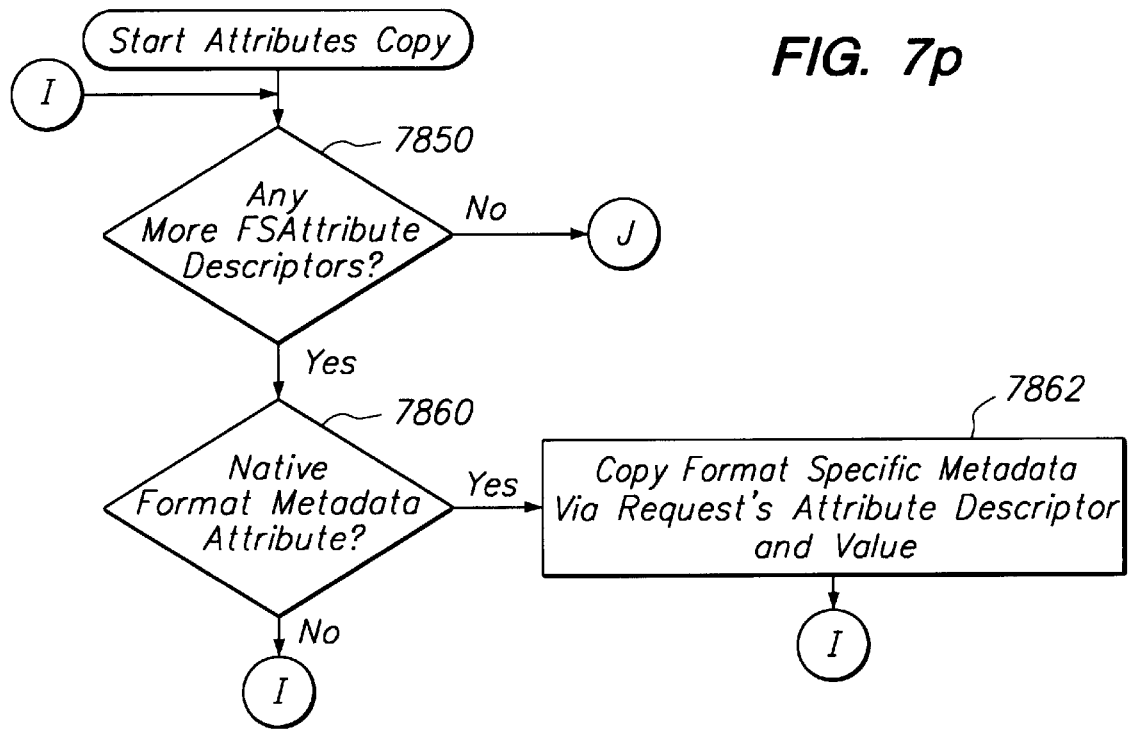
Figure 7Q:
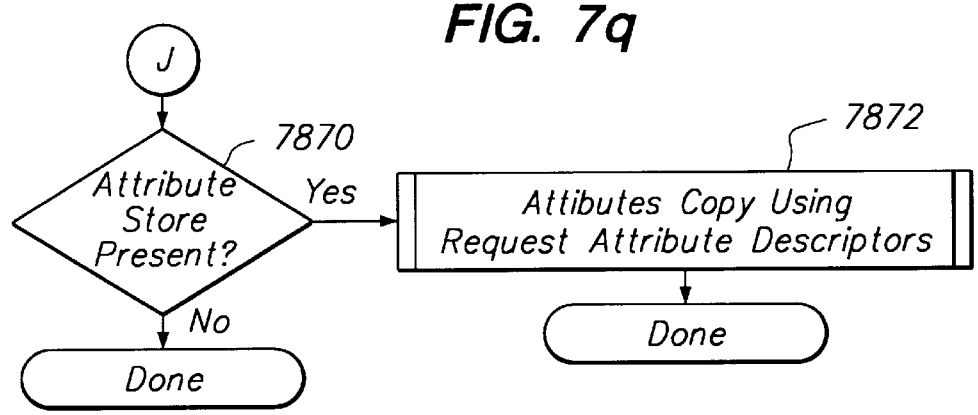
Figure 7R:
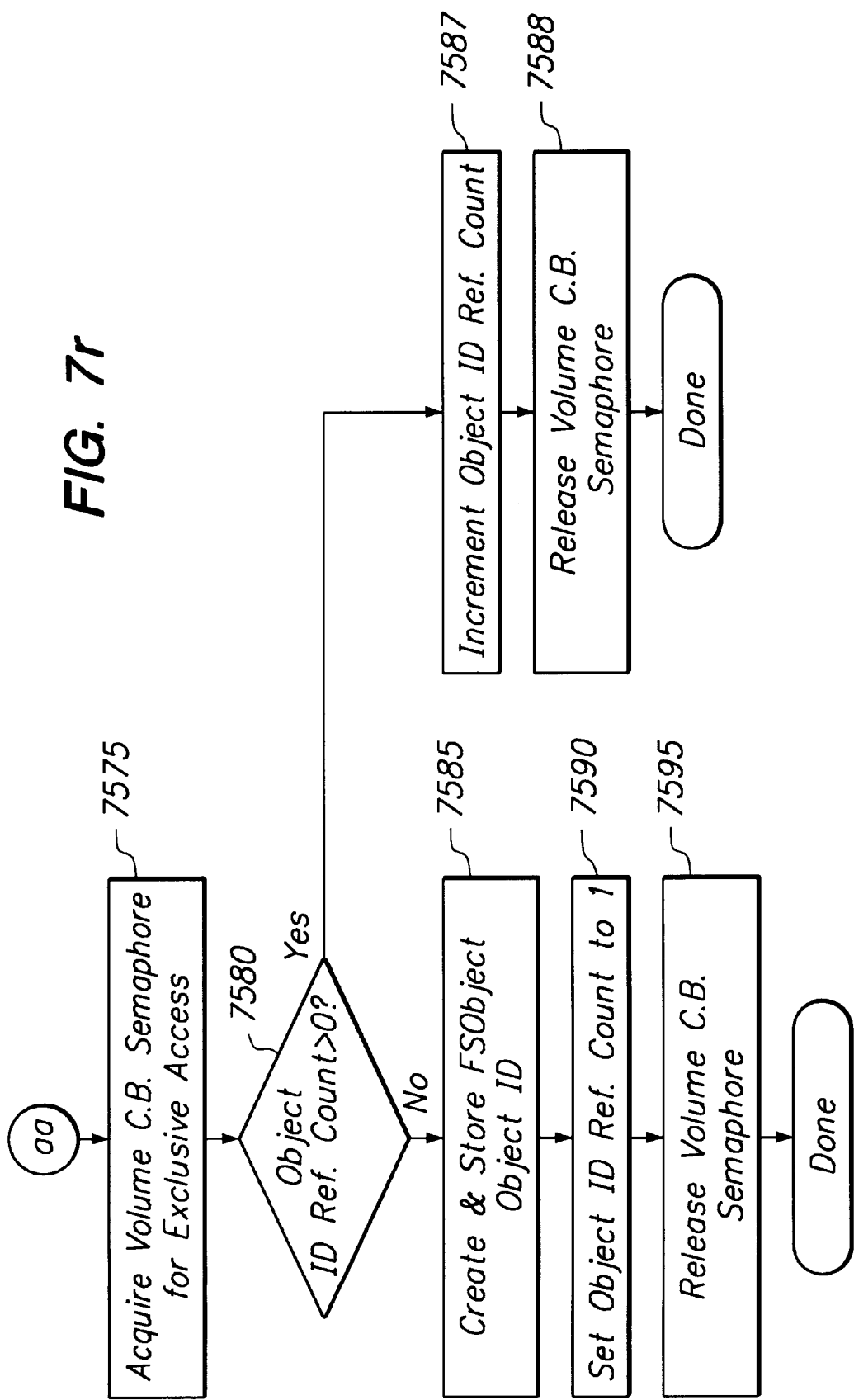

FIGS. 7*a* through 7*r* are flowcharts illustrating the process by which a format agent maintains its metadata according to one embodiment of the present invention. FIGS. 7*a* through 7*r* refer to the control block constructs illustrated in FIG. 3*a*. The remainder of the functions provided by the format agents, such as how an agent accesses the storage media organized in its format, will vary from agent to agent. The implementation of such functions is within the skill of the ordinarily skilled artisan once in possession of the present disclosure.

FIG. 7*a* illustrates the process by which a volume control block is created in the dispatcher control store 340 in response to a mount request according to one embodiment of the present invention. First, a volume control block is created with room for private fields (step 7100). The private and public fields of the volume control block are filled in at step 7110. In one embodiment, private fields are those known only to the format agent, while public fields are fields which are required by the file manager. An exclusive path open request is issued for the attribute store forks (step 7120). The detail of the receipt of this request is shown in FIGS. 7*b* and 7*c*. An attribute store instantiate request is issued at step 7130. The detail of the servicing of this request is shown in more detail in FIGS. 12*a* and 12*c*.

The attribute store path objects are stored in the volume control block at step 7140. The agent control block semaphore is acquired for exclusive access (step 7150), and the volume control block is linked onto the agent control block's volume list (step 7160). The agent semaphore is then released (step 7170), and the format agent returns to the dispatcher.

FIGS. 7*b* and 7*c* illustrate the process by which a path control block is created in the dispatcher control store 340 in response to a path open request according to one embodiment of the present invention. First, a path control block is allocated with room for private fields (step 7200). The private and public fields of the path control block are filled in (step 7205).

A determination is made at step 7210 whether a fork control block for the current fork being opened exists. If a fork control block already exists, the volume control block semaphore for the volume on which the object exists is acquired for exclusive access (step 7211). The path control block is linked onto the fork control block's path list (step 7212), and the volume control block semaphore is released (step 7213). The process then ends.

If a fork control block does not exist at step 7210, a fork control block is created with room for private fields (step 7215). The private and public fields of the fork control block are filled in (step 7220), and the path control block is linked onto the fork control block's path list (step 7225). The process then proceeds to A in FIG. 7*c*.

Referring now to FIG. 7*c*, a determination is made whether an object control block exists for the FSObject object being processed (step 7230). If an object control block exists, the volume control block semaphore is acquired for exclusive access (step 7231). The fork control block is linked onto the object control block's fork list (step 7232), and the volume control block semaphore is released (step 7233). The process then ends.

If an object control block for the current object does not exist at step 7230, an object control block is created with room for private fields (step 7235). The private and public fields of the object control block are filled in (step 7240), and the fork control block is linked onto the object control block's fork list (step 7245). The volume control block semaphore is acquired for exclusive access (step 7250). The object control block is linked onto the volume control block's object list (step 7255), and the volume control block semaphore is released (step 7260). The process then ends.

FIGS. 7d and 7e illustrate the process by which a path control block is removed from the dispatcher control store 340 in response to a close path request according to one embodiment of the present invention. The volume control block semaphore is acquired for exclusive access (step 7300). The data in the path control block is flushed (that is, data stored in the path control block is written to the storage media) at step 7305. The path control block is unlinked from the fork control block's path list (step 7310). At step 7320, a determination is made whether there are any more path control blocks for this fork. If there are more path control blocks, the volume control block semaphore is released (step 7332) to allow the other path control blocks to remain open, and the process ends.

If there are no more path control blocks, at step 7330 the process proceeds back up the hierarchy (see FIG. 3a). Accordingly, the data is flushed in the fork control block (step 7335), and the fork control block is unlinked from the object control block's fork list (step 7340). The process then proceeds to B in FIG. 7e.

Referring to FIG. 7e, a determination is made whether there are any more fork control blocks for the object being processed (step 7345). If there are no more fork control blocks, a determination is made whether the FSObject ID reference count is greater than zero (step 7350). If the FSObject Object ID reference count is greater than zero, or if at step 7345 it is determined that there are more fork control blocks, the volume control block semaphore is released (step 7352) to allow the other fork control blocks to remain open, and the process ends.

If the FSObject Object ID reference count is not determined to be greater than zero at step 7350, and there are no more fork control blocks, the process proceeds back up the hierarchy (see FIG. 3a). Accordingly, the data is flushed in the object control block (step 7355), the object control block is unlinked from the volume control block's object list (step 7360), and the volume control block semaphore is released (step 7365). The process then ends.

FIGS. 7f and 7g illustrate the process by which a volume control block is removed from the dispatcher control store 340 in response to an unmount request according to one embodiment of the present invention. First, the volume control block semaphore is acquired for exclusive access (step 7400). At step 7405, a determination is made whether there are any object control blocks for this volume. If there are object control blocks, a determination is made whether the object control blocks are for volume control block attribute store path objects only (step 7406). That is, it is determined whether the only object control blocks are those for the FSAttribute store's files. This is done by comparing each object control block's FSObject ID to the FSAttribute Store FSObject ID's kept in the volume control block (FIG. 3e). If more than these two files are in use, the volume control block semaphore is released (step 7411), and the process fails.

If there are no object control blocks, or if the determination is made at step 7406 that the object control blocks are for volume control block attribute store path objects only, the data is flushed from the volume control block (step 7410). At step 7415, a determination is made whether there are any iterator control blocks for this volume. If there are, each iterator is reset to refer to no entity (step 7420). In one embodiment this is accomplished by sending a message to the format agent which controls the volume which is being unmounted. If there are no iterator control blocks for this volume, and after the step 7420, the agent control block semaphore is acquired for exclusive access (step 7421). The volume control block is unlinked from the agent control block's volume list (step 7425), and the agent control block semaphore is released (step 7430). The process then proceeds to C in FIG. 7g.

Figure 12A:
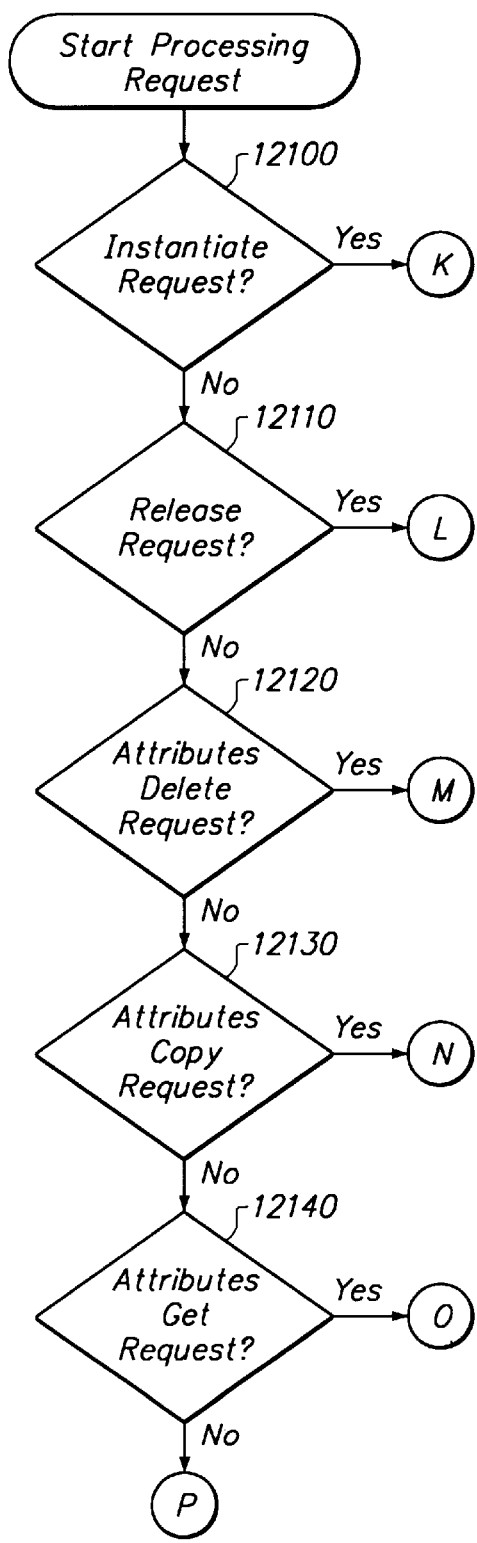
FIGS. 12a through 12m are flowcharts illustrating attribute store processing according to one embodiment of the present invention.

Referring to FIG. 7g, the volume object ID is released at step 7435. A request is issued to release the attribute store at step 7437. The detail of the servicing of this request is shown in FIGS. 12a and 12d. A close path request is issued for the attribute store path objects at step 7440. The detail of the receipt of this request is shown in FIGS. 7d and 7e. The data is flushed from the volume control block (step 7445), the volume control block semaphore is released (step 7450), and the volume control block is disposed of (step 7455). The process then ends.

FIG. 7h illustrates a process by which an object control block is created in the dispatcher control store 340 when a client issues an attribute open request. First, a determination is made whether an object control block already exists (step 7500). If, at step 7500, it is determined that an object control block does not exist, an object control block is created with room for private fields at step 7510. The private and public fields of the object control block are filled in (step 7520), and the FSObject ID reference count is set to one (step 7530). An FSObject Object ID is created and stored at step 7540. A volume control block semaphore is acquired for exclusive access (step 7550), and the object control block is linked to the volume control block's object list (step 7560). The volume control block semaphore is then released (step 7570), and the process ends.

If at step 7500 it is determined that an object control block does exist, the process proceeds to aa in FIG. 7r, discussed in more detail below.

FIG. 7i illustrates a process by which an object control block is deleted from the dispatcher control store 340 when a client issues an attribute close request. The volume control block semaphore is acquired for exclusive access at step 7600. The FSObject Object ID reference count is decremented (step 7610) to indicate that an FSObject Object ID is being deleted. Then, a determination is made whether the FSObject Object ID reference count is greater than zero (step 7620). If the FSObject Object ID reference count is not greater than zero, the FSObject ID is released in the object control block (step 7630), and a determination is made whether there are any more fork control blocks (step 7640). If, at step 7620, the FSObject Object ID reference count is greater than zero, indicating that there are still clients associated with this FSObject Object ID, or at step 7640 it is determined that there are more fork control blocks, the volume control block semaphore is released (step 7642), and the process ends. If, at step 7640, it is determined that there are no more fork control blocks, the object control block is unlinked from the volume control block's object list (step 7650), the volume control block semaphore is released (step 7660), and the process ends.

FIGS. 7j and 7k illustrate the process for getting an attribute value according to one embodiment of the present invention. A determination is made whether there are any more FSAttribute Descriptors in the request (step 7700), which are described, for example, with reference to FIG. 9*d* below. If there are more FSAttribute Descriptors, a determination is made whether a FSAttribute Descriptor references any FSSpecification Attributes (step 7710), which are described, for example, with reference to FIG. 9*b* below as containing a Directory Num and an FSName. If there are FSSpecification Attributes referenced in an FSAttribute Descriptor, the request is satisfied from the object control block's Directory Num and FSName (step 7715). Then, the request's attribute is replaced with a NIL attribute (step 7716). The process then loops back up to C and step 7700.

If, at step 7710, it is determined that the FSAttribute does not reference any FSSpecification Attributes, a determination is made whether the requested attribute is contained in the native format-specific metadata of the volume managed by the format agent (step 7720). If not, the process loops back up to C and step 7700. If the requested attribute is contained in the native format-specific metadata, the format-specific metadata identified by the FSAttribute Descriptor is retrieved using the request's attribute descriptor (step 7725). Then, the process loops back up to C and step 7700. When, at step 7700, it is determined that there are not any more FSAttribute Descriptors in the request, the process proceeds to D in FIG. 7*k*. As shown in FIG. 7*k*, a determination is made whether an attribute store is present at step 7730. That is, a determination is made whether an Attribute Store Object as shown in FIG. 3*e* has been instantiated by the mount request as shown in FIG. 7*a*. If an attribute store is not present, the process ends. If an attribute store is present, an attribute store attributes get request is issued to the attribute store using the request's attribute descriptor (step 7735), and the process ends. The detail of the servicing of this request is shown in FIGS. 12a, 12g, and 121.

FIGS. 7*l* and 7*m* illustrate the process for setting an attribute value according to one embodiment of the present invention. The process starts with a request to set an attribute. A determination is made whether there are any more FSAttribute Descriptors in the request at step 7750. If there is an FSAttribute Descriptor, a determination is made whether it references FSSpecification Attributes (step 7760). Because clients are not allowed to set the FSSpecification Attributes explicitly, if the FSAttribute Descriptor does reference the FSSpecification Attributes, the request's attribute is replaced with a NIL attribute (step 7762), and the process loops back to E and step 7750. If the FSAttribute Descriptor does not reference a FSSpecification Attribute, a determination is made whether the referenced attribute is contained in the native format-specific metadata of the volume managed by the format agent (step 7770). If the referenced attribute is contained in the native format metadata, the format specific metadata is set using the request's attribute value (7772), and the process loops back up to E and step 7750. If the referenced attribute is not contained in the native format-specific metadata, the process loops directly back up to E and step 7750.

If, at step 7750, it is determined that there are no more FSAttribute Descriptors in the request, the process proceeds to F in FIG. 7*m*. As shown in FIG. 7*m*, at step 7780, a determination is made whether an attribute store is present. If it is determined that the attribute store is present, an attribute store attribute set request is issued using the request's attribute descriptors (step 7782), and the process ends. The detail of the servicing of the request is illustrated in FIGS. 12*b*, 12*h*, 12*i*, and 12*m*. If it is determined that an attribute store is not present, the process ends.

FIGS. 7*n* and 7*o* illustrate the process for deleting an attribute value according to one embodiment of the present invention. The process begins with a request to delete an attribute. A determination is made whether there are any more FSAttribute descriptors in the request (step 7800). If there is an FSAttribute Descriptor, a determination is made whether the FSAttribute Descriptor references any FSSpecification Attributes (step 7810). Because clients are not allowed to delete the FSSpecificaiton Attributes explicitly, if there are FSSpecification Attributes referenced in the FSAttribute Descriptor, the request's attribute is replaced with a NIL attribute (step 7812), and the process loops back up to G and step 7800. If the FSAttribute Descriptor does not reference any FSSpecification Attributes, a determination is made whether the referenced attribute is contained in the native format-specific metadata of the volume managed by the format agent (step 7820). If the referenced attribute is contained in the native format metadata, the format-specific metadata referenced by the request's FSAttribute Descriptor is deleted (7822), and the process loops back up to G and step 7800. If the attribute is not contained in the native format metadata, the process loops directly back up to G and step 7800.

If, at step 7800, it is determined that there are no more FSAttribute Descriptors in the request, the process proceeds to H in FIG. 7*o*. Referring to FIG. 7*o*, a determination is made whether an attribute store is present (step 7830). If it is determined that an attribute store is present, an attribute store attribute delete request is issued using the request's attribute descriptors (step 7832), and the process ends. The detail of the servicing of this request is shown in FIGS. 12*a* and 12*e*. If it is determined that the attribute store is not present, the process ends.

FIGS. 7*p* and 7*q* illustrate the process for copying an object and its associated attributes according to one embodiment of the present invention. The process starts with a request to copy an attribute. A determination is made whether there are any more FSAttribute Descriptors in the request (step 7850). If there are, a determination is made whether the referenced attribute is contained in the native format-specific metadata of the volume managed by the format agent (step 7860). If the attribute is contained in the native format-specific metadata, the format specific metadata is copied using the request's referenced attribute descriptor and value (7862), and the process loops back up to I and step 7850. If the attribute is not contained in the native format-specific metadata, the process loops directly back up to I and step 7850.

If, at step 7850, it is determined that there are no more FSAttribute Descriptors in the request, the process proceeds to J in FIG. 7*q*. Referring to FIG. 7*q*, a determination is made whether an attribute store is present (step 7870). If it is determined that an attribute store is present, an attribute store attributes copy request is issued using the request's attribute descriptors (step 7872), and the process ends. The detail of the servicing of this request is shown in FIGS. 12*a* and 12*f*. If it is determined that an attribute store is not present, the process ends.

If at step 7500 in FIG. 7*h* it is determined that an object control block exists, the attribute open process proceeds to aa in FIG. 7*r*. Referring to FIG. 7*r*, the volume control block semaphore is acquired for exclusive access (step 7575). The FSObject Object ID reference count is checked to determine if it is greater than zero (step 7580). If the FSObject Object ID reference count is greater than zero, the FSObject Object ID reference count is incremented (step 7587). The volume control block semaphore is then released (step 7588), and the process ends.

If, at step 7580, the FSObject Object ID reference count is not determined to be greater than zero, an FSObject Object ID is created and stored in the object control block at step 7585. The FSObject Object ID reference count is set to one (step 7590), the volume control block semaphore is released (step 7595), and the process ends.

REQUEST PROCESSING BY THE DISPATCHER

The main function of the dispatcher 300 is to route requests to the correct format agents 320. How the dispatcher does this depends on the type of request; but there are some general rules which cover most cases as follows.

1) If the request is directed at a specific volume, object, or fork, part of the specification for that volume, object, or fork is the Volume Object ID for the volume on which the entity exists. The message is sent to that Object ID. Associated with that Object ID is a pointer to the appropriate control block. The dispatcher gets that pointer, and from that control block, uses the agent control block pointer to get to the agent control block which has the Object ID for the format agent. It can then forward the message to that format agent. These kinds of requests include ObjectCreate, Delete, PathOpen, VolumeFlush.

2a) If the request is directed at a specific access path or an iterator, the message is sent to the ObjectID for that access path or iterator. Associated with that ObjectID is a pointer to the appropriate path control block or iterator control block. The dispatcher gets that pointer, and from that control block, uses the agent control block pointer to get to the agent control block which has the ObjectID for the format agent. It can then forward the message to that format agent. These kinds of requests include Pathname Resolve for Access Paths, and Iterate for Iterators.

2b) If the request is directed to one of a volume's FSObjects, the message is sent to that FSObject ObjectID. Associated with FSObject ObjectID is a pointer to the appropriate object control block. The dispatcher gets that pointer, and from that object control block, uses the volume control block pointer to get to the volume control block. The dispatcher then uses the volume control block's agent control block pointer to get to the agent control block which has the FSObject ObjectID for the format agent. It can then forward the message to that format agent. These kinds of requests include Attribute Open, Attribute Close, Attribute Get, and Attribute Set.

3) If the request involves more than one volume (and therefore may involve more than one volume format and more than one format agent), the message is directed to the file manager object's ObjectID. The dispatcher then breaks the request down into parts which involve only one format agent and sends those messages to the appropriate format agents. For example, a FileCopy request includes a specification of the existing file and the new file to be created. These specifications include the Volume Object ID's for the volumes involved. From that, the ObjectID for the format agent can be derived (see case 1 above). The dispatcher then sends Read requests to the format agent which owns the existing file, and Write requests to the format agent which owns the new file. These kinds of requests include FileCopyRename and FileMoveRename.

4) If the request does not involve any persistent file system structures but instead involves internal file manager data, the request is sent to the file manager object's ObjectID, and the dispatcher is able to resolve the request without forwarding it to any format agent. These kinds of requests include SetCurrentDirectory and GetFileManagerVersion.

Most kinds of requests fall into one of the previous four categories. There are however two requests which are special cases and are handled by special rules, Mount and PathNameResolve. Preferably, all of these kinds of requests are sent to the file manager object's ObjectID.

5a) Prior to mounting, the format of the volume is unknown, and therefore the mount request cannot be directed at a specific format agent yet. Instead, the dispatcher sends a message to each format agent asking if a volume can be mounted. The dispatcher then selects the format agent which says yes and forwards the mount message to it.

5b) Many implementations of file managers have ways of specifying volumes or objects which are indirect and therefore may not include the Volume Object ID of the volume on which the entity exists. In one embodiment, this involves providing a partial or relative pathname specification (one which specifies a base entity, and then a route through the file system to get to the target). To resolve this, the dispatcher must parse the partial pathname, and use this information to determine the proper specification for the entity. The dispatcher may need to send requests to the format agents to determine the parent directories of entities involved in the path and to determine if they are the root directories on the volume.

Figure 8A:
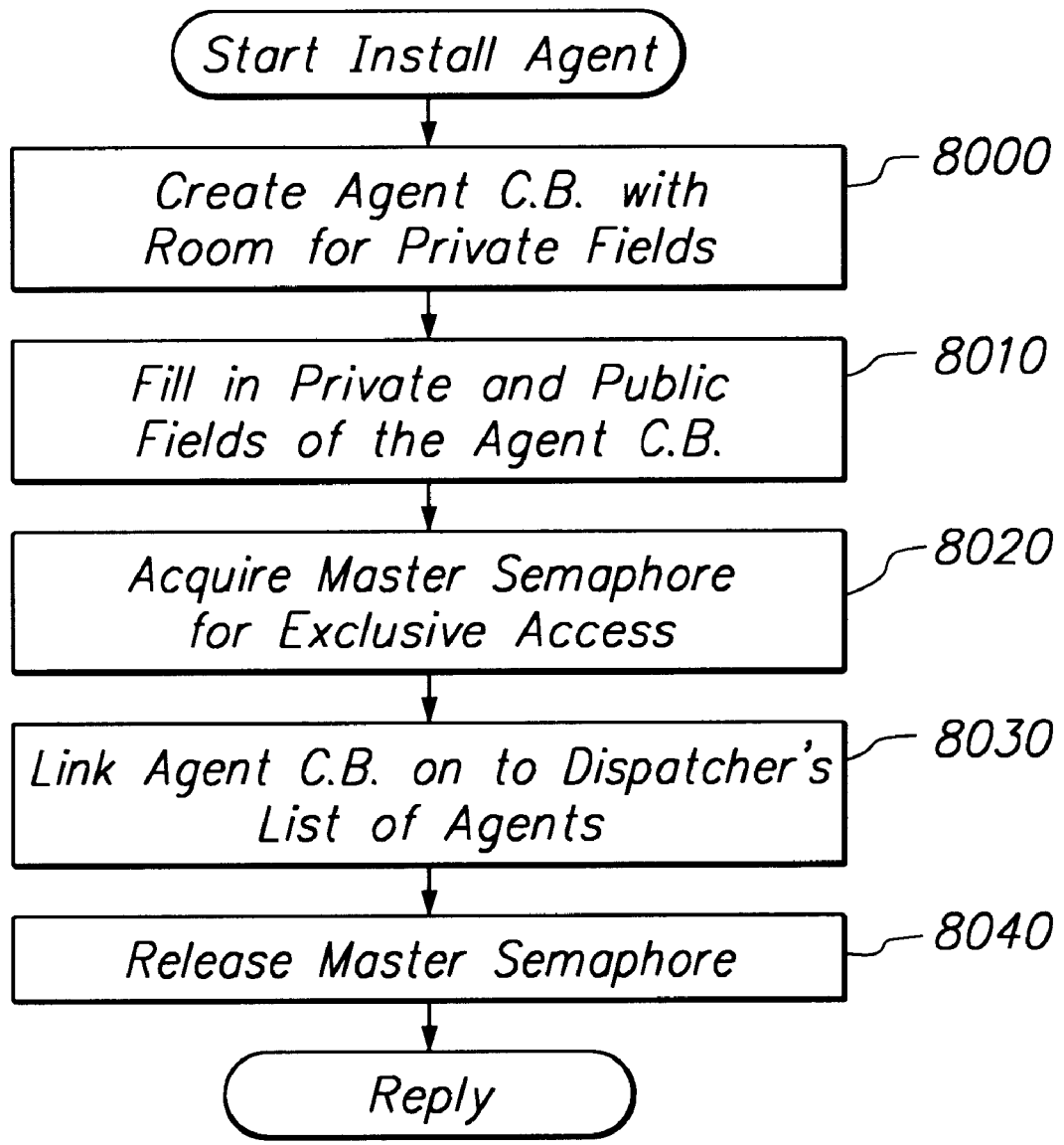
FIGS. 8a through 8n are flowcharts illustrating dispatcher processing according to one embodiment of the present invention.

FIGS. 8*a* through 8*n* are flowcharts illustrating exemplary dispatcher processing according to one embodiment of the present invention.

FIG. 8*a* illustrates the process by which the dispatcher 300 installs a new agent. An agent control block is created with room for private fields (step 8000). The private and public fields of the agent control block are filled in (step 8010). The master semaphore is acquired for exclusive access (step 8020). The agent control block is linked onto the dispatcher's list of agents (step 8030). The master semaphore is then released (step 8040), and the dispatcher replies to the client.

Figure 8B:
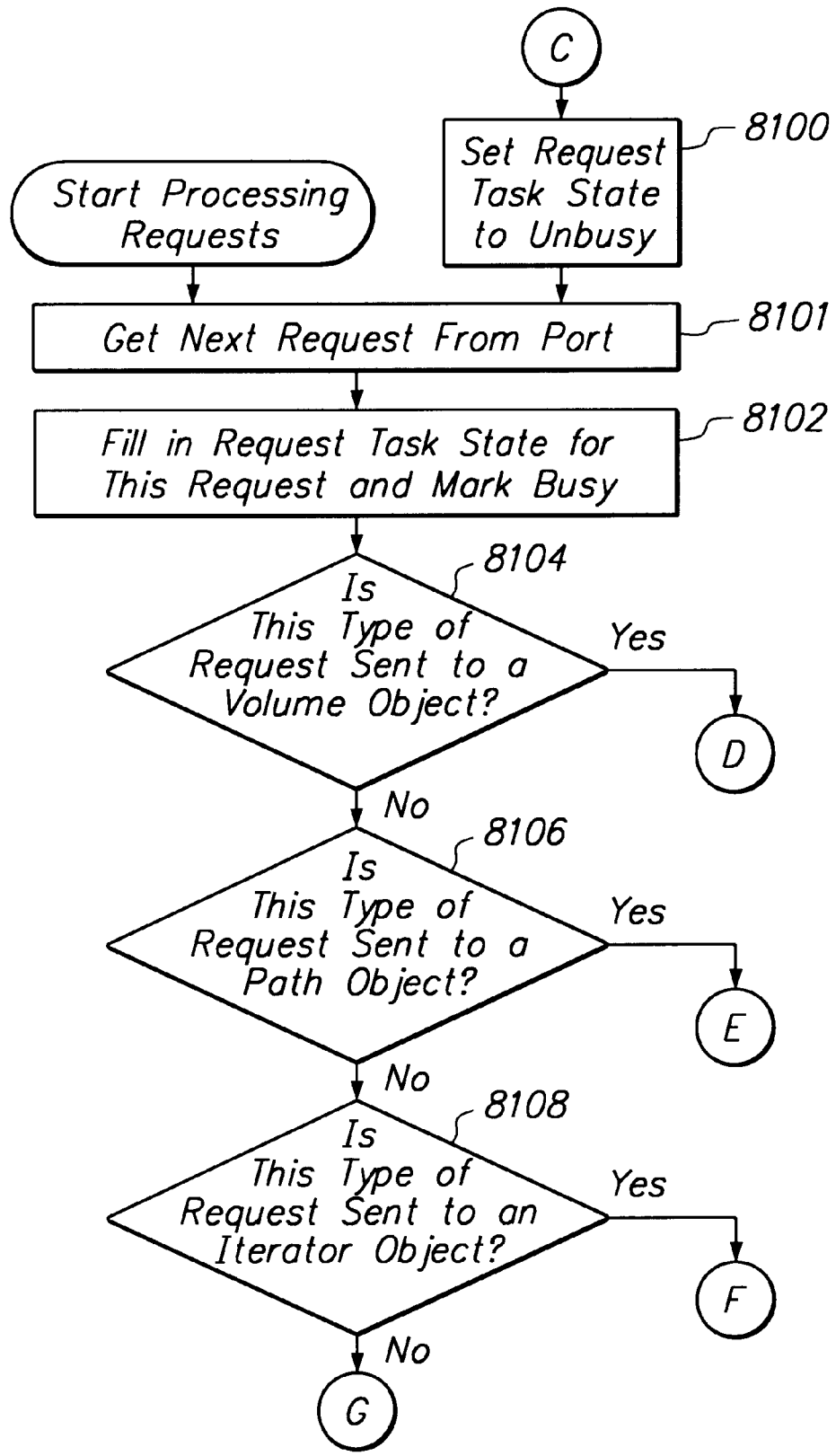
Figure 8C:
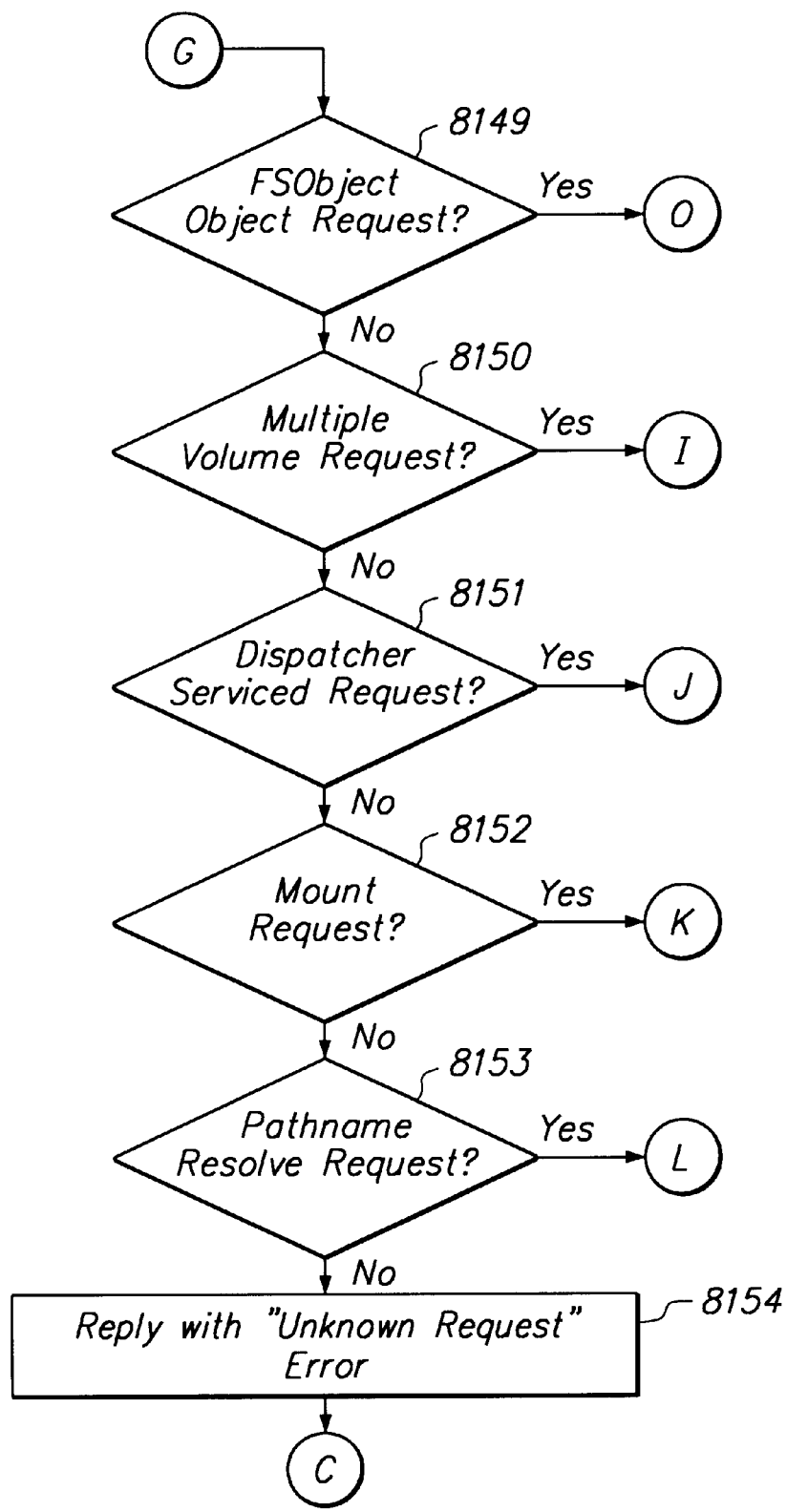

FIG. 8*b* illustrates the request processing procedures performed by the dispatcher 300 according to one embodiment of the present invention. At the start of the routine, the request next in line in the dispatch message port 3010 (FIG. 5*a*) is retrieved by the dispatcher 300 (step 8101). The request task state structure 3050 (FIG. 5*b*) is filled in for the request being processed (step 8102), and the flag field for that structure is set to indicate that the structure is busy and a request is currently being processed. At step 8104, a determination is made whether this type of request is one which is sent to a volume object. This test (and succeeding tests 8106, 8108, 8149, 8150, 8151, 8152, and 8153) includes an error checking capability (not shown) that also determines if the request was sent to the object of the correct type. If it was not, an appropriate error message is generated. If the request is not of a type sent to a volume object, a determination is made whether the request is of a type sent to a path object (step 8106). If not, a determination is made as to whether the request is of a type sent to an iterator object (step 8108). If not, a determination is made as to whether the request is of a type which is a FSObject object request (FIG. 8*c*, step 8149). If not, a determination is made as to whether the request is of a type which is a multiple volume request (step 8150). If not, a determination is made as to whether the request is of a type handled by the dispatcher alone (step 8151). If not, a determination is made as to whether the request is a mount request (step 8152). If not, a determination is made as to whether the request is a pathname resolve request (step 8153). If not, the dispatcher replies with an "unknown request" error (step 8154). The process then returns to C in FIG. 8*b*, sets the request task state flag to unbusy to indicate that a request is not being processed (step 8100), and gets the next request from the dispatch port (step 8101).

The determinations made at steps 8149, 8150, 8151, 8152, and 8153 are based on the content of the messages themselves. These messages are received by the dispatcher 300 at the file manager object FMO 3020.

If the request is of a type sent to a volume object at step 8104, the routine passes to D and step 8110 in FIG. 8*d*. In step 8110, the volume control block pointer from the volume object is retrieved. The agent control block pointer is retrieved from the volume control block (step 8111). In step 8112, common preprocessing is performed for the request. Preprocessing involves any operations which can be performed before the message is processed, and which is done the same way regardless of the individual implementation of the volume format, that is, independent of the file system format. According to one embodiment, this includes verifying the validity of a few of the fields in the message, filling in the fields in the trailer part of the message structure and mapping any large buffers the caller or interface module provided into the current address space.

In step 8113, the request is forwarded to the appropriate format agent using the ObjectID in the agent control block. This includes setting the forwarded flag in the request task state structure 3050 to indicate that the request has been forwarded. At step 8114, common post processing operations are performed for the requests. Post processing involves any operations which can be performed after the request is processed, and which are done the same way regardless of the individual implementation of the volume format, that is, independent of the file system format. This includes cleaning up any mappings which were done in the preprocessing step 8112, posting any events which occurred as a result of successfully processing the message, and collecting statistics about the performance of the file manager.

At step 8115, a determination is made whether the request was successful. If so, the dispatcher generates events appropriate for that request. The event manager which detects and handles these, and other, events is described, for example, in U.S. patent application Ser. No. 08/242,204 entitled, "Method and Apparatus for Distributing Information About Events in an Operating System" filed in the name of Steven J. Szymanski et al., Thomas E. Saulpaugh, and William J. Keenan on May 13, 1994, herein incorporated by reference. If the request was not successful, the dispatcher sends a reply to the originating interface module using the reply received from the format agent. The routine then returns to C in FIG. 8*b*.

If the request is of a type sent to a path object at step 8106, the routine passes to E and step 8120 in FIG. 8*e*. At step 8120, the volume control block pointer is retrieved from the path object. The agent control block pointer is retrieved from the path control block (step 8122). Steps 8122–8127 are the same as described above at steps 8112–8117 in FIG. 8*d* and so will not be repeated.

Figure 8F:
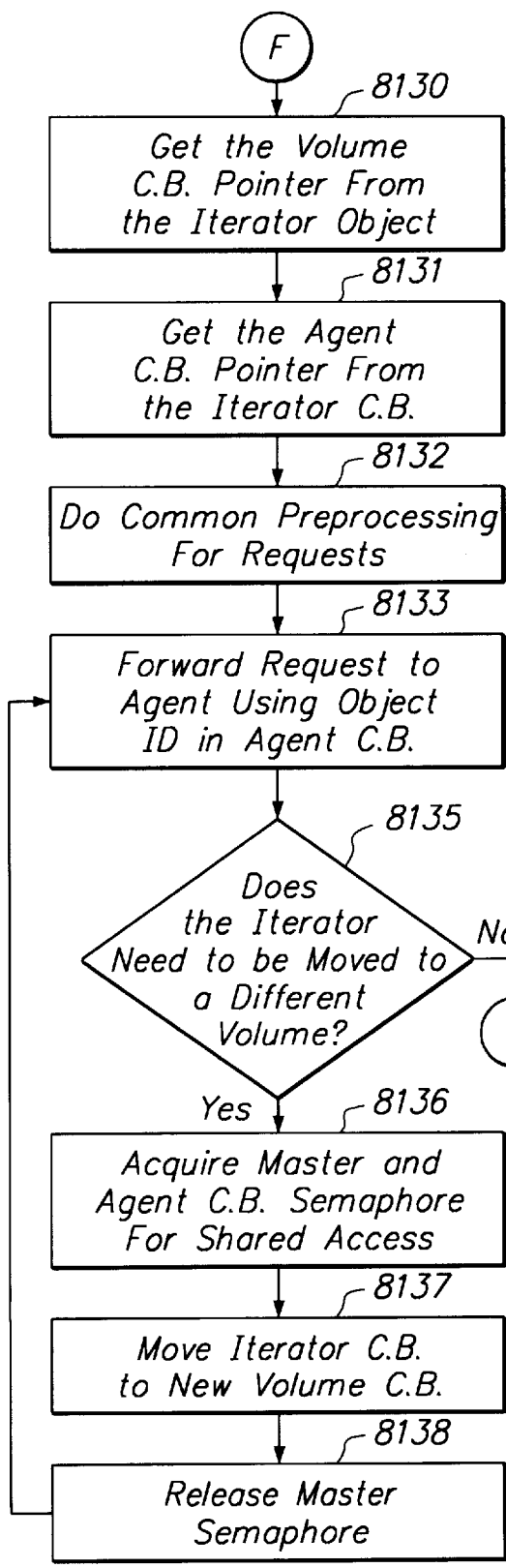

If the request is of a type sent to an iterator object at step 8108, the routine passes to F and step 8130 in FIG. 8*f*. The volume control block pointer is retrieved from the iterator object (step 8130), and the agent control block pointer is retrieved from the iterator control block (step 8131). At step 8132, the common preprocessing operations are performed for the request, and the request is forwarded to the agent (step 8133) as described above with respect to steps 8112 and 8113, respectively.

Figure 8G:
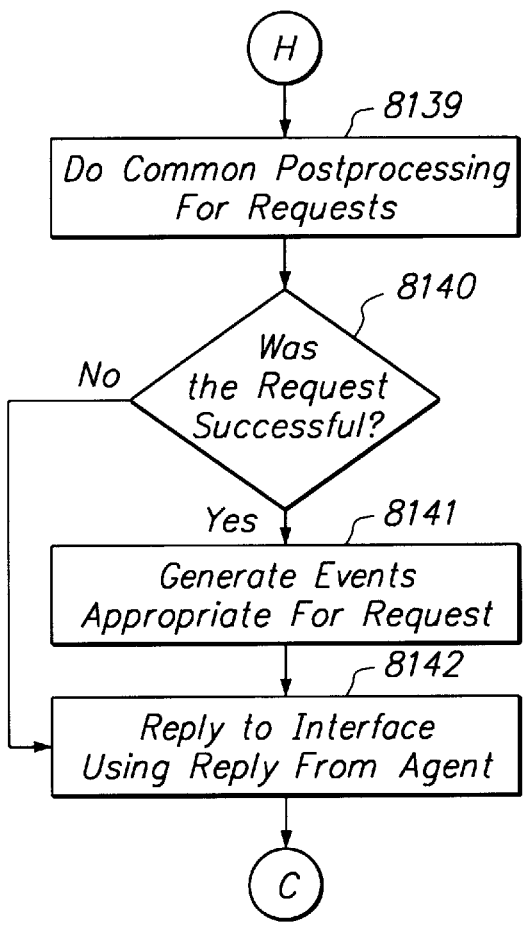

At step 8135, a determination is made whether the iterator needs to be moved to a different volume. If so, the master and the agent control block semaphores are acquired for shared access (step 8136), and the iterator control block is moved to the new volume control block (step 8137). In one embodiment this is accomplished by sending a message first to the format agent which controls the volume to which the iterator was pointing before being moved and then sending a message to the agent which controls the volume to which the iterator is pointing after it is moved. The master semaphore is then released (step 8138), and the request is forwarded at step 8133. If the iterator does not need to be moved at step 8135, the process proceeds to H, and the dispatcher performs steps 8139–8142 in FIG. 8*g* which are the same as steps 8114–8117, respectively, in FIG. 8*d*.

If the request is determined to be of the type sent to an FSObject object at step 8149, the routine passes to O and step 8220 in FIG. 8*n*. The volume control block pointer is retrieved from the FSObject object at step 8220. The agent control block pointer is retrieved from the FSObject object at step 8221. The common preprocessing operations are performed at step 8222. The request is forwarded to the agent using the Object ID in the agent control block at step 8223. The common postprocessing operations are performed at step 8224. At step 8225, a determination is made whether the request was successful. If so, events appropriate for the request are generated at step 8226. If the request was not successful, or once events appropriate for the request have been generated, a reply is sent to the interface using the reply from the agent (step 8227). The routine then returns to C in FIG. 8*b*.

Figure 8H:
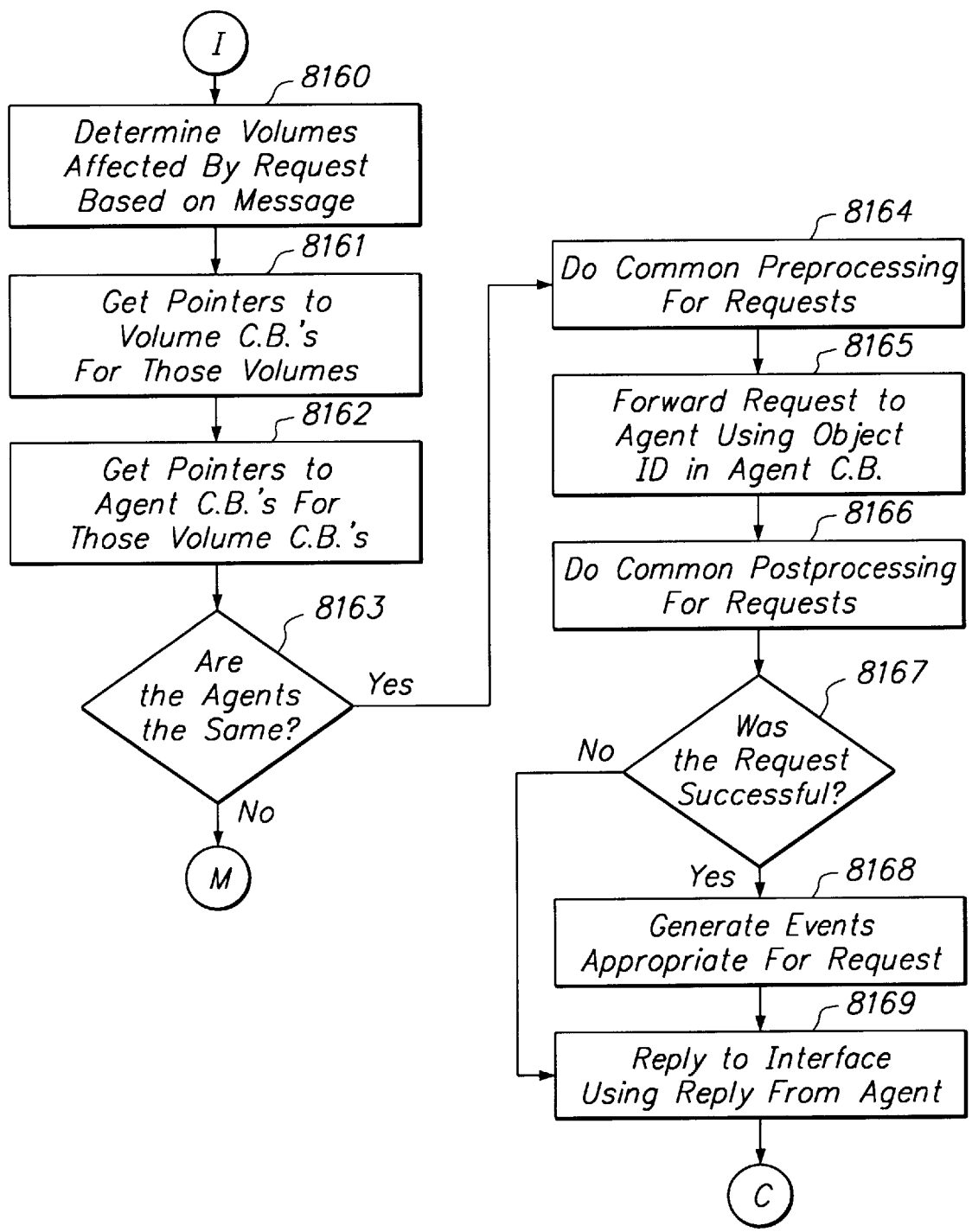

If the request is a multiple volume request at step 8150, the routine passes to I and step 8160 in FIG. 8*h*. The volumes which are affected by the request are determined based on the message received by the dispatcher (step 8160). The pointers to the volume control blocks for those volumes are retrieved (step 8161), and the pointers to the agent control blocks for those volume control blocks are retrieved (step 8162).

At step 8163, a determination is made whether the format agents required to access those volumes are the same. If so, steps 8164–8169 corresponding to steps 8112–8117 are performed.

Figure 8I:
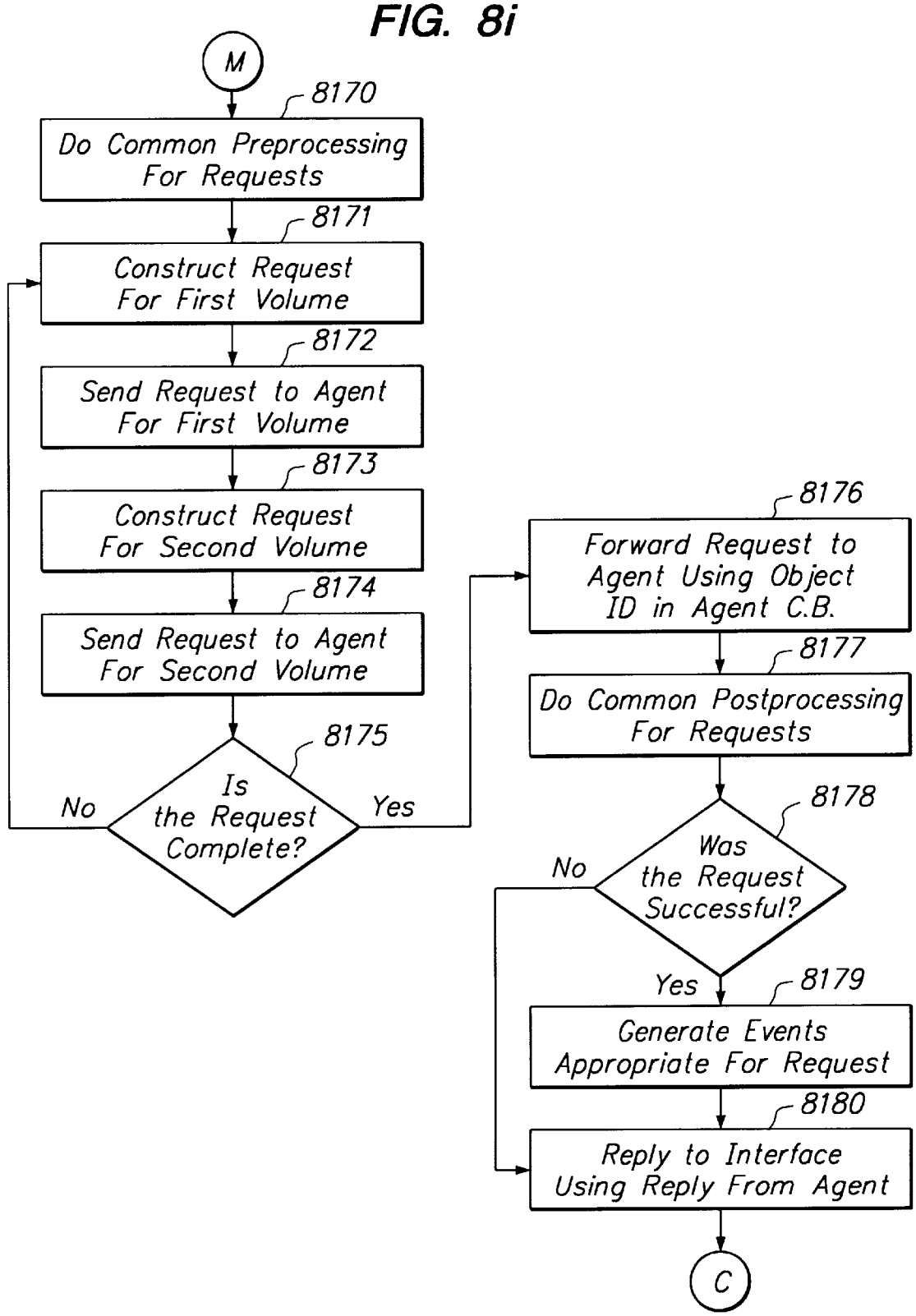

If the agents are not the same, the process passes to M and step 8170 in FIG. 8*i*. The common preprocessing operations are performed at step 8170. A request is constructed for the first volume (step 8171), the request is sent to the format agent for the first volume (step 8172), a request is constructed for the second volume (step 8173) and the request is sent to the format agent for the second volume (step 8174). At step 8175, a determination is made whether the request is complete. If not, the routine loops to step 8171. If the request is complete, steps 8176–8180 corresponding to steps 8165–8169 are performed.

If the request is of a type handled by the dispatcher alone at step 8151, the process passes to step 8181 in FIG. 8*j*. In particular, for certain requests, the dispatcher has available to it sufficient information to handle the request without receiving a reply from an agent. In this case, the preprocessing operations are performed (step 8181), and a reply is constructed for the message (step 8182). Steps 8183–8186 corresponding to steps 8114–8117 in FIG. 8*d* are performed.

Figure 8K:
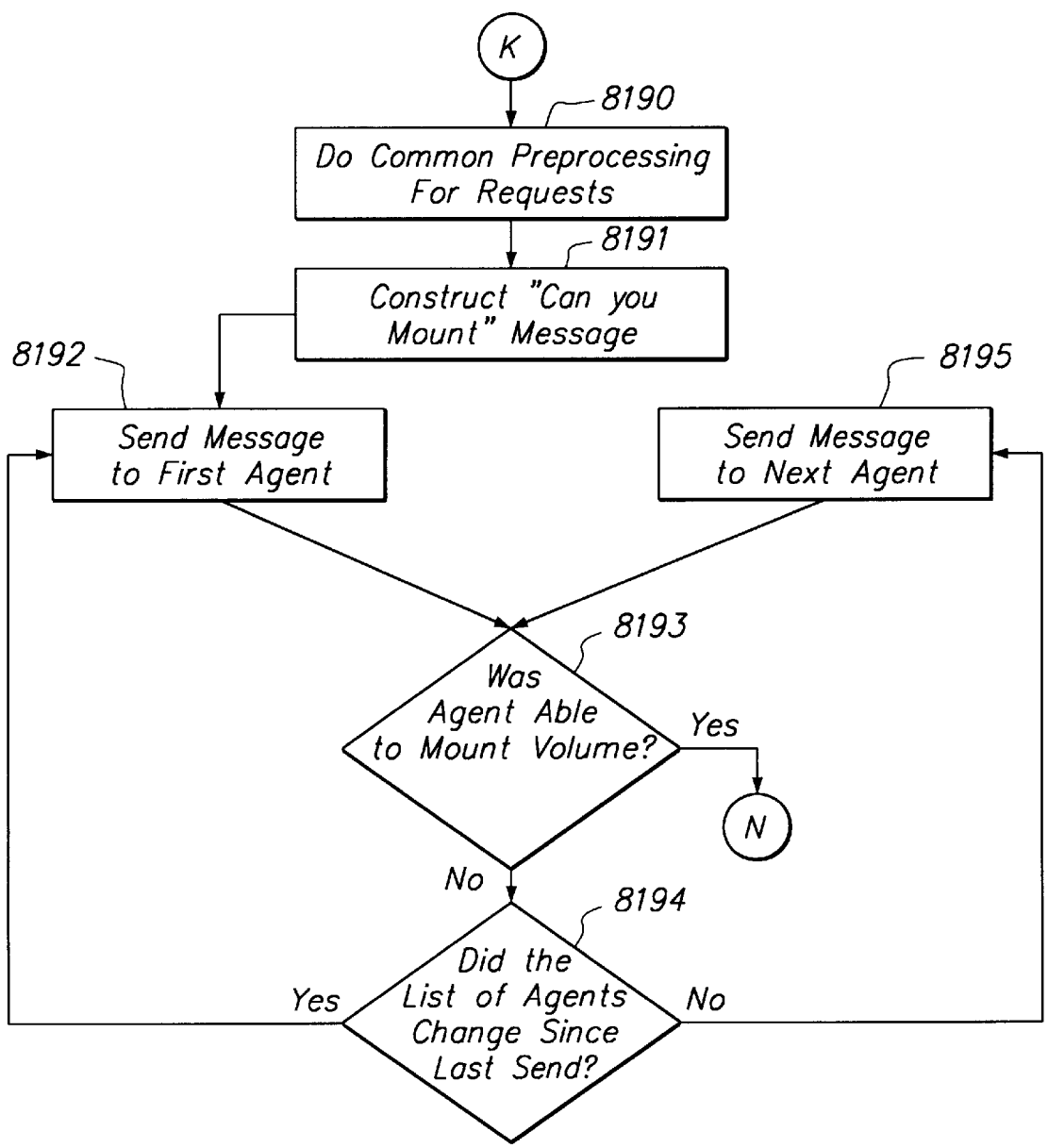

If the request is a mount request at step 8152, the routine passes to K and step 8190 in FIG. 8k. The common preprocessing operations are performed at step 8190 and a "can you mount?" message is constructed (step 8191) to be sent to the format agents. At step 8192, the message is sent to the first format agent. At step 8193, a determination is made as to whether the format agent was able to mount the volume. If not, a determination is made as to whether the list of agents changed since the last message was sent (step 8194). This test is to handle the rare situation that may arise if an agent has been removed or added during the time the dispatcher has been processing the request. If the determination at step 8193 is positive, the routine loops back to step 8192 to start the polling again. If not, the routine loops to step 8195 to send the message to the next agent.

If the agent was able to mount the volume at step 8193, the process proceeds to N in FIG. 8l, and step 8197 is executed. Steps 8197–8201 correspond to steps 8113–8117 in FIG. 8d.

Figure 8M:
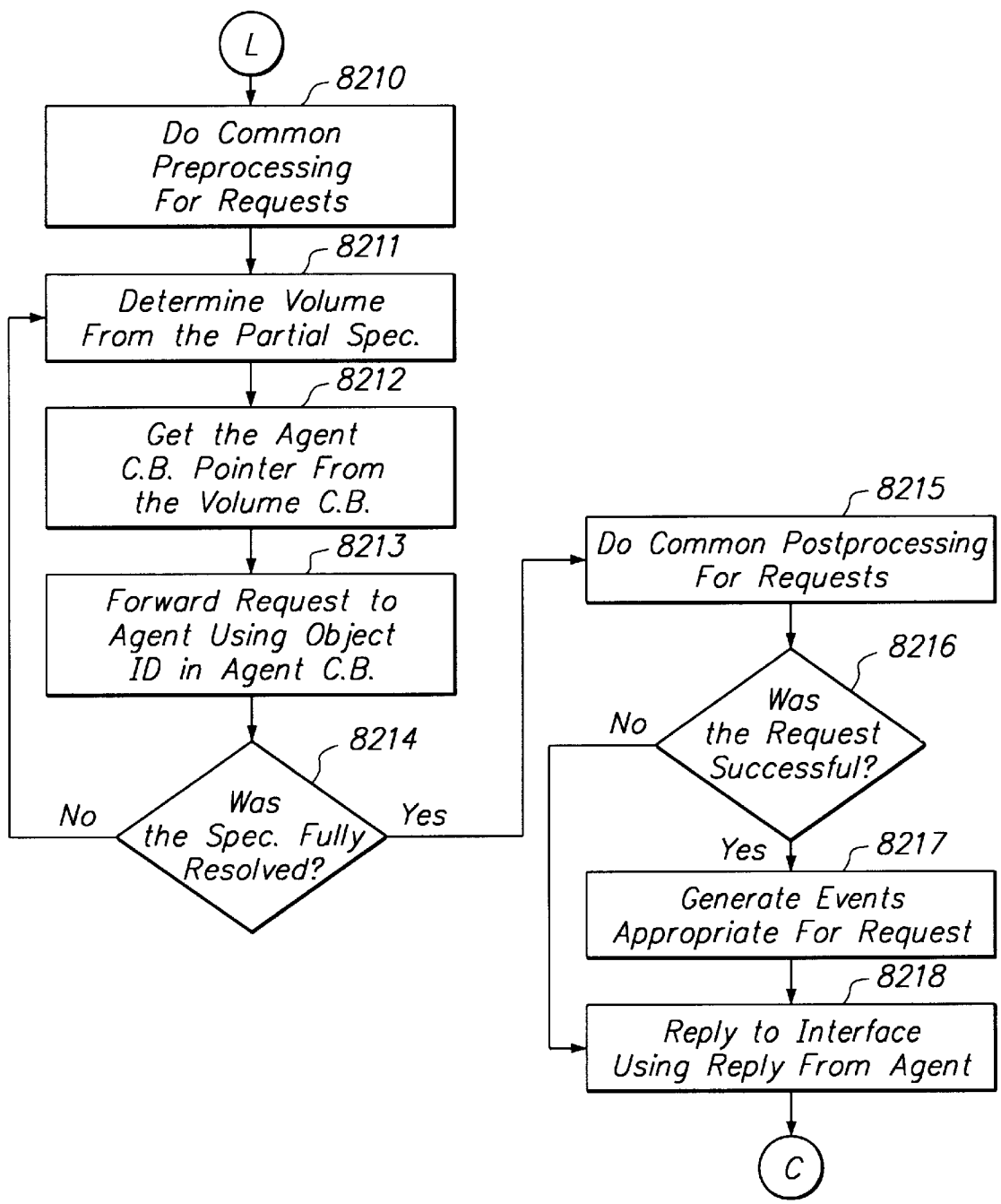

If the request is a resolve pathname request at step 8153, the routine passes to L and step 8210 in FIG. 8m. The common preprocessing operations are performed at step 8210. In the case of a resolve pathname, an incomplete, partial specification has been received by the dispatcher for the volume being accessed. The dispatcher determines a volume from the partial specification (step 8211). The agent control block is retrieved from the volume control block (step 8212) and the request is forwarded to the agent using the ObjectID in the agent control block (step 8213). At step 8214, a determination is made whether the agent was able to successfully resolve the specification to create a valid specification for that volume. If not, the routine loops to step 8211 for processing the next volume in the path which is determined from the specification returned in the reply from the format agent. If the specification was fully resolved by the agent, steps 8215–8218 corresponding to steps 8114–8117 in FIG. 8d are executed.

FORMAT AGENT METADATA PROCESSING

Figure 9A:
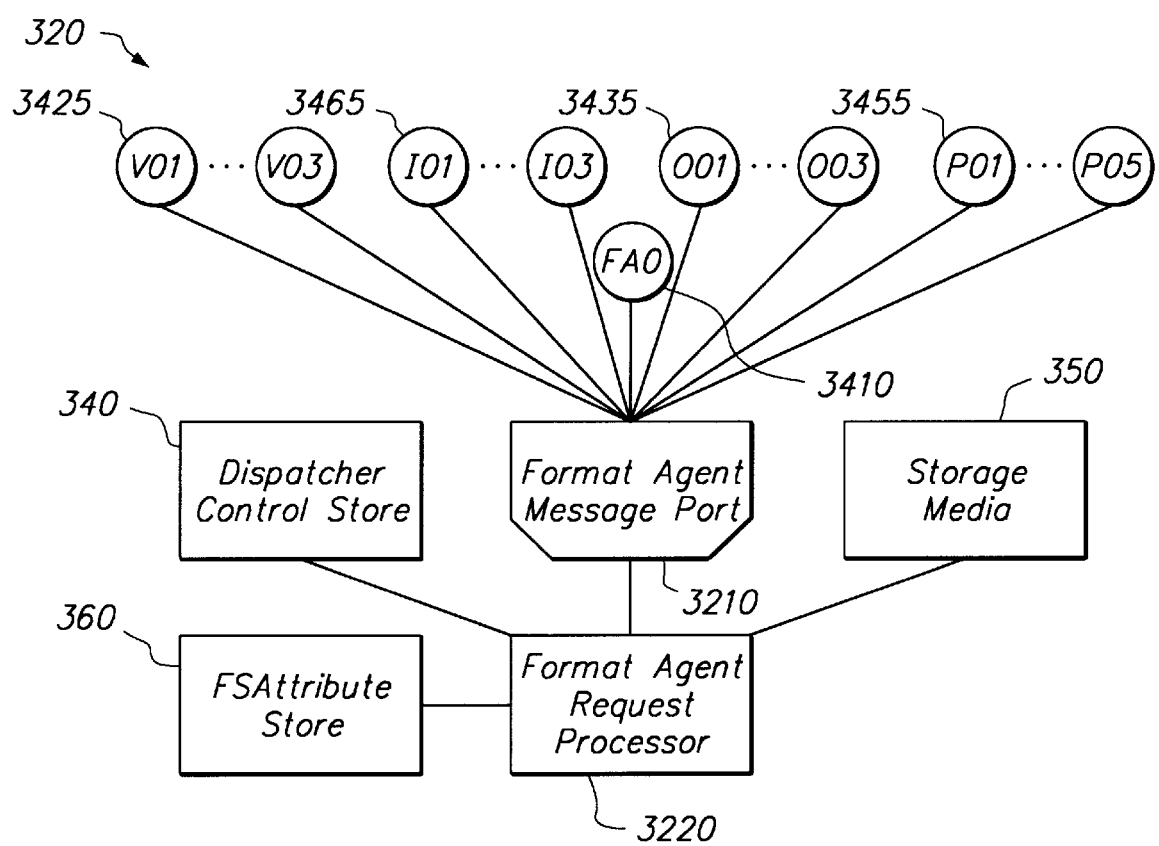
FIG. 9a is a block diagram of a format agent according to one embodiment of the present invention.

FIG. 9a is a block diagram of a format agent according to one embodiment of the present invention. The format agent 320 comprises two modules: the format agent request processor 3220 and the format agent message port 3210. The volume objects 3425, FSObject objects 3435, path objects 3455, and iterator objects 3465 are forwarded to the format agent message port 3210 by the dispatcher. The format agent message port 3210 also includes a format agent object (FAO) 3410 to receive requests not directed at a volume, object, path, or iterator.

According to one embodiment, the format agent request processing module 3220 has a plurality of threads of execution which are known as request processing tasks (RPT) which are used to actually process the dispatcher requests which are forwarded to a format agent. At any point in time, each of these tasks is either processing a request, or waiting for a new message to come into the format agent message port 3210. As each new request message comes in, the messaging system gives it to the next RPT which is waiting.

According to one embodiment, the format agent 320 receives requests from the format agent message port 3210. The format agent request processor 3220 services the requests using the dispatcher store 340, the storage media 350, and the FSAttribute store 360 as appropriate.

Figure 9B:
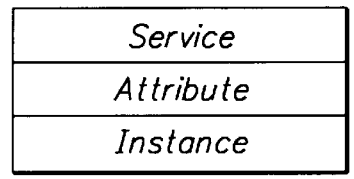
FIG. 9b illustrates a file system attribute structure according to one embodiment of the present invention.

FIG. 9b illustrates an exemplary structure of a file system attribute (FSAttribute) according to one embodiment of the present invention. The FSAttribute is included in the client's request. Referring to FIG. 9b, a FSAttribute includes a Service field, an Attribute field, and an Instance field. The Service field identifies the creator of the attributes. For example, the Service field may contain data indicating that the attribute was created by an outside vendor, such as Microsoft™ Corporation or its product Excel™. The Attribute field defines a group of discriminators, defined by the Service, that identify the attribute out of the set of attributes provided by the Service.

The Service field and the Attribute field describe a single piece of metadata. For example, for a color attribute, the Service field may identify the creator of the colors to be Apple, Inc., and the Attribute field may define the color to be red.

In order to provide multiple instances of an attribute, the FSAttribute also contains an Instance field. The Instance field indicates a particular instance of the attribute. Thus, for example, if the Service field identifies colors created by Apple, Inc., and the Attribute field defines the color to be red, the Instance field may identify a particular shade of red. Other FSAttributes defining an Apple created color red contain other instances indicating other shades of red. Thus, the Instance field in the FSAttribute makes it possible to have multiple instances of a particular attribute, each with its own ID and value.

To enable the file manager to provide different clients with different instances of a given FSAttribute, a method is provided for stating a request for a list of instances in a request's FSAttribute fields. The Service, Attribute, and Instance fields may contain zero or nonzero values. To access a list of Services, Attributes, or instances, a zero value is provided in a get request in the Service field, the Attribute field, or the Instance field, respectively. Thus, for example, if a client wants to access all the instances of the color red, a zero is provided in the Instance field of the FSAttribute in a get request. A zero value in the Service and Attribute fields of the FSAttribute is illegal in a set request. However, a zero in the Instance field on a set request indicates a request for auto-instancing, i.e., a request that the file manager choose an instance value. The FSAttribute store 360 uses the zero value instance field to indicate a request to use the next available instance value for auto-instancing. The manner in which the file manager handles different values in the Service, Attribute, and Instance fields is shown in more detail in, for example, FIGS. 12g–12i, and FIG. 13c–d.

Figure 9C:
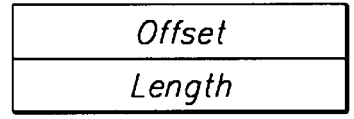
FIG. 9c illustrates a data descriptor structure according to one embodiment of the present invention.

FIG. 9c illustrates a data descriptor structure according to one embodiment of the present invention. The data descriptor, or Element Descriptor, indicates where an attribute value is located relative to its storage space and how long it is. The Element Descriptor contains an Offset field indicating where the attribute value begins relative to its storage space and a Length field indicating how many bytes the attribute value consumes.

Figure 9D:
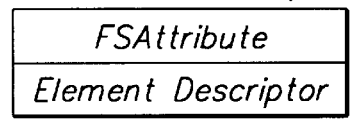
FIG. 9d illustrates a file system attribute descriptor structure according to one embodiment of the present invention.

FIG. 9d illustrates a file system attribute descriptor structure according to one embodiment of the present invention. Referring to FIG. 9d, an FSAttribute Descriptor includes an FSAttribute and the Element Descriptor. The FSAttribute Descriptor is used to retrieve or store attribute values.

Figure 9E:
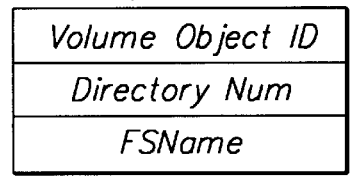
FIG. 9e illustrates a file system object identifier structure according to one embodiment of the present invention.

FIG. 9e illustrates a file system object identifier structure according to one embodiment of the present invention. Referring to FIG. 9e, the FSSpecification contains a Volume Object ID field, a Directory Num field, and an FSName field. The Volume Object ID field indicates the volume which the client desires to access. The Directory Num field indicates a specific directory in the volume that the object is contained in. The FSName field indicates the name of the object in the directory containing the object. Therefore, the FS Specification uniquely identifies an object within a volume.

FIG. 10 is a block diagram of an FSAttribute store according to one embodiment of the present invention. The FSAttribute store 360 includes a FSAttribute store message port 3710 and a FSAttribute store request processor 3720. The store objects (S0) 37310, described in further detail below with reference to FIG. 11a, are assigned to the FSAttribute store message port 3710. An attribute store object (ASO) 3760 is also assigned to the FSAttribute Store Message Port for receiving messages not directed to the store objects.

According to one embodiment, the FSAttribute store request processing module 3720 provides a single thread of execution which is used to actually service format agent requests which are sent to the FSAttribute store. Alternatively, one of ordinary skill in the art would appreciate that a plurality of threads of execution may be used to service the format agent requests.

According to one embodiment, the FSAttribute store 360 receives requests from the FSAttribute store message port 3710. The FSAttribute store request processor 3720 services the requests using the FSAttribute control store 3730, the FSAttribute Key Fork Store 3740, and the FSAttribute Value Fork Store 3750 as appropriate.

FIG. 11a illustrates a detailed diagram of an exemplary file system attribute control store in its newly initialized state as described in further detail with reference to FIG. 13m according to one embodiment of the present invention. As shown in FIG. 11a, the file system attribute (FSAttribute) control store 3730 includes file system attribute store control blocks (FSAttribute store C.B.) 37320. Each FSAttribute store control block has an associated store object 37310.

FIG. 11b illustrates a file system attribute store control block structure according to one embodiment of the present invention. The attribute store comprises one format agent provided fork, which contains FSAttribute values, and another format agent provided fork, which contains key information for locating those values. As shown in FIG. 11b, the file system attribute (FSAttribute) store control block 37320 includes the following fields: Control Block Header; Attribute Store Key Path Object ID; Attribute Store Value Path Object ID; Free List Tail; Free List Head; Last Free List Element Origin; Last Free List Element; and Current Free List Element. The Control Block Header contains the fields described above with reference to FIG. 3b. The Attribute Store Key Path Object ID is provided to the FSAttribute store by the format agent and allows access to the FSAttribute store's key fork store 3740. The Attribute Store Value Path Object ID is provided to the FSAttribute store by the format agent and allows access to the FSAttribute store's value fork store 3750. The Free List Tail keeps track of the last entry on an attribute store's value fork list of available space, and the Free List Head keeps track of the first entry on the attribute store's value fork free list. A number of state variables are kept in the Attribute Store Control Block. They are used by the Attribute Store Request Processor 3720 to instantiate the Attribute Value Fork Store (see FIG. 13l, 13m) and to manage the allocation (see FIG. 13h, 13i, and 13j) and release (see FIG. 13k) of its space. The Attribute Store state variables include the Last Free List Element Origin, the Last Free List Element, and the Current Free List Element. According to one embodiment of the present invention, an Attribute Value Fork Free List Tail is used by the Attribute Store Request Processor 3720. To separate the Attribute Value Fork's used and available space, an Attribute Value Fork Free List Tail is kept in the Attribute Store Control Block.

FIG. 11c depicts the initial state of an Attribute Value Fork according to one embodiment of the present invention. A free list that keeps track of available space initially comprises two Element Descriptors and one free list block representing all the rest of the space in the fork. Element Descriptors keep track of the length of a free block and have pointers (the Offset field) to other Element Descriptors. According to an exemplary embodiment, Element Descriptors are prepended to the free blocks they describe. Because of this, the address of a free block's Element Descriptor is easily computed given the free block's address in the Attribute Value Fork. The first Element Descriptor, the Free List Tail Element Descriptor, has a Length set to, e.g., zero. An Element Descriptor with a Length of zero terminates the list of free blocks in the Attribute Value Fork. According to an exemplary embodiment, the Free List Tail is stored at the start (i.e., offset 0) of the Attribute Value Fork. The second Element Descriptor, the Free List Head Element Descriptor, describes the remaining space in the Attribute Value Fork (i.e., the original amount minus the space needed for the Tail and Head Element Descriptors). According to an exemplary embodiment, the second Element Descriptor is prepended to the free block it describes and thus is between the Free List Tail Element Descriptor and the single free block. The Offset fields of these two Element Descriptors are then set to point to each other (e.g., the size of an Element Descriptor for the Free List Tail and zero for the Free List Head). As a result, the Free List Head points to its predecessor, the Free List Tail. As allocated blocks are returned to the Free List, their Element Descriptors become the new Free List Head while their Offset fields point to the previous Free List Head. Since the Free List Tail is the only Element Descriptor stored in a known place in the Attribute Value Fork (i.e., offset 0), its Offset field is continuously updated to point to each successive Free List Head. In this way, a linked list of free blocks is formed starting with the Free List Head and proceeding to the zero-Length-terminated Free List Tail. The details of this initialization are described with reference to FIG. 13m. The list that this initialization creates is maintained as space, allocated, and released. The manner in which this space is managed is described with reference to FIGS. 13h–13k.

FIGS. 12a through 12m are flowcharts illustrating attribute store request processing according to one embodiment of the present invention.

Figure 12B:
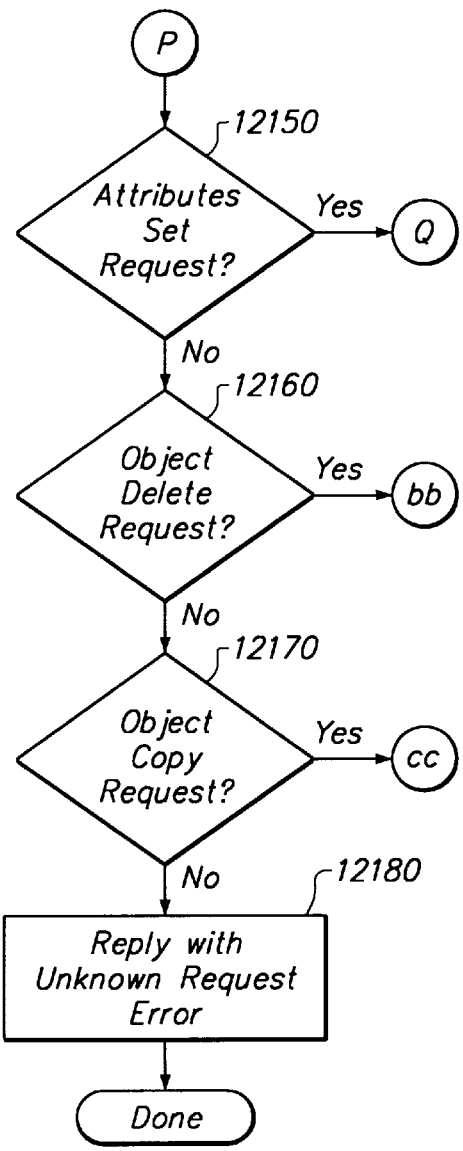
Figures 12C, 12D:
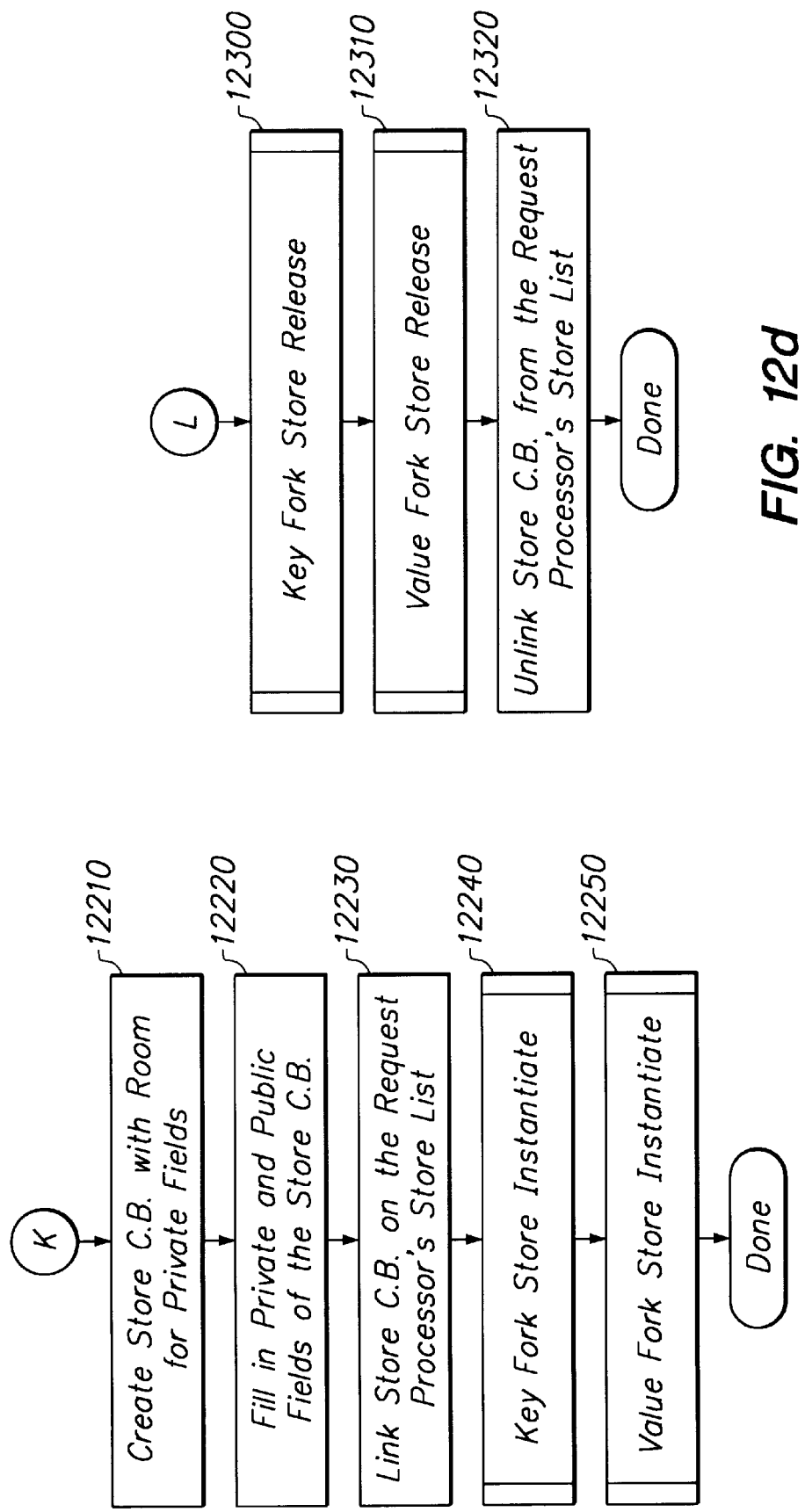
Figure 12E:
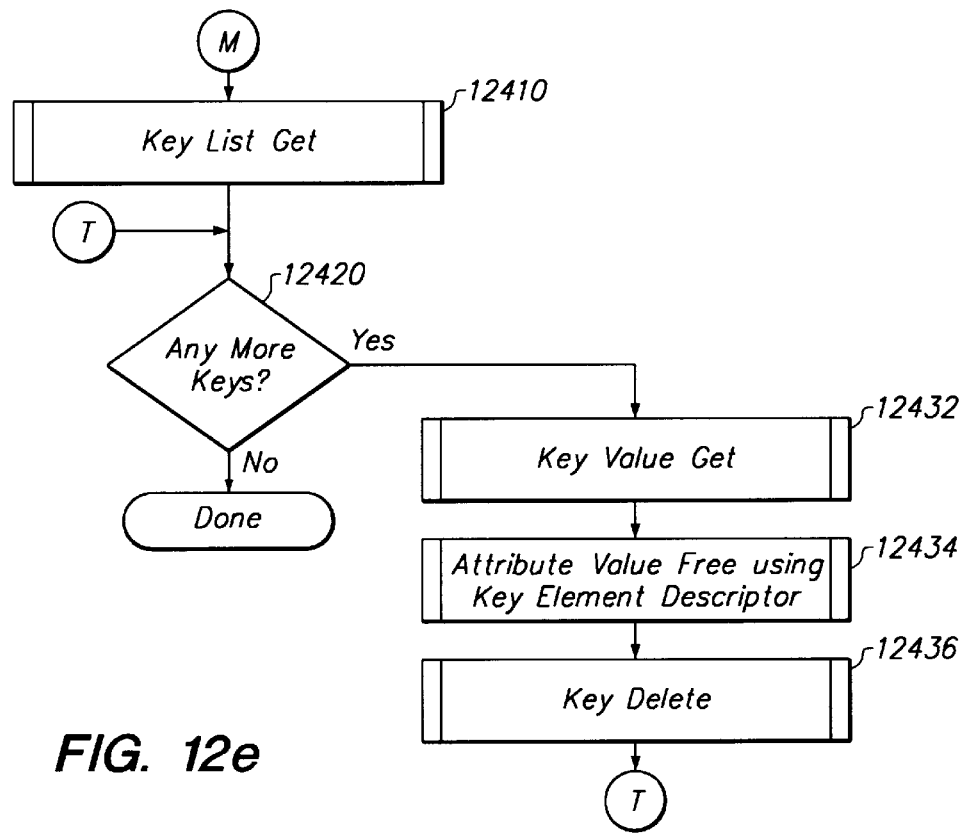

FIGS. 12a and 12b illustrate the process by which the attribute store request processor makes a volume's attribute store available to a format agent, i.e. instantiates it and releases it when the volume is unmounted. Referring to FIG. 12a, a determination is made whether the request is a request to instantiate (step 12100). If not, a determination is made whether the request is a release request (step 12110). If not, a determination is made whether the request is an attributes delete request (step 12120). If not, a determination is made whether the request is an attributes copy request (step 12130). If not, a determination is made whether the request is an attributes get request (step 12140). If not, the process proceeds to P in FIG. 12b.

Referring to FIG. 12b, a determination is made whether the request is an attribute set request (step 12150). If not, a determination is made whether the request is an object delete request (step 12160). If not, determination is made whether the request is an object copy request (step 12170). If not, the processor 3720 replies to the format agent client with an "Unknown Request" error (step 12180), and the process ends.

If at step 12100, it is determined that the request is an instantiate request, the process proceeds to K in FIG. 12c.

Referring to FIG. 12c, a store control block is created with room for private fields (step 12210), and the private and public fields of the store control block are filled in (step 12220). The store control block is linked onto the FSAttribute store request processor's store list at step 12230. The key fork store is instantiated (step 12240), and the value fork store is instantiated (step 12250), as shown in more detail in FIGS. 13l and 13m below. The process then ends.

If at step 12110 it is determined that the request is a release request, the process proceeds to L in FIG. 12d. Referring to FIG. 12d, the key fork store is released (step 12300), and the value fork store is released (step 12310). The store control block is unlinked from the FSAttribute store request processor's store list (step 12320), and the process ends.

If at step 12120 it is determined that the request is an attribute delete request, the process proceeds to M in FIG. 12e. Referring to FIG. 12e, a key list get is performed at step 12410. A determination is made whether there are any more keys (step 12420). If there are, a get value get is performed (step 12432), the attributed value is freed (step 12434) as shown in detail in FIG. 13k, the key is deleted (step 12436), and the process loops back up to T and step 12420. If, at step 12420 it is determined that there are no more keys, the process ends.

If at step 12130 it is determined that the request is an attribute copy request, the process proceeds to N in FIG. 12f. Referring to FIG. 12f, the request buffer offset is set to zero at step 12500, and a key list get of the request's source FSAttributes is performed (step 12510). A determination is made whether there are any more keys at step 12520. If there are not, the process ends. If there are more keys, an attribute value is fetched using the key Element Descriptor (step 12530), the attribute value is allocated using the key Element Descriptor (step 12532), as shown in detail in FIGS. 13h-j, the attribute value is stored using the key Element Descriptor (step 12534), and a key value insert is performed using the destination FSSpecificaiton (step 12536). Then, the process loops back up to U and step 12520.

If at step 12140 it is determined that the request is an attribute get request, the process proceeds to O in FIG. 12g. Referring to FIG. 12g, the request buffer offset is set to zero at step 12600, and a determination is made whether there are any more FSAttribute Descriptors at step 12610. If there are not, the process ends. If there are more FSAttribute Descriptors, a determination is made whether the referenced attribute is a NIL attribute (step 12615). If the referenced attribute is a NIL attribute, the process loops up to V and step 12610. If the referenced attribute is not a NIL attribute, at step 12620 a determination is made whether there are any FSAttribute fields of zero. If there are, the zero'd fields indicate a request for all stored instances of that field. Therefore, a key list get is performed (step 12630) for them, and the process loops back up to V and step 12610.

Figure 12J:
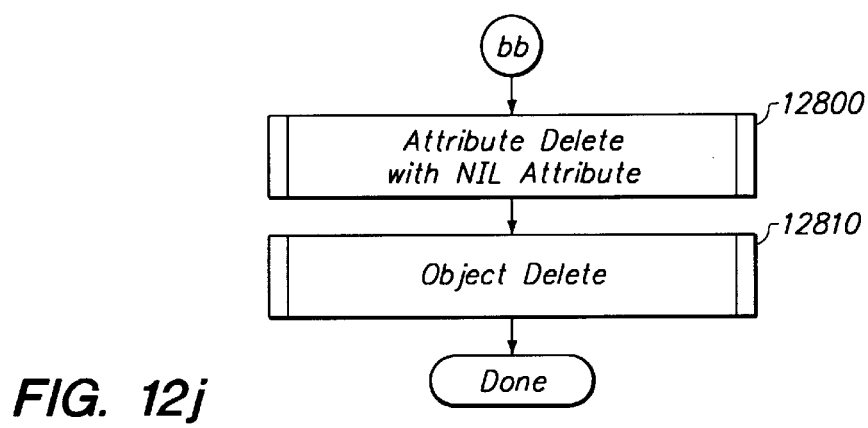
Figure 12K:
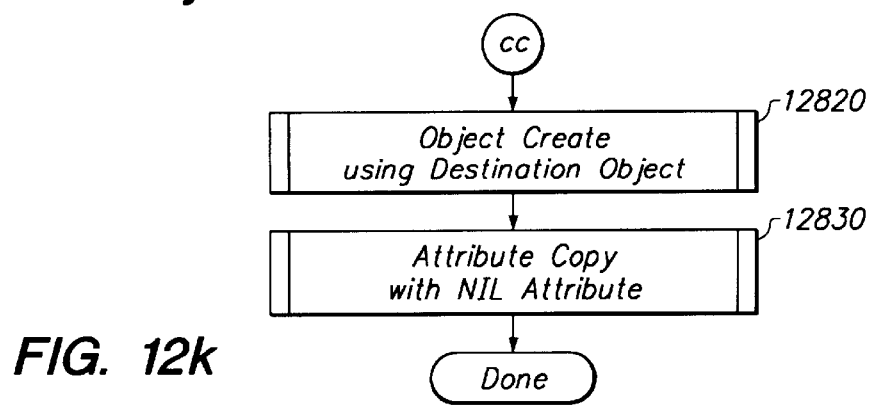
Figure 12F:
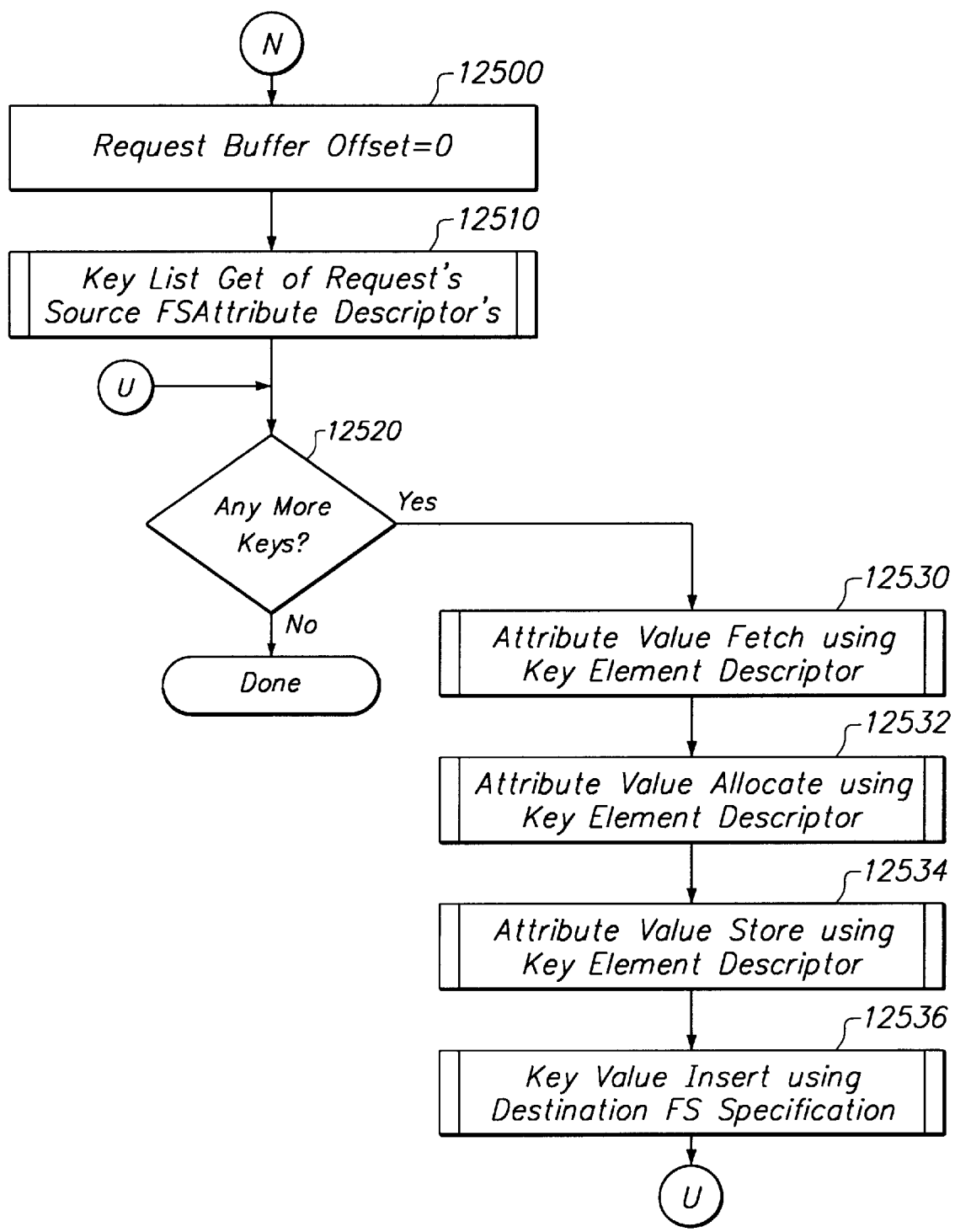
Figure 12G:
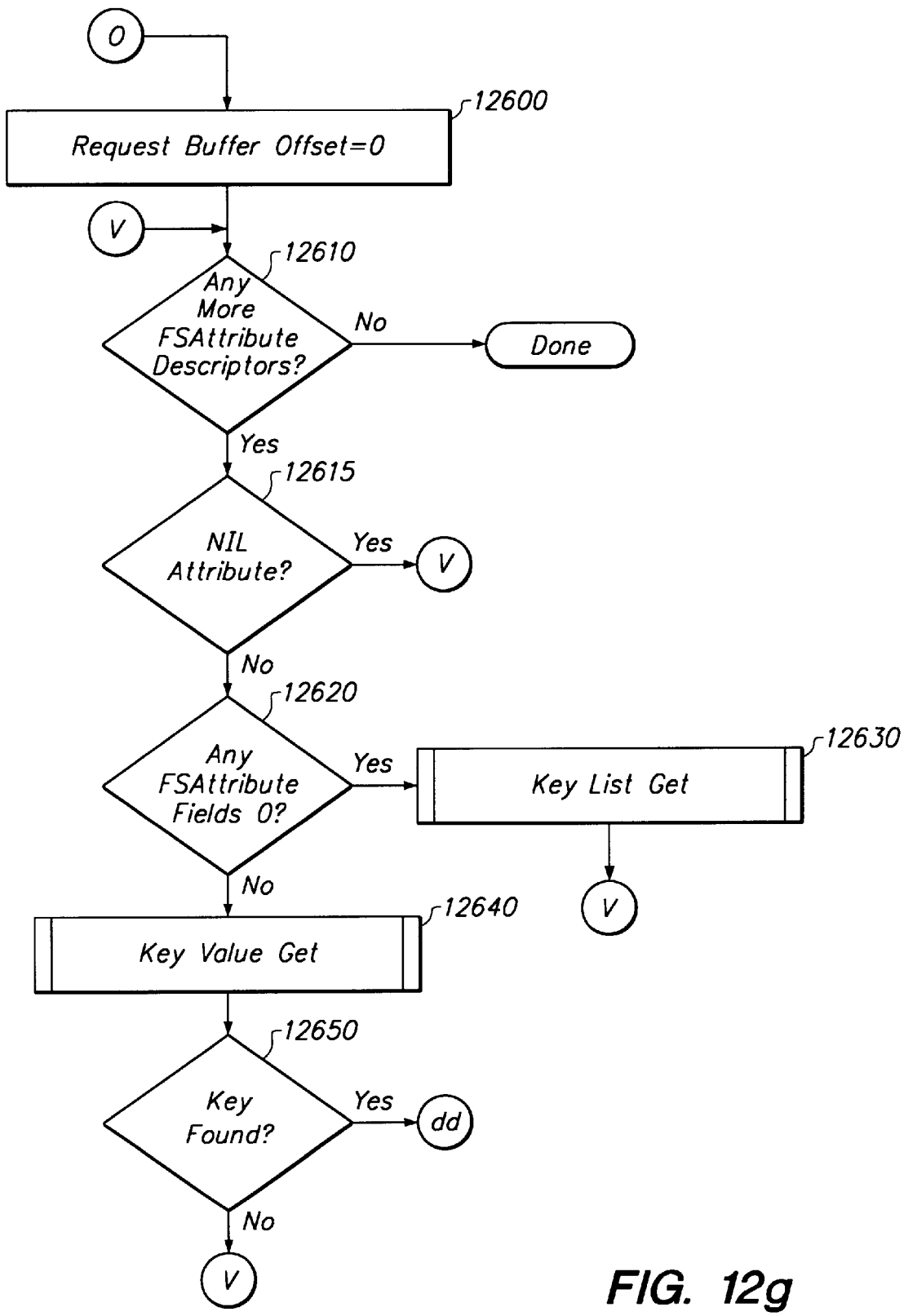
Figure 12L:
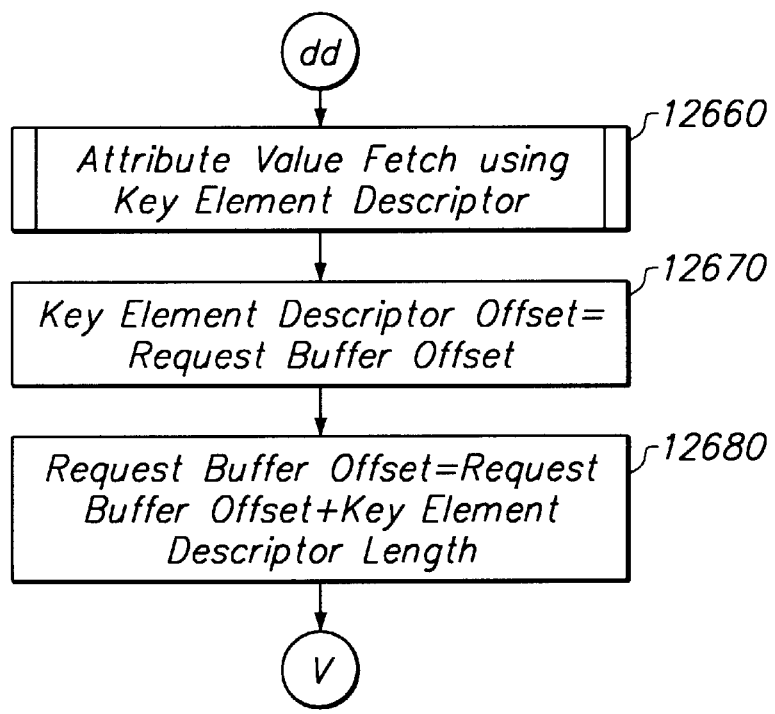
Figure 13A:
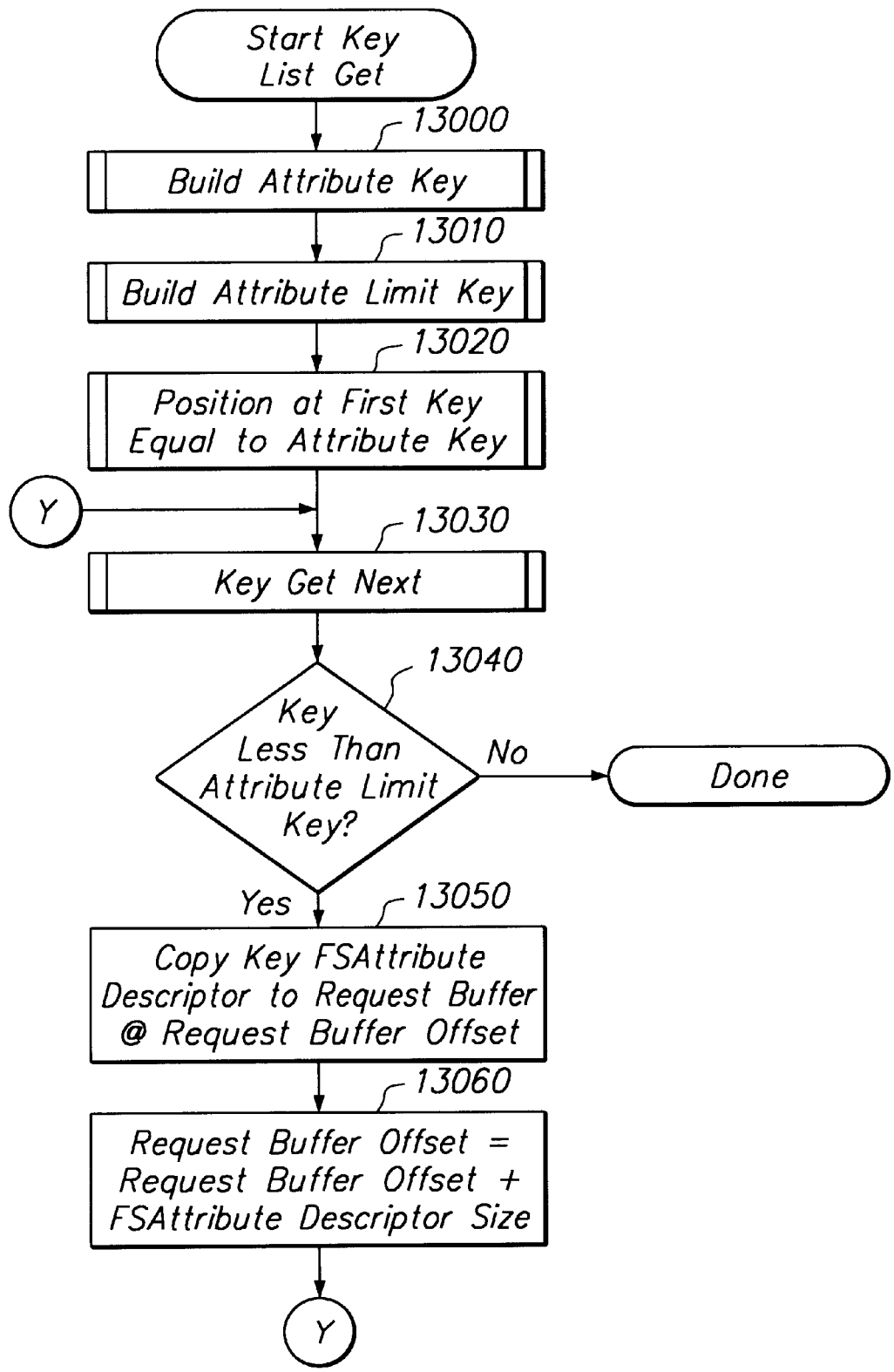
FIGS. 13a through 13p are flowcharts illustrating key and value fork store processing according to one embodiment of the present invention.
Figure 13B:
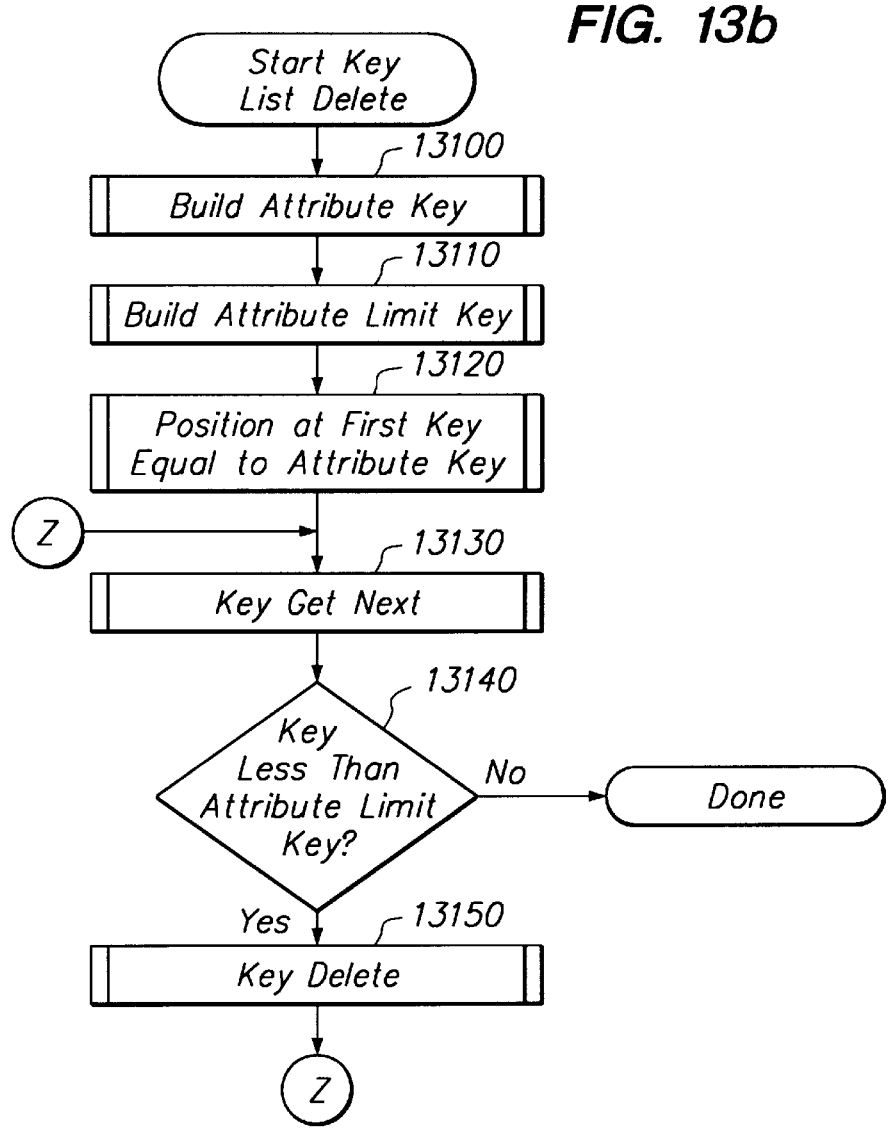
Figure 13C:
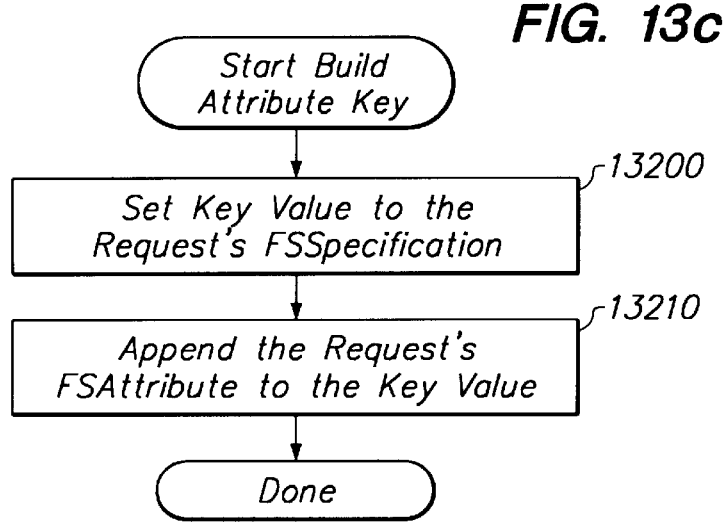
Figure 13D:
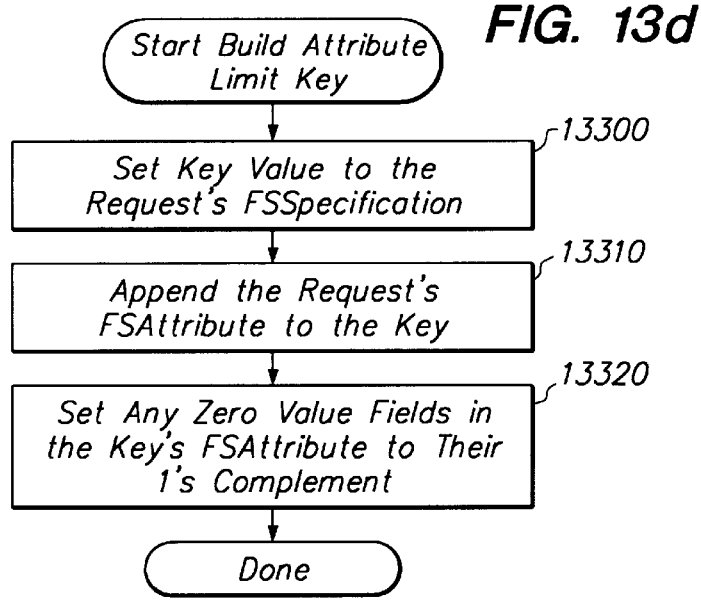
Figure 13E:
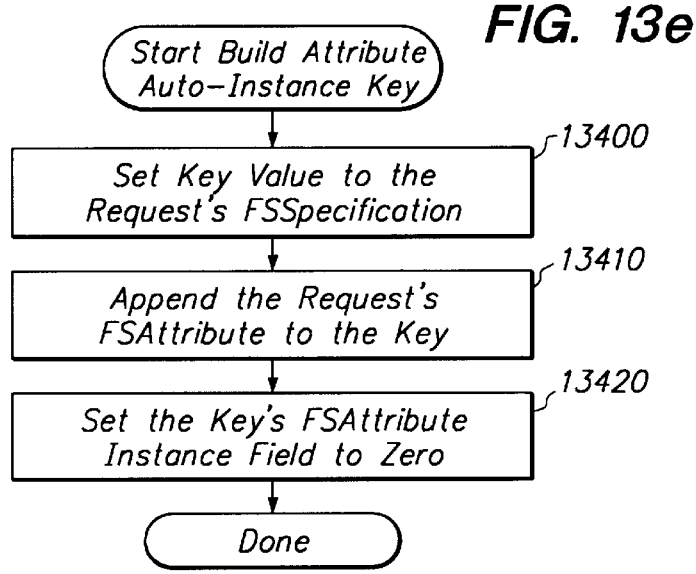
Figure 13F:
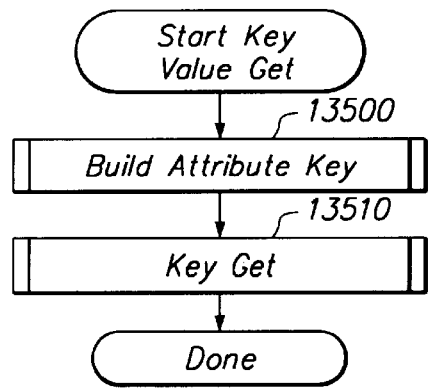

If at step 12620 it is determined that there are no FSAttribute fields of zero, a key value get is performed (step 12640), as shown in detail in FIG. 13f, and a determination is made whether the key is found (step 12650). If the key is not found, the process loops back up to V and step 12610. If the key is found, the process proceeds to dd and FIG. 12l.

Figure 12H:
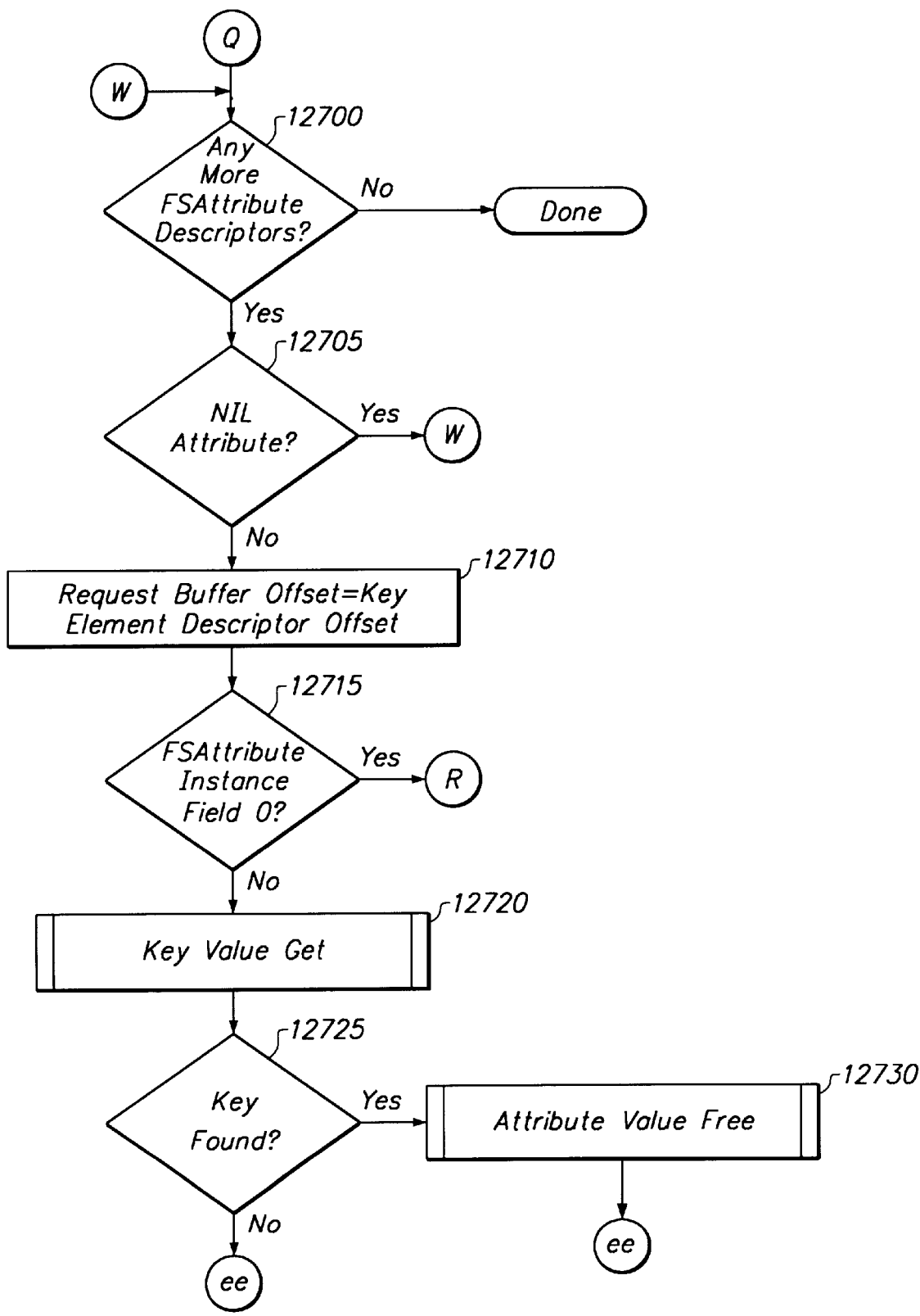

If at step 12150 it is determined that the request is an attribute set request, the process proceeds to Q in FIG. 12h. Referring to FIG. 12h, a determination is made whether there are any more FSAttribute Descriptors at step 12700. If there are not, the process ends. If there are more FSAttribute Descriptors, a determination is made whether the referenced attribute is a NIL attribute (step 12705). If the referenced attribute is a NIL attribute, the process loops back up to W and step 12700. If not, the request buffer offset is set equal to the Element Descriptor offset (step 12710), and a determination is made whether the FSAttribute Instance field is zero (step 12715). If not, a key value get is performed (step 12720), as shown in detail in FIG. 13f. A determination is made whether the key already exists (step 12725). If it does not, the process proceeds to ee in FIG. 12m to allocate the new attribute value. If it is determined at step 12725 that the key does exist, the previous value of the attribute is freed (step 12730) before proceeding to ee in FIG. 12m to allocate the new attribute value again.

Figure 12I:
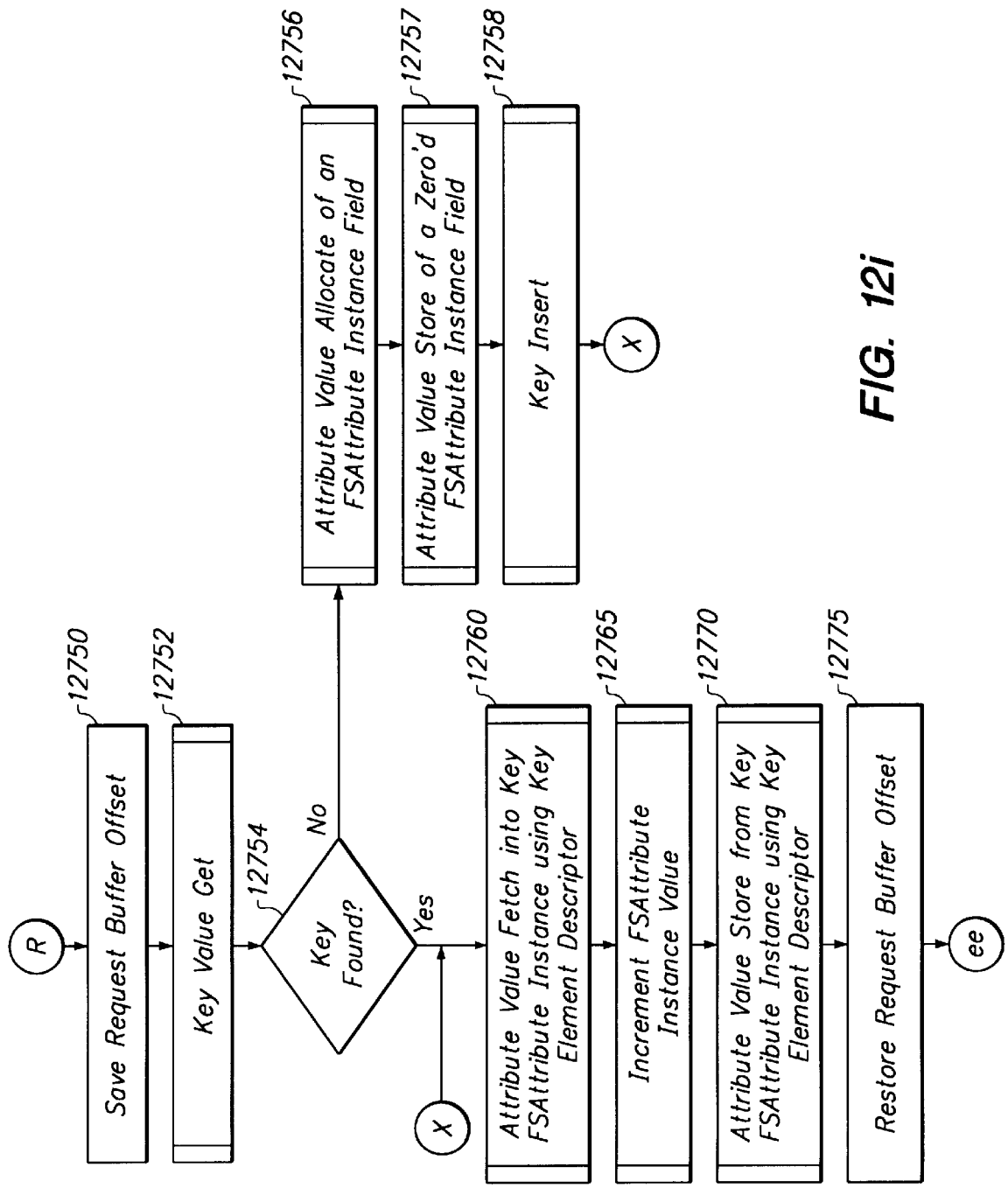

If at step 12715 it is determined that the FSAttribute Instance Field is zero, it is understood to be an auto-instance request (i.e., the file manager chooses the value of the request's FSAttribute Instance field). The process proceeds to R in FIG. 12i to service this request. Referring to FIG. 12i, the request buffer offset is saved at step 12750. A key value get is then performed into the request buffer at step 12752. A determination is made whether a key record was found in the Attribute Key Fork (step 12754). If the key record was not found, this is the first instance of this FSAttribute to be stored. According to an exemplary embodiment, the first instance of an FSAttribute (the auto-instance attribute) to be stored (with its Instance field set to 0) locates an attribute value the size of an FSAttribute's Instance field. This attribute's value is then the next instance to use in satisfying file manager auto-instancing requests. So, the attribute value is allocated (step 12756) as shown in detail in FIGS. 13h-j and initialized to zero (step 12757). Finally, the auto-instance attribute's key record is inserted into the Attribute Key Fork via a key insert (step 12758). The process then loops back up to X to continue the auto-instancing.

At X, the auto-instance attribute value is fetched into the key's FSAttribute Instance using the auto-instance attribute's Element Descriptor (step 12760). This fetched FSAttribute Instance value is incremented (step 12765), as described in more detail with reference to FIG. 13g below. The new auto-instance attribute Instance value is stored from the request key's FSAttribute Instance using the auto-instance attribute's Element Descriptor (step 12770). Then, the request buffer offset is restored (step 12775). Finally, the process proceeds to ee in FIG. 12m to allocate and store the auto-instanced FSAttribute.

If at step 12160 it is determined that the request is an object delete request, the process proceeds to bb in FIG. 12j. Referring to FIG. 12j, an attribute delete is performed with the NIL attribute (step 12800), thereby selecting all of the object's attributes for deletion. Then, the object is deleted (step 12810), and the process ends.

If at step 12170 it is determined that the request is an object copy request, the process proceeds to cc in FIG. 12k. Referring to FIG. 12k, an object is created using the destination object (step 12820), and an attribute copy is performed with the NIL attribute (step 12830), thereby selecting all of the object's attributes for copying. The process then ends.

If at step 12650 it is determined that a key is found, the process proceeds to dd and step 12660 in FIG. 12l at which an attribute value fetch is performed into the request buffer using the key Element Descriptor. Next, the key Element Descriptor offset is set equal to the request buffer offset at step 12670, and the request buffer offset is then set equal to the request buffer offset plus the key Element Descriptor length at step 12680. From there, the process returns to V in FIG. 12h.

Figure 12M:
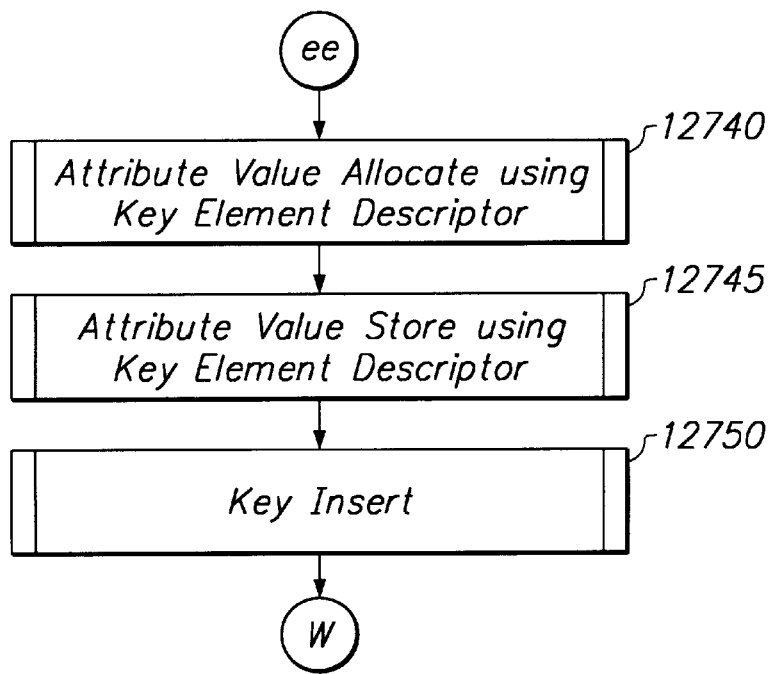

From a determination at step 12725 that a key is not found or after step 12730 or step 12775, the process proceeds to ee in FIG. 12*m* and step 12740 at which an attribute value is allocated using the key Element Descriptor. Next, the attribute value is stored using the key Element Descriptor at step 12745, and the key record is inserted into the Attribute Key Fork at step 12750. From there, the process returns to W in FIG. 12*h*.

FIGS. 13*a* through 13*m* are flowcharts illustrating file system attribute store processing according to one embodiment of the present invention. The Key Fork Store maintenance routines are implemented, according to an exemplary embodiment, by means of the normal BTree services provided by the file manager APIs 310 (FIG. 2). Implementations of these routines would be apparent to one skilled in the art, once in possession of the instant disclosure. For purposes of explanation, some of these routines are described below with reference to FIGS. 13*a*–13*f*.

FIG. 13*a* illustrates an exemplary key list get process, starting with a key list get request. At step 13000, the attribute key is built, as shown in more detail with reference to FIG. 13*c* below. Then, the attribute limit key is built (step 13010). A BTree position request is made using the FSAttribute key to locate the first matching FSAttributeDescriptor in the Attribute Key Fork (step 13020). The FSAttributeDescriptor is retrieved using a BTree Key Get Next request (step 13030). The retrieved FSAttributeDescriptor's FSAttribute is then compared to the attribute limit key (step 13040) to ascertain whether or not there are more matching FSAttributeDescriptors for the request being serviced. If not, the process ends. If the key value is less than the attribute limit key, the key's FSAttribute Descriptor is copied to the request buffer at the request buffer offset (step 13050), the request buffer offset is set equal to the request buffer offset plus the FSAttribute Descriptor size (step 13060), and the process loops back up to Y and step 13030.

FIG. 13*b* illustrates a key list delete process according to one embodiment of the present invention. The key list delete process starts with a key list delete request. The attribute key is built (step 13100), as shown in detail with reference to FIG. 13*c* below. The attribute limit key is built (step 13110), as shown in detail in FIG. 13*d* below. A BTree position request is made using the FSAttribute key to locate the first matching FSAttributeDescriptor in the Attribute Key Fork (step 13120). The FSAttributeDescriptor is retrieved using a BTree Key Get Next request (step 13130). The retrieved FSAttributeDescriptor's FSAttribute is then compared to the attribute limit key (step 13140) to ascertain whether or not there are more matching FSAttributeDescriptors for the request. If not, the process ends. If the key value is less than the attribute limit key, the key value is deleted (step 13150), and the process loops back up to Z and step 13130.

FIG. 13*c* illustrates a build attribute key process according to one embodiment of the present invention. The process starts with a build attribute key request by the Attribute Store Request Processor. The key value is set to the request's FSSpecification (step 13200), the request's FSAttribute is appended to the key value (step 13210), and the process ends.

FIG. 13*d* illustrates a build attribute limit key process according to one embodiment of the present invention. The process starts with a build attribute limit key request by the Attribute Store Request Processor. The key value is set to the request's FSSpecification (step 13300), the request's FSAttribute is appended to the key (step 13310), any zero value fields in the key's FSAttribute are set to their 1's complement (step 13320), thereby establishing an upper bound, and the process ends.

FIG. 13*e* illustrates a build attribute auto-instance key process according to one embodiment of the present invention. The process starts with a build attribute auto-instance key request. The key value is set to the requests's FSSpecification (step 13400), the request's FSAttribute is appended to the key (step 13410), the key's FSAttribute instance field is set to zero (step 13420), and the process ends.

FIG. 13*f* illustrates a key value get process according to one embodiment of the present invention. The process starts with a key value get request. The attribute key is built (step 13500), a BTree key get is performed on the Key Fork Store (step 13510), and the process ends.

Figure 13G:
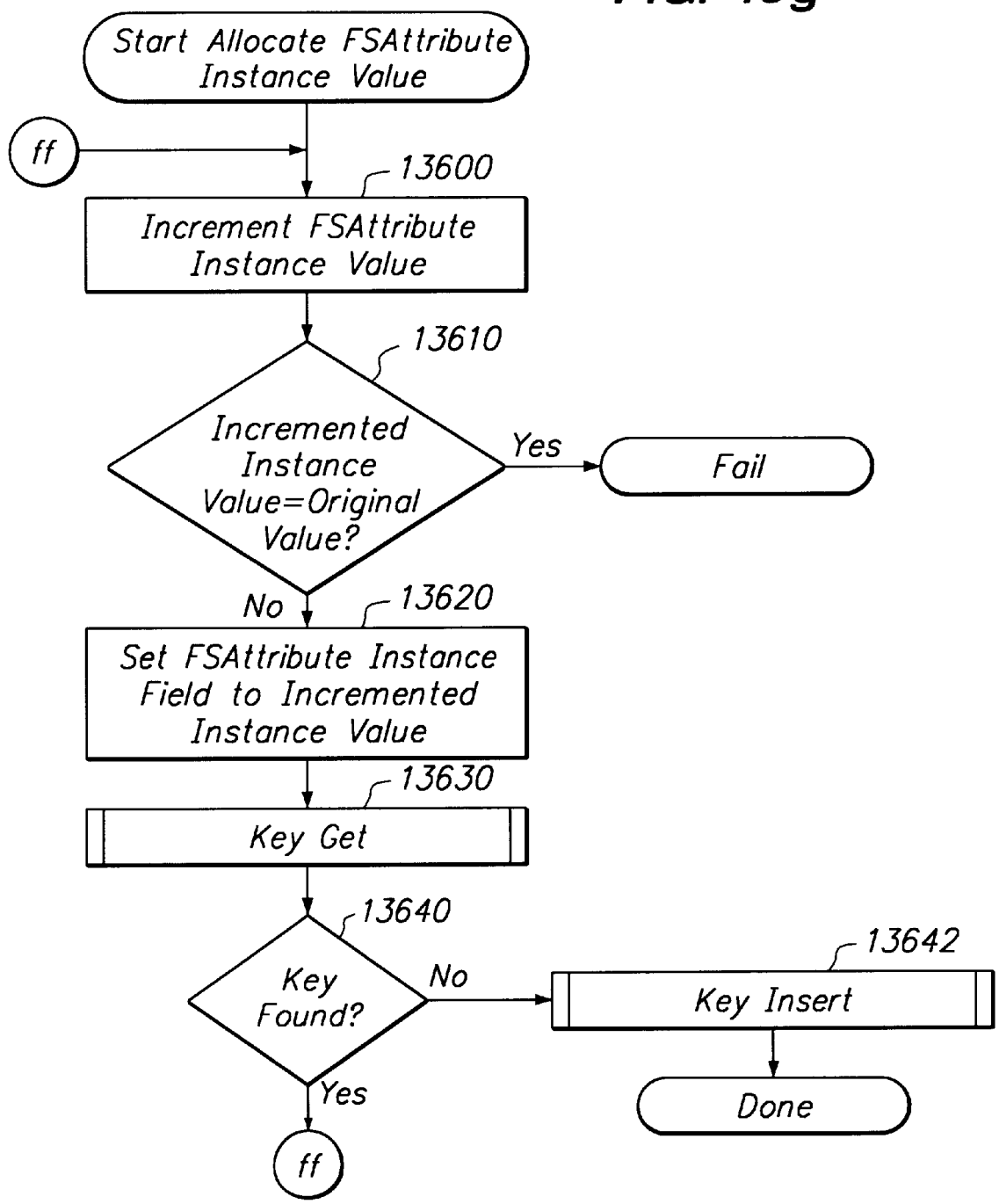

FIG. 13*g* illustrates a process for allocating an unused instance value in the set of Attribute Key Fork FSAttributeDescriptors defined by the request FSAttribute's Service & Attribute fields. The process starts with a request to allocate an FSAttribute instance value. The FSAttribute instance value is incremented (step 13600), and a determination is made whether the incremented instance value equals the original value (step 13610). If the FSAttribute instance value does equal the original value, the process fails since all possible instance values have been tried. If not, the FSAttribute instance field is set to the incremented instance value (step 13620). A BTree Key Get is performed (step 13630), and a determination is made whether the or not the FSAttribute already exists (step 13640). If it does, the attempt fails, and the process loops back up to ff and step 13600 to try the next instance value. If it is determined that the FSAttribute does not already exist at step 13640, a BTree key insert is performed (step 13642) to allocate the new instance, and the process ends.

Figure 13H:
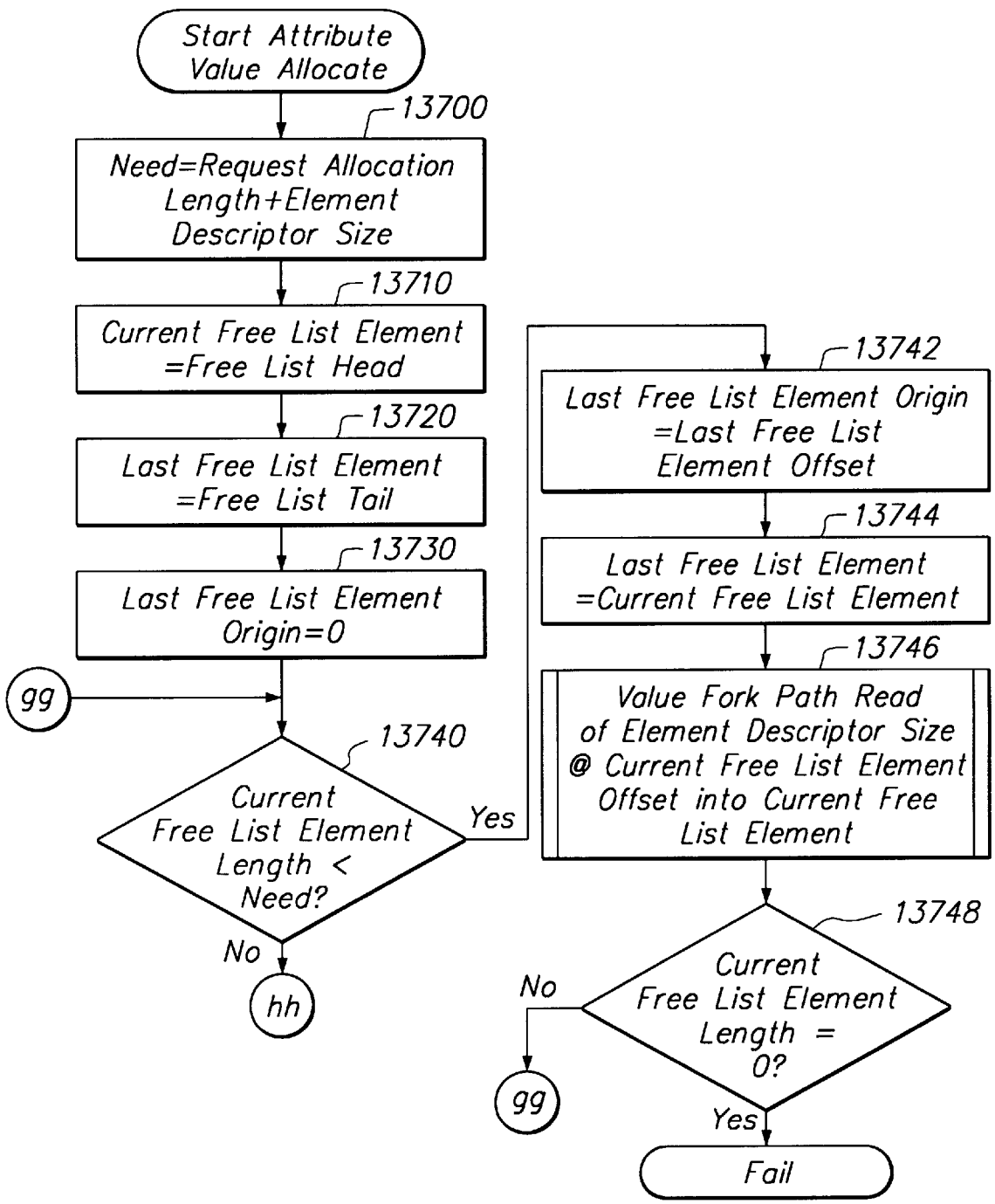
Figure 13I:
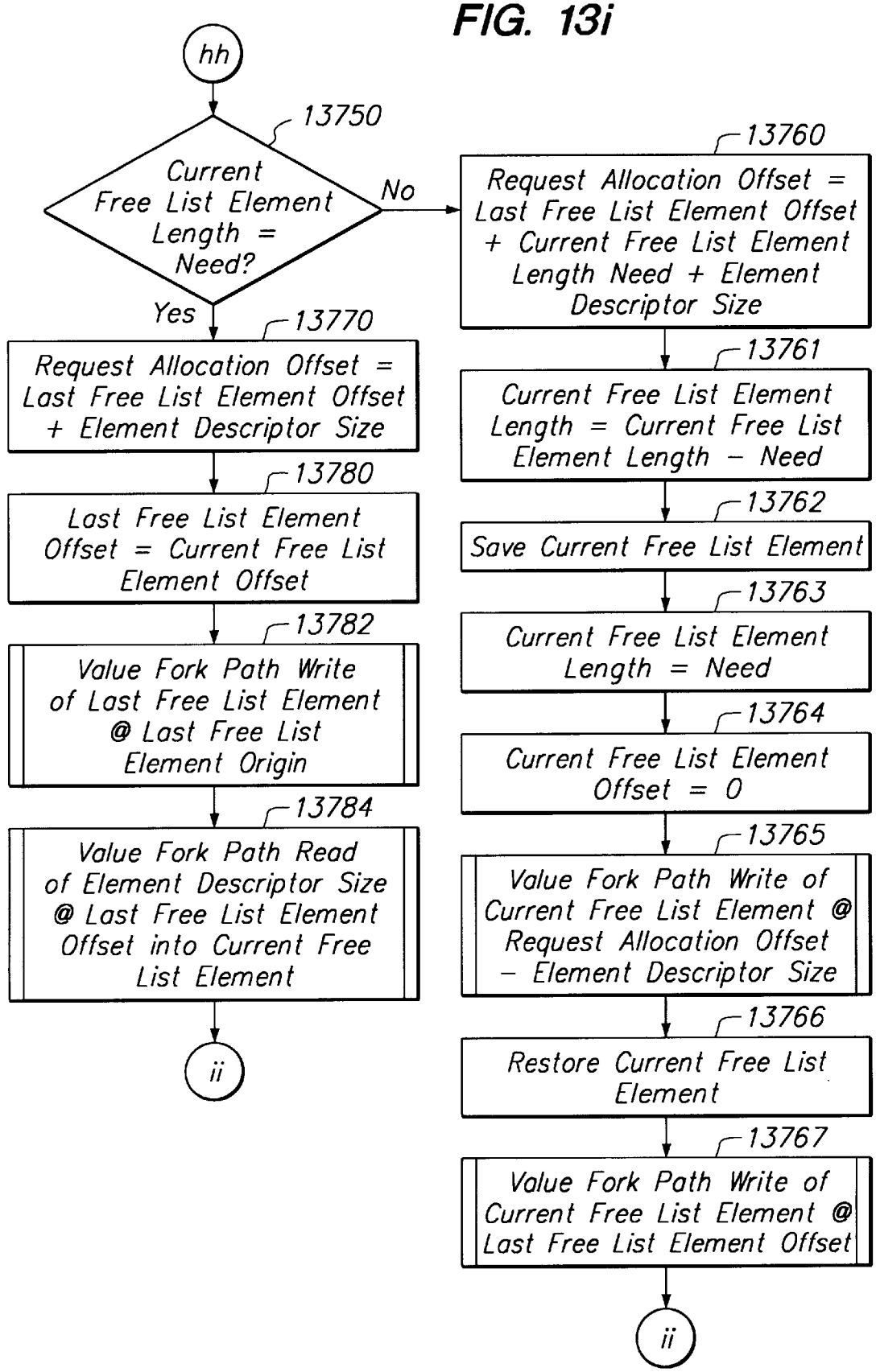
Figure 13J:
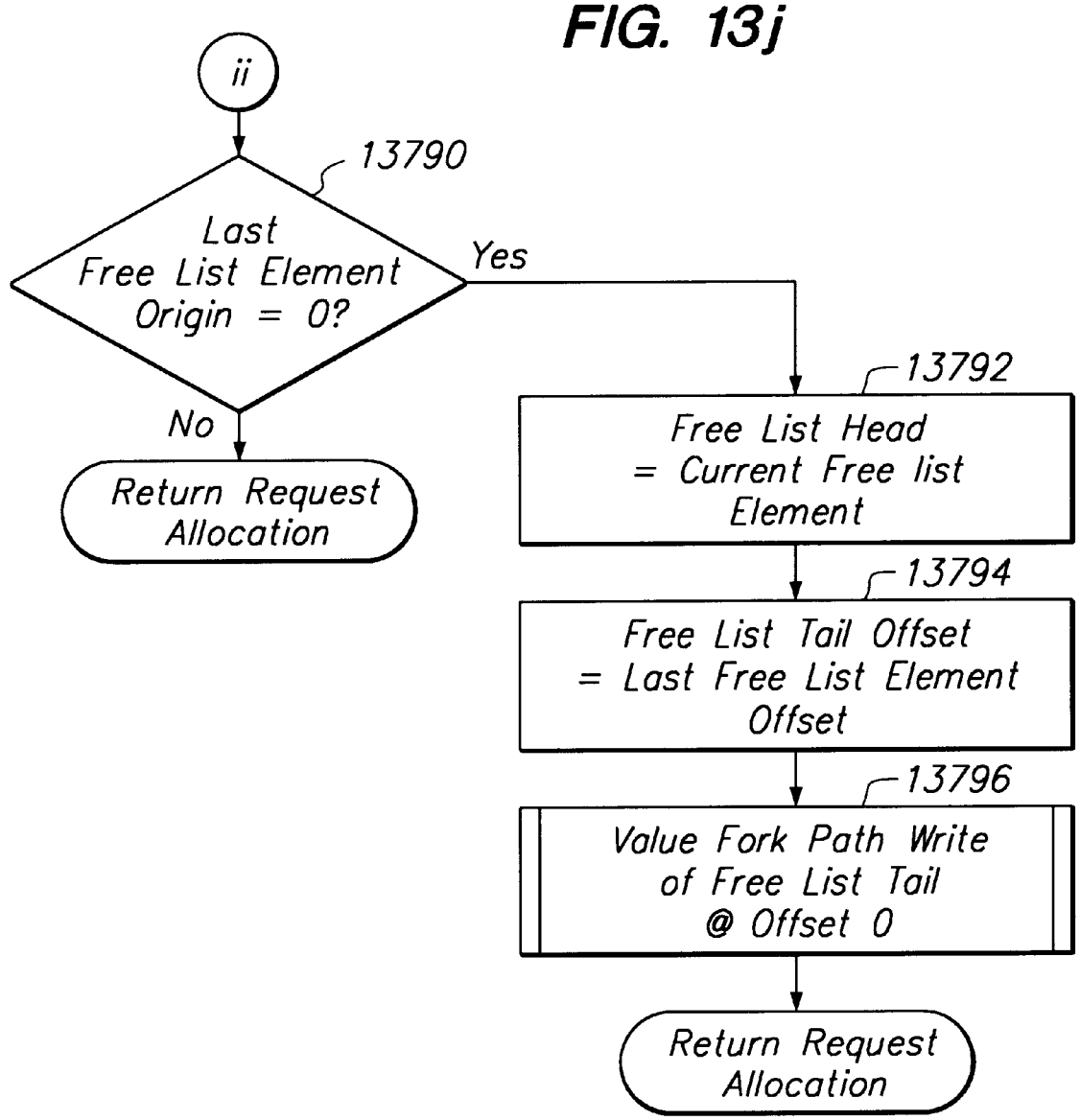

FIGS. 13*h*–13*j* illustrate an attribute value allocate process according to one embodiment of the present invention. The process starts with an attribute value allocate request. The amount of space needed in the Attribute Value Fork Store is set equal to the request allocation length plus the Element Descriptor size (step 13700). The current free list element is set to the Free List Head (step 13710), and the last free list element is set to the Free List Tail (step 13720). The last free list element origin is set to zero (step 13730), the location of the Free List Tail. A determination is made whether the current free list element length is less than the needed space (step 13740). If so, the last free list element origin is set to the last free list element offset (step 13742). Then, the last free list element is set to the current free list element (step 13744). The next free block's Element Descriptor is then read from the Attribute Value Fork into the current free list Element Descriptor using a path read request (step 13746). Next, a determination is made whether the current free list element length is equal to zero (step 13748). If so, the process fails as a zero'd Element Descriptor Length corresponds to the Attribute Value Fork Free List Tail's Element Descriptor. If not, the process loops back up to gg and step 13740.

If at step 13740 the current free list block is large enough to satisfy the request, the process proceeds to hh and FIG. 13*i* to allocate the needed space from this free list block. From hh, the process proceeds to step 13750, at which a determination is made whether the current free list element length is equal to the needed space. If not, this free list block is larger than the needed allocation. So, the request allocation offset is set equal to the last free list element offset plus the current free list element length minus the needed space plus the Element Descriptor size (step 13760). Then, the current free list element length is set equal to the current free list element length minus the needed space (step 13761), the current free list element is saved (step 13762), the current free list element length is set equal to the needed space (step 13763), and the current free list element offset is set equal to zero (step 13764). At this point, the current free list element is prepended to the requested allocation using standard path write at the request allocation offset minus the size of the prepended Element Descriptor (step 13765). The saved current free list element is then restored (step 13766). Finally, the free list block the allocation was taken from is rewritten to the Attribute Value Fork, reduced by the requested amount, at step 13767. The process then proceeds to ii in FIG. 13*j*.

If at step 13750 the current free list element length is determined to be equal to the requested allocation, this free list block can be used as is to satisfy the allocation request. Therefore, the request allocation offset is set equal to the last free list element offset plus the Element Descriptor size (step 13770), and the last free list element offset is set equal to the current free list element offset (step 13780), effectively deleting the block from the free list. At this point, the dequeued block's predecessor points to the dequeued block's successor. The updated predecessor is written to the attribute value fork using a normal path write step 13782). Finally, the new current free list block Element Descriptor is read from the Attribute Value Fork using a standard path read at step 13784. The process then proceeds to ii in FIG. 13*j*.

After servicing the allocation request, from ii, the proceeds to step 13790, at which a determination is made whether the last free list element origin equals zero. If not, the requested allocation is returned. If the last free list element origin does equal zero, this indicates that there is a new Free List Head (since the Free List Tail Element Descriptor Offset always points to the Free List Head). Therefore, the Free List Head is set to the current free list element (step 13792), and the Free List Tail offset is set equal to the last free list element offset (step 13794), thus pointing to the new Free List Head. The updated Free List Tail is written to the Attribute Value Fork at it's known location (offset 0) using a normal path write (step 13796), and finally, the requested allocation is returned.

Figure 13K:
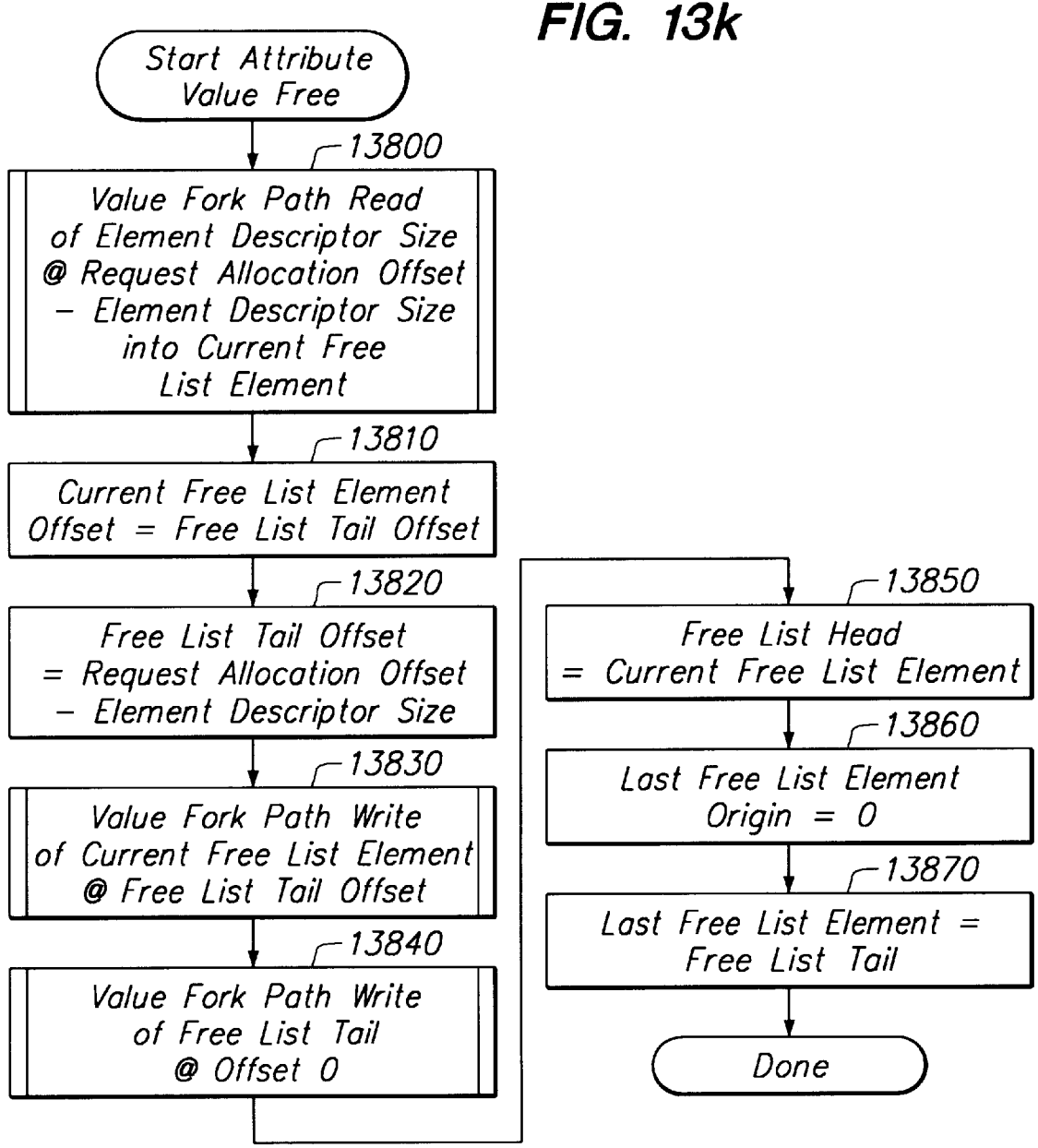
Figure 131:
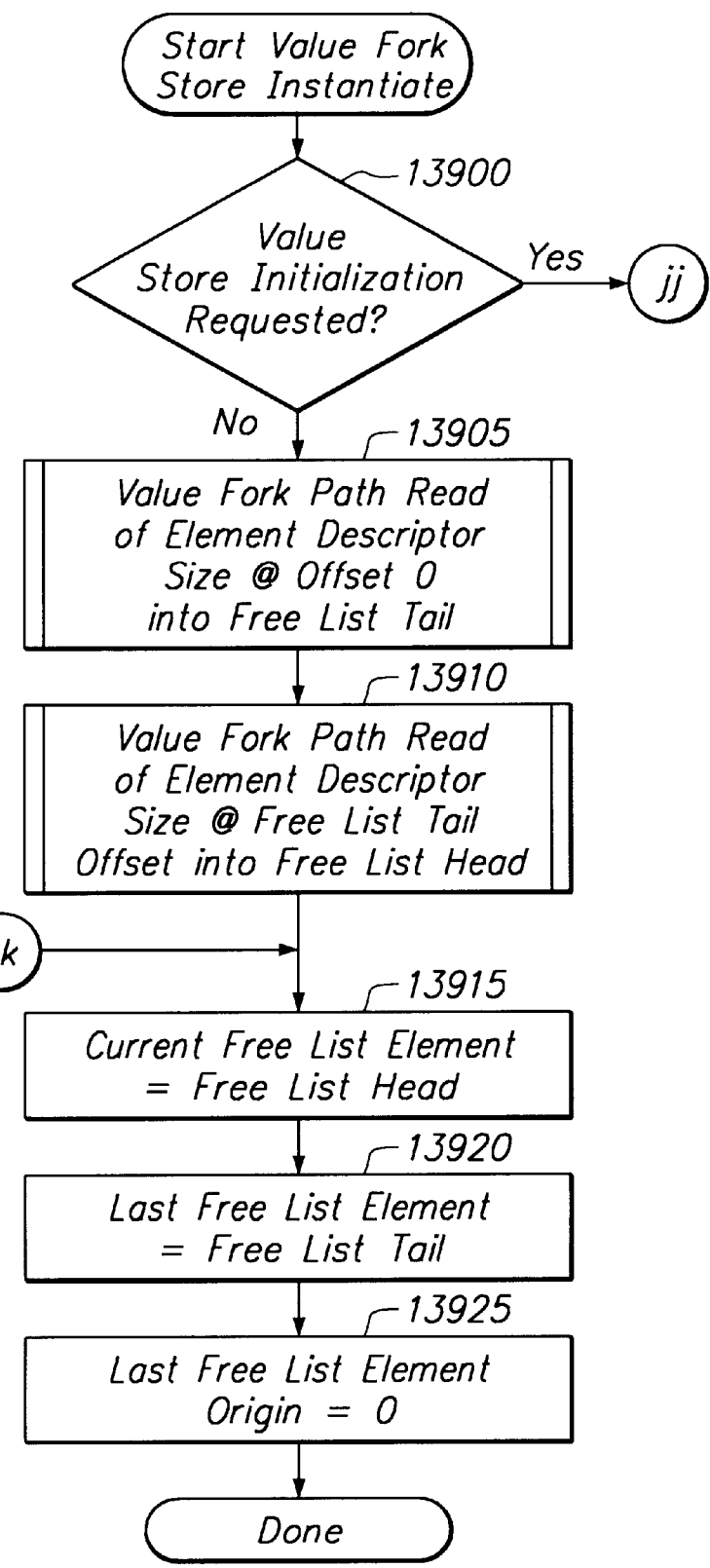

FIG. 13*k* illustrates an attribute value free process according to one embodiment of the present invention. The freed Attribute Value block will be returned to the Attribute Value Fork's free list. The process starts with an attribute value free request. The request's Element Descriptor is read into the current free list Element Descriptor (step 13800) using a standard path read. Then, the current free list Element Descriptor Offset is set equal to the Free List Tail Element Descriptor Offset (step 13810). The Free List Tail Offset is set equal to the request's attribute value allocation minus the Element Descriptor size (step 13820). The newly freed attribute value block is added to the head of the free list by updating its prepended Element Descriptor using a standard path write (step 13830). Similarly, the updated Free List Tail Element Descriptor is written to its known location using a normal path write (step 13840). Finally, the file manager in-memory data structures are updated. The Free List Head is set equal to the current free list element (step 13850), the last free list element origin is set equal to zero (step 13860), the last free list element is set equal to the Free List Tail (step 13870), and the process ends.

Figure 13M:
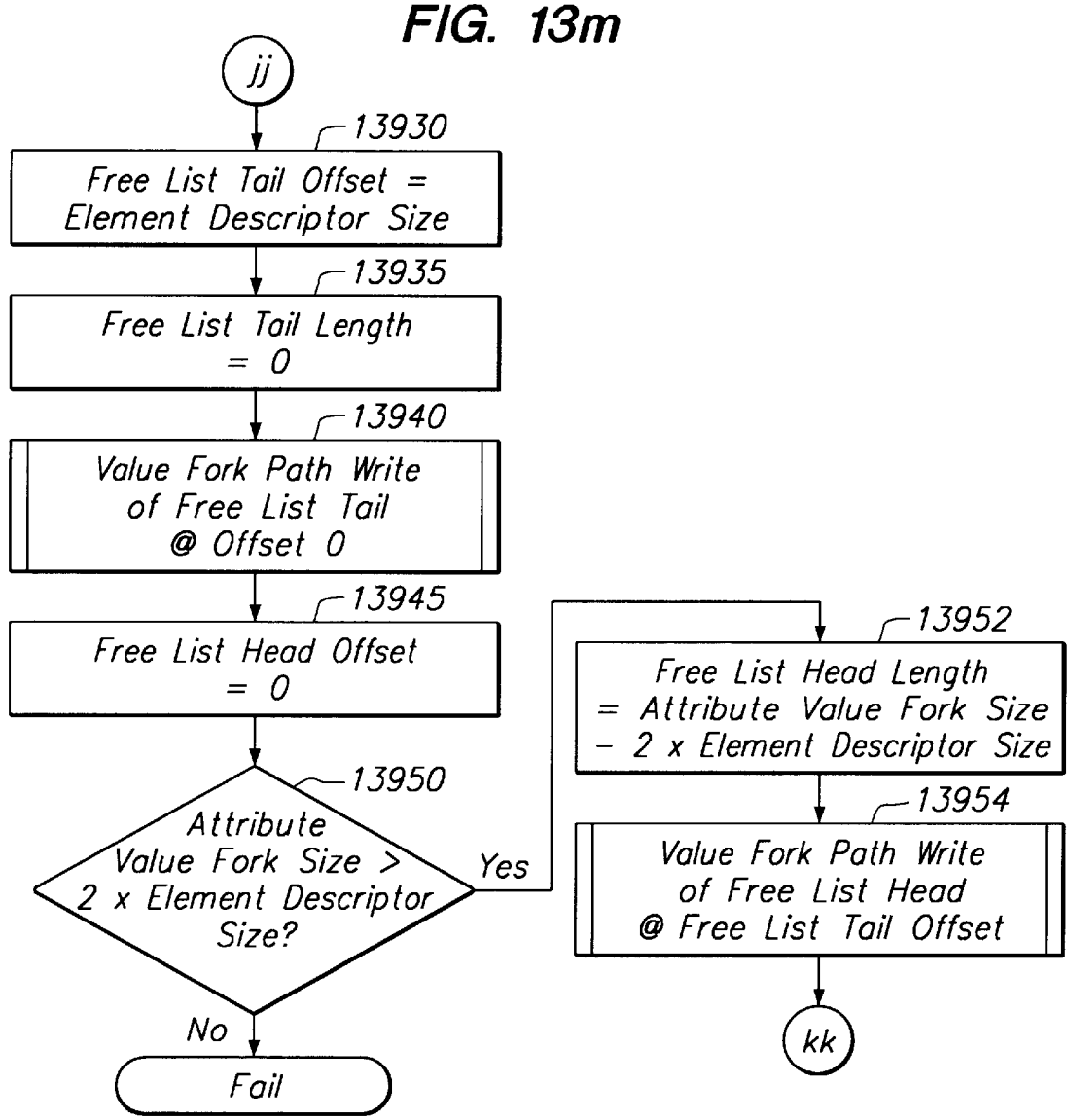

FIGS. 13*l* and 13*m* illustrate an Attribute Value Fork instantiate process according to one embodiment of the present invention. The process starts with a request to instantiate the Attribute Value Fork. A determination is made whether the Attribute Value Fork needs to be initialized at step 13900. If an Attribute Value Fork initialization is not requested, the Attribute Value Fork's Free List Tail is read from the start of the Attribute Value Fork into the Free List Tail variable (step 13905) using a standard path read. Next, the Attribute Value Fork's Free List Head is read into the file manager's Free List Head variable from the offset defined by the value of the Free List Tail's Offset field using a normal path read (step 13910). The current free list Element Descriptor is set equal to the Free List Head (step 13915), the last free element is set equal to the Free List Tail (step 13920), and the last free list element origin is set equal to zero (step 13925). Having initialized the file manager's Free List, the process then ends.

If, at step 13900, it is determined that an Attribute Value Fork initialization is requested, the process proceeds to jj in FIG. 13*m*. Referring to FIG. 13*m*, the Free List Tail variable is initialized to locate the Free List Head's Element Descriptor at the start of the Attribute Value Fork, right after the Free List Tail's Element Descriptor (step 13930). The Free List Tail's Element Descriptor Length is set to zero (step 13935), identifying it as the Free List terminator. The initialized Free List Tail Element Descriptor is written at its known location (offset zero) (step 13940) using a standard path write. Next, the Free List Head Element Descriptor Offset is initialized to locate the Free List Tail (step 13945). A determination is made whether the Attribute Value Fork size is larger than the two required Element Descriptors (step 13950). If not, the process fails. Otherwise, the Free List Head length is set equal to the Attribute Value Fork size minus the two Element Descriptor overhead (step 13952). Next, the Free List Head's Element Descriptor is written to the Attribute Value Fork at the offset defined by the value of the Free List Tail's Offset field using a standard path write (step 13954). Finally, the process loops back up to kk in FIG. 13*l*. The result is the layout depicted in FIG. 11*c*.

Figure 13N:
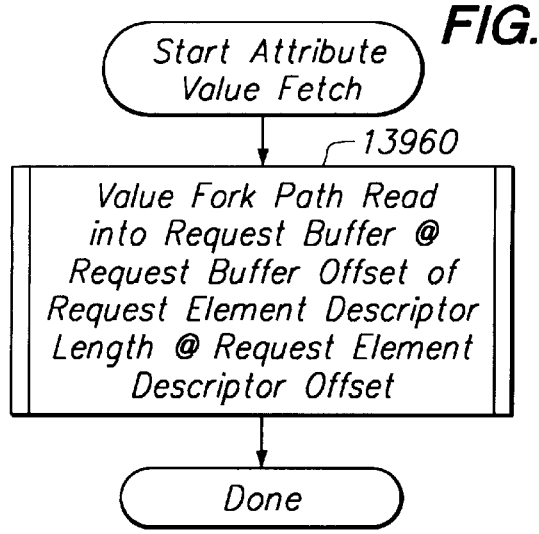

In FIG. 13*n*, which illustrates the Attribute Value Fetch according to one embodiment of the present invention, a normal path read of the Attribute Value Fork is performed from the request's Element Descriptor Offset into the request buffer at the request buffer offset (step 13960). The request Element Descriptor Length defines the number of bytes to be read. Once this is performed, the process ends.

Figure 13O:
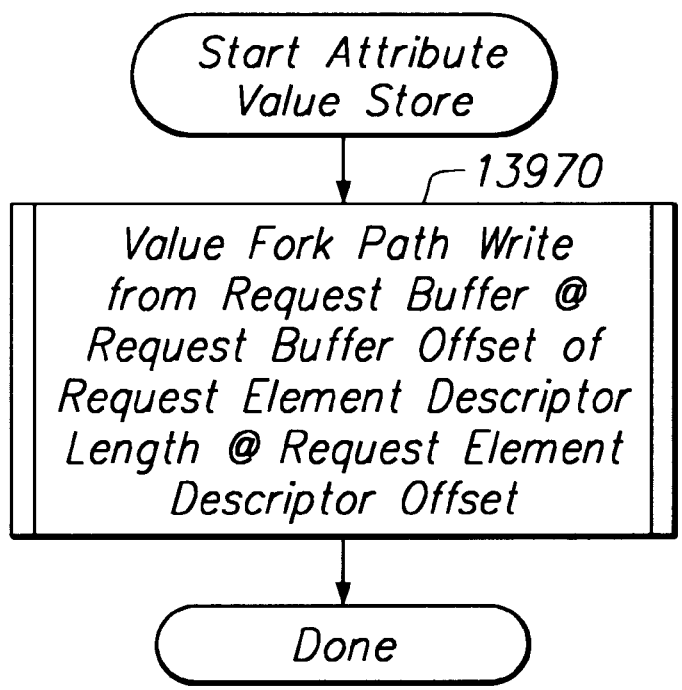

Similarly, FIG. 13*o* illustrates the Attribute Value Store according to one embodiment of the present invention. A standard path write of the Attribute Value Fork path is performed from the request buffer at the request buffer offset (step 13970). The request Element Descriptor Length defines the number of bytes to be written; the request Element Descriptor Offset defines the write destination. Once this is performed, the process ends.

Figure 13P:
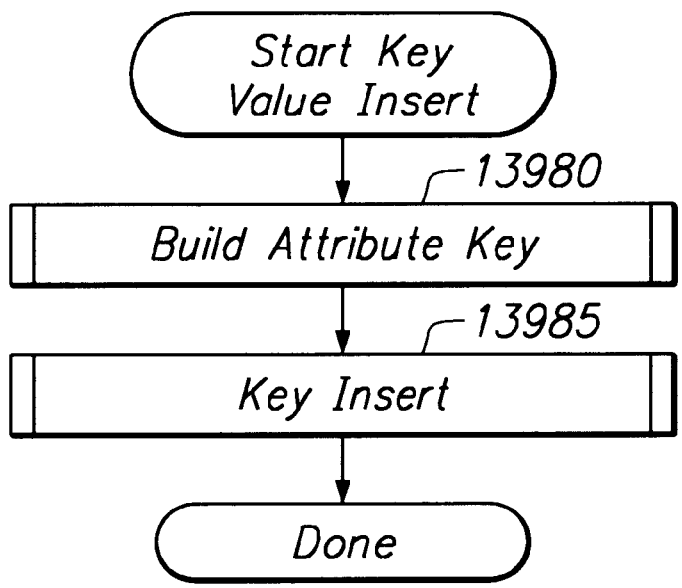

In FIG. 13*p*, which illustrates a Key Value Insert, an attribute key is built at step 13980 (according to FIG. 13*c*) and inserted into the Attribute Key Fork (step 13985) using a normal BTree insert. Then, the process ends.

It will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. In a computer including at least one client, a system for handling requests from the client for accessing metadata and client data from at least one file system having an associated format containing specific metadata, the system comprising:

format agent means for managing said at least one file system;

interface means for receiving a request from said client;

dispatch means for receiving the request from said interface means and routing said request to said format agent means; and metadata attribute storage means for storing metadata attribute data, wherein said format agent means accesses said metadata attribute storage means to fulfill portions of said request regarding metadata attributes which are not included in said associated format of said at least one file system.

2. The system according to claim 1, further comprising dispatch control storage means for storing at least one first identifier for identifying said format agent means, second identifiers for identifying a plurality of objects to which said request may be sent and mapping information for mapping between the second and first identifiers.

3. The system according to claim 1, wherein said interface means comprises means for translating said requests to messages.

4. The system according to claim 1, wherein the metadata attribute is stored without modifying the file system.

5. The system according to claim 1, wherein said metadata attribute storage means comprises a port and a plurality of objects assigned to said port, said objects receiving the request from said format agent.

6. The system according to claim 5, wherein said metadata attribute storage means comprises means for receiving messages from said port.

7. The system according to claim 5, wherein said objects comprises a metadata attribute store object for receiving a request from said format agent means, and wherein said metadata attribute storage means comprises means for forwarding said metadata attribute data from said metadata attribute storage object to said format agent means in response to said request.

8. The system according to claim 2, wherein said mapping information comprises a plurality of control blocks.

9. The system according to claim 8, wherein said plurality of control blocks comprise:

at least one agent control block;

at least one volume control block connected to said at least one agent control block;

at least one iterator control block connected to said at least one volume control block;

at least one object control block connected to said at least one volume control block;

at least one fork control block connected to said object control block; and at least one path control block connected to said fork control block.

10. The system according to claim 1, wherein said metadata attribute storage means comprises a metadata attribute control store for storing mapping information for mapping between a request from a format agent and metadata attribute data.

11. The system according to claim 10, wherein said mapping information comprises a plurality of metadata attribute store control blocks.

12. The system according to claim 1, wherein multiple instances of metadata attributes are accessible by said client.

13. The system according to claim 12, wherein the multiple instances are selected by said client.

14. The system according to claim 12, wherein the multiple instances are assigned by said client.

15. The system according to claim 12, wherein the multiple instances are selected by the file manager.

16. The system according to claim 12, wherein the multiple instances are assigned by the file manager.

17. A file manager comprising:

a plurality of interface modules for receiving a request from a client regarding a storage medium, the storage medium being organized according to a file system format;

at least one format agent for processing requests to said storage medium;

a dispatcher for receiving the request from said interface modules and routing said request to said at least one format agent; and a metadata attribute store for storing metadata attribute data, wherein said at least one format agent accesses said metadata attribute store to fulfill portions of said request regarding metadata attributes which are not included in said associated format of said storage medium.

18. The file manager according to claim 17, further comprising dispatcher control store for storing at least one first identifier for identifying said format agent means, second identifiers for identifying a plurality of objects to which said request may be sent and mapping information for mapping between the second and first identifiers.

19. The file manager according to claim 17, wherein said interface modules comprise means for translating said requests to messages.

20. The file manager according to claim 17, wherein the metadata attribute data is stored without modifying the file system.

21. The file manager according to claim 17, wherein said metadata attribute store comprises a port and a plurality of objects assigned to said port, said objects receiving the request from said format agent.

22. The file manager according to claim 21, wherein said metadata attribute store comprises means for receiving messages from said port.

23. The file manager according to claim 21, wherein said objects comprise a metadata attribute store object for receiving a request from said at least one format agent, and wherein said metadata attribute store means comprises means for forwarding said metadata attribute data from said metadata attribute storage object to said format agent means in response to said request.

24. The file manager according to 18, wherein said mapping information comprises a plurality of control blocks.

25. The file manager according to claim 24, wherein said plurality of control blocks comprise:

at least one agent control block; and at least one volume control block connected to said at least one agent control block;

at least one iterator control block connected to said at least one volume control block;

at least one object control block connected to said at least one volume control block;

at least one fork control block connected to said object control block; and at least one path object connected to said fork control block.

26. The file manager of claim 17, wherein said metadata attribute store comprises a metadata attribute control store for storing mapping information for mapping between a request from a format agent and metadata attribute data.

27. The file manager according to claim 24, wherein said mapping information comprises a plurality of metadata attribute store control blocks.

28. The file manager according to claim 17, wherein said file manager fulfills requests for multiple instances of metadata attributes.

29. The file manager according to claim 28, wherein the multiple instances are selected by said client.

30. The file manager according to claim 28, wherein the multiple instances are assigned by said client.

31. The file manager according to claim 28, wherein the multiple instances are selected by the file manager.

32. The file manager according to claim 28, wherein the multiple instances are assigned by the file manager.

33. In a computer including at least one client, a method for handling requests from the client for accessing metadata and client data from at least one file system having an associated format, the method comprising the steps of:
   receiving a request for accessing metadata attributes from said file system from said client;
   routing the request to a format agent managing said file system;
   fulfilling portions of said request regarding metadata attributes contained in said associated format of said file system; and
   retrieving metadata attribute data from a metadata attribute storage means to fulfill portions of said request regarding metadata attributes that are not contained in said associated format of said file system.

34. The method according to claim 33, further comprising:
   storing first identifiers for identifying said format agents, second identifiers for identifying a plurality of objects to which said request may be sent, and mapping information for mapping between said second and first identifiers, wherein said step of routing is performed based on said mapping information.

35. The method according to claim 33, wherein said step of receiving said request includes translating said request to a message.

36. The method according to claim 33, wherein the metadata attribute data is stored without modifying the file system.

37. The method according to claim 33, wherein said metadata attribute storage means comprises a port and a plurality of objects assigned to said port, said objects receiving the request from said format agent.

38. The method according to claim 37, further comprising the step of receiving messages from said port.

39. The method according to claim 37, wherein said objects comprise a metadata attribute store object for receiving a request from said format agent means, and wherein said metadata attribute storage means comprises means for forwarding said metadata attribute data from said metadata attribute storage object to said format agent means in response to said request.

40. The method according to claim 34, wherein said step of storing comprises storing a plurality of control blocks.

41. The method according to claim 40, wherein said step of storing comprises the steps of:

storing at least one agent control block;
storing at least one volume control block connected to said at least one agent control block;
storing at least one iterator control block connected to said at least one volume control block;
storing at least one object control block connected to said at least one volume control block;
storing at least one fork control block connected to said object control block; and
storing at least one path control block connected to said fork control block.

42. The method according to claim 33, wherein said metadata attribute storage means comprises a metadata attribute control store for storing mapping information for mapping between a request from a format agent and metadata attribute data.

43. The method according to claim 42, wherein said mapping information comprises a plurality of metadata attribute store control blocks.

44. The method according to claim 33, wherein multiple instances of metadata attributes are accessible by said client.

45. The method according to claim 44, wherein the multiple instances are selected by said client.

46. The method according to claim 44, wherein the multiple instances are assigned by said client.

47. The method according to claim 44, wherein the multiple instances are selected by the file manager.

48. The method according to claim 44, wherein the multiple instances are assigned by the file manager.

49. A method for handling requests in a file manager, comprising the steps of:
   receiving a request from a client regarding a storage medium, the storage medium being organized according to a file system format;
   routing the request to a format agent managing said file system;
   fulfilling portions of said request regarding metadata attributes contained in said associated format of said file system; and
   retrieving metadata attribute data from a metadata attribute storage means to fulfill portions of said request regarding metadata attributes that are not contained in said associated format of said file system.

50. The method according to claim 49, further comprising:
   storing first identifiers for identifying a plurality of format agents, second identifiers for identifying a plurality of objects to which said request may be sent, and mapping information for mapping between said second and first identifiers, wherein said step of routing is performed based on said mapping information.

51. The method according to claim 49, wherein said step of receiving comprises translating said request to a message.

52. The method according to claim 49, wherein the metadata attribute data is stored without modifying the file system.

53. The method according to claim 49, further comprising a step of storing metadata attribute store control blocks.

54. The method according to claim 53, wherein said metadata attribute storage means comprises a port and a plurality of objects associated with said metadata attribute store control blocks, said plurality of objects assigned to said port and adapted to receive messages corresponding to said request from said format agent, and wherein said method further comprises the step of retrieving said messages from said objects through said port to process said requests.

55. The method according to claim 50, wherein said step of storing comprises storing a plurality of control blocks.

56. The method according to claim 55, wherein said step of storing comprises the steps of:

storing at least one agent control block;

storing at least one volume control block connected to said at least one agent control block;

storing at least one iterator control block connected to said at least one volume control block;

storing at least one object control block connected to said at least one volume control block;

storing at least one fork control block connected to said object control block; and storing at least one path control block connected to said fork control block.

57. The method according to claim 49, wherein said metadata attribute storage means comprises a metadata attribute control store for storing mapping information for mapping between a request from a format agent and metadata attribute data.

58. The method according to claim 55, wherein said mapping information comprises a plurality of metadata attribute store control blocks.

59. The method according to claim 49, wherein said file manager fulfills requests for multiple instances of metadata attributes.

60. The method according to claim 59, wherein said multiple instances are selected by said client.

61. The method according to claim 59, wherein the multiple instances are assigned by said client.

62. The method according to claim 59, wherein said multiple instances are selected by the file manager.

63. The method according to claim 59, wherein the multiple instances are assigned by said client.

* * * * *